(12) United States Patent
Balasubramanian et al.

(10) Patent No.: US 10,470,090 B2
(45) Date of Patent: Nov. 5, 2019

(54) DATA COMPRESSION TECHNIQUES FOR HANDOVER AND RADIO LINK FAILURE RECOVERY

(71) Applicant: QUALCOMM Incorporated, San Diego, CA (US)

(72) Inventors: Srinivasan Balasubramanian, San Diego, CA (US); Seyed Ali Ahmadzadeh, San Jose, CA (US); Shailesh Maheshwari, San Diego, CA (US); Ashwini Raina, Mountain View, CA (US); Rohit Kapoor, Bangalore (IN); Leena Zacharias, San Jose, CA (US); Vishal Dalmiya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 14/940,134

(22) Filed: Nov. 12, 2015

(65) Prior Publication Data

US 2016/0142951 A1    May 19, 2016

Related U.S. Application Data

(60) Provisional application No. 62/107,278, filed on Jan. 23, 2015, provisional application No. 62/080,885, (Continued)

(51) Int. Cl.
*H04W 36/02* (2009.01)
*H04W 36/00* (2009.01)

(52) U.S. Cl.
CPC ..... *H04W 36/023* (2013.01); *H04W 36/0033* (2013.01)

(58) Field of Classification Search
None
See application file for complete search history.

(56) References Cited

U.S. PATENT DOCUMENTS 8,451,795 B2 * 5/2013 Ho .................. H04L 1/1874
370/331
8,488,583 B2 * 7/2013 Pelletier ............. H04W 28/06
370/255
(Continued)

FOREIGN PATENT DOCUMENTS

JP    2009111485 A    5/2009
WO   WO-2008115116 A1   9/2008
WO   WO-2009021217 A1   2/2009

OTHER PUBLICATIONS

3GPP, "Universal Mobile Telecommunications System (UMTS); Packet Data Convergence Protocol (PDCP) Specification (3GPP TS 25.323 version 6.0.0 Release 6)," ETS ITS 125 323 v6.0.0, (Dec. 2003) Technical Specification, Dec. 2003, 25 pgs., XP_14016812A, 3rd Generation Partnership Project.
(Continued)

*Primary Examiner* — Phirin Sam
*Assistant Examiner* — Faiyazkhan Ghafoerkhan
(74) *Attorney, Agent, or Firm* — Holland & Hart LLP

(57) ABSTRACT

A user equipment (UE) and source base station may use data compression techniques for data packets sent between them. During a handover, the source base station may provide data compression context to a target base station, thus enabling the target base station to continue the data compression following the handover without having to reestablish the data compression context. The source base station may determine data compression capabilities of the UE or the target base station, or both, and may communicate the determined data compression capabilities to the UE or target base station. The source base station may identify at least
(Continued)

one gap in a sequence of packets received from the UE, and communicate the existence of the gap to the target base station, which may request retransmission of packets associated with the gap.

31 Claims, 27 Drawing Sheets

Related U.S. Application Data filed on Nov. 17, 2014, provisional application No. 62/080,132, filed on Nov. 14, 2014, provisional application No. 62/080,179, filed on Nov. 14, 2014.

(56) References Cited

U.S. PATENT DOCUMENTS

| | | | |
|---|---|---|---|
| 2002/0091860 A1* | 7/2002 | Kalliokulju | H04W 36/0033 709/247 |
| 2003/0156559 A1* | 8/2003 | Yi | H04W 36/10 370/331 |
| 2008/0123660 A1* | 5/2008 | Sammour | H04L 47/10 370/395.21 |
| 2009/0022107 A1* | 1/2009 | Kapoor | H04W 36/0055 370/331 |
| 2009/0040982 A1* | 2/2009 | Ho | H04L 1/1874 370/331 |
| 2009/0109924 A1 | 4/2009 | Sato | |
| 2009/0161547 A1* | 6/2009 | Riddle | G06F 9/526 370/236 |
| 2010/0027497 A1* | 2/2010 | Pelletier | H04W 28/06 370/329 |
| 2011/0093754 A1* | 4/2011 | Chun | H04L 1/1635 714/748 |
| 2012/0163161 A1* | 6/2012 | Zhang | H04L 1/1874 370/216 |
| 2012/0190371 A1* | 7/2012 | Wu | H04W 36/0011 455/437 |
| 2012/0202491 A1* | 8/2012 | Fox | H04B 7/2609 455/435.1 |
| 2012/0275424 A1* | 11/2012 | Chen | H04W 28/06 370/329 |
| 2012/0294444 A1* | 11/2012 | Feng | H04W 12/04 380/270 |
| 2013/0035106 A1* | 2/2013 | Hans | H04W 28/06 455/452.1 |
| 2013/0170435 A1* | 7/2013 | Dinan | H04L 45/50 370/328 |
| 2014/0211620 A1* | 7/2014 | Kubota | H04L 69/04 370/230 |
| 2014/0269605 A1* | 9/2014 | Pecen | H04W 56/00 370/330 |
| 2014/0302853 A1* | 10/2014 | Militano | H04W 36/0055 455/436 |
| 2014/0321263 A1* | 10/2014 | Wu | H04W 76/19 370/216 |
| 2015/0004984 A1* | 1/2015 | Kim | H04W 36/0016 455/440 |
| 2015/0326695 A1* | 11/2015 | Pang | H04L 69/04 370/477 |
| 2016/0242097 A1* | 8/2016 | Dinan | H04L 45/50 |

OTHER PUBLICATIONS

ISA/EPO, International Search Report and Written Opinion of the International Searching Authority, Int'l Appl. No. PCT/US2015/060690, dated Apr. 8, 2016, European Patent Office, Rijswijk, NL, 12 pgs.

* cited by examiner

DATA COMPRESSION TECHNIQUES FOR HANDOVER AND RADIO LINK FAILURE RECOVERY

CROSS REFERENCES

The present application for patent claims priority to U.S. Provisional Patent Application No. 62/107,278 by Balasubramanian et al., entitled "Data Compression Techniques For Handover And Radio Link Failure Recovery," filed Jan. 23, 2015, U.S. Provisional Patent Application No. 62/080,885 by Balasubramanian et al., entitled Techniques For Managing Downlink Communication During Handover And Radio Link Failure Recovery For Evolved Data Compression Scheme (eDCS)," filed Nov. 17, 2014, U.S. Provisional Patent Application No. 62/080,179 by Balasubramanian et al., entitled "eDCS With Connection Establishment," filed Nov. 14, 2014, and U.S. Provisional Patent Application No. 62/080,132 by Balasubramanian et al., entitled "Data Compression Techniques For Handover And Radio Link Failure Recovery," filed Nov. 14, 2014, assigned to the assignee hereof, and expressly incorporated by reference herein.

BACKGROUND

The present disclosure, for example, relates to wireless communication systems, and more particularly to data compression techniques for handover and radio link failure in long term evolution (LTE) wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

In some cases, a UE may be transferred from a serving base station (known as the "source" base station) to another base station (known as the "target" base station). For example, the UE may be moving into the coverage area of the target base station, or the target base station may be capable of providing better service for the UE or relieving the source base station of excess load. The transition may be referred to as a "handover." In some cases, following a handover, a target base station and a UE may need to synchronize various items of information in order to establish efficient communications. Reducing the time to establish such synchronization may enhance the overall efficiency of a wireless communication system.

SUMMARY

Systems, methods, and apparatuses for providing data compression of a source base station at a target base station following a handover. A UE and source base station may perform data compression on transmitted data packets using one or more data compression techniques. During a handover, the source base station may provide context information, including information regarding data compression, to a target base station, thus enabling the target base station to continue the data compression following the handover without having to reestablish the data compression context.

To facilitate handover, and to efficiently support communication with the UE before and after the handover, the source base station may determine data compression capabilities of the UE and the target base station. That is, the handover operations, and the manner in which the various entities associated with the handover (i.e., source, target, and UE) effect a handover, may depend on the data capabilities of the target base station. The source base station may communicate the determined data compression capabilities to the UE and target base station.

The source base station may determine one or more gaps in a sequence of packets received from the UE, and communicate the gap or gaps to the target base station. The UE may be directed to retransmit the packets associated with the gap or gaps to the target base station according to the same data compression techniques used for the original transmission of the packets. In some examples, a target base station may decompress the retransmitted packets. In certain examples, the target base station may forward the retransmitted packets to the source base station for decompression.

A method of wireless communication is described. The method may include determining that a handover of a user equipment (UE) to a target base station is to be performed, identifying at least one gap in a sequence of packets received from the UE, determining a data compression capability of the target base station and forwarding context information for the UE to the target base station, wherein the context information is based at least in part on the data compression capability of the target base station.

An apparatus for wireless communication is described. The apparatus may include means for determining that a handover of a user equipment (UE) to a target base station is to be performed, means for identifying at least one gap in a sequence of packets received from the UE, means for determining a data compression capability of the target base station and means for forwarding context information for the UE to the target base station, wherein the context information is based at least in part on the data compression capability of the target base station.

A further apparatus is described. The apparatus may include a processor, memory in electronic communication with the processor, and instructions stored in the memory. The instructions may be operable by the processor to cause the apparatus to determine that a handover of a user equipment (UE) to a target base station is to be performed, identify at least one gap in a sequence of packets received from the UE, determine a data compression capability of the target base station and forward context information for the UE to the target base station, wherein the context information is based at least in part on the data compression capability of the target base station.

A non-transitory computer readable medium for wireless communication is described. The non-transitory computer-readable medium may include instructions executable to determine that a handover of a user equipment (UE) to a target base station is to be performed, identify at least one gap in a sequence of packets received from the UE, determine a data compression capability of the target base station and forward context information for the UE to the target base station, where the context information is based on the data compression capability of the target base station.

In some examples of the methods, apparatuses, or non-transitory computer-readable media described herein, the sequence of packets received from the UE comprises uplink data packets, and the uplink data packets comprise information that is compressed according to a data compression routine.

In some examples of the methods, apparatuses, or non-transitory computer-readable media described herein, determining the data compression capability of the target base station comprises determining whether the target base station supports a same data compression routine as the source base station. In some examples of the methods, apparatuses, or non-transitory computer-readable media described herein, forwarding the context information comprises forwarding, to the target base station, compression state information associated with second packets sequenced after the at least one gap, and the compression state information facilitates decompression of the second packets.

In some examples of the methods, apparatuses, or non-transitory computer-readable media described herein, the context information comprises a status report indicative of the at least one gap in the sequence of data packets and compression state information associated with a data compression routine.

In some examples of the methods, apparatuses, or non-transitory computer-readable media described herein, forwarding the context information comprises forwarding a data compression buffer to the target base station, and the data compression buffer comprises a static data compression portion and a non-static data compression portion. The static portion may be associated with cell-specific data compression and the non-static portion may be associated with UE-specific data compression. In some examples, forwarding the data compression buffer to the target base station comprises forwarding the non-static data compression portion of the data compression buffer.

In some examples of the methods, apparatuses, or non-transitory computer-readable media described herein, determining the data compression capability of the target base station comprises determining that the target base station does not support a same data compression routine as the source base station. In some examples of the method, apparatus, or non-transitory computer-readable medium described herein, the context information comprises control information that comprises an identification of a latest sequential uplink packet before the at least one gap in the sequence of received uplink packets.

Some examples of the method, apparatus, or non-transitory computer-readable medium described herein may further include processes, features, means, or instructions for forwarding an indication of the at least one gap in the sequence of received uplink packets.

Some examples of the method, apparatus, or non-transitory computer-readable medium described herein may include processes, features, means, or instructions for determining that a first uplink packet received subsequent to at least one gap in a sequence of packets is uncompressed by a data compression routine. Some examples of the methods, apparatuses, or non-transitory computer-readable media described herein may further include processes, features, means, or instructions for forwarding the first uplink packet to the target base station.

In some examples of the methods, apparatuses, or non-transitory computer-readable media described herein, the sequence of packets received from the UE comprises acknowledgment information for a sequence of downlink data packets received from the source base station, the sequence of downlink data packets comprising information that is compressed according to the data compression routine. In some examples, identifying the at least one gap in the sequence of packets received from the UE comprises identifying an unacknowledged downlink data packet.

In some examples of the methods, apparatuses, or non-transitory computer-readable media described herein, determining the data compression capability of the target base station comprises determining whether the target base station supports a same data compression routine as the source base station. Some examples of the methods, apparatuses, or non-transitory computer-readable media described herein may further include processes, features, means, or instructions for forwarding, to the target base station, the unacknowledged downlink data packet and one or more downlink data packets subsequent to the unacknowledged downlink data packet for retransmission to the UE according to the data compression routine.

Some examples of the methods, apparatuses, or non-transitory computer-readable media described herein may further include processes, features, means, or instructions for transmitting a handover message to the UE indicating that the target base station is to be used for subsequent communications, and the handover message comprises an indication that the target base station supports the data compression routine used by the source base station and the UE, where the indication is based on determining that the data compression capabilities of the target base station are compatible with data compression capabilities of the source base station.

In some examples of the methods, apparatuses, or non-transitory computer-readable media described herein, the handover message comprises a command to the UE to retransmit a packet associated with the at least one gap.

Some examples of the methods, apparatuses, or non-transitory computer-readable media described herein may further include processes, features, means, or instructions for transmitting a data compression capability of the UE to the target base station.

A method of wireless communication is described. The method may include receiving a handover indication that a UE is to be handed over from a source base station, transmitting data compression capabilities to the source base station, receiving context information for the UE from the source base station, and the context information identifies at least one gap in a sequence of packets sent by the UE to the source base station and transmitting to the UE based at least in part on the context information.

An apparatus for wireless communication is described. The apparatus may include means for receiving a handover indication that a UE is to be handed over from a source base station, means for transmitting data compression capabilities to the source base station, means for receiving context information for the UE from the source base station, wherein the context information identifies at least one gap in a sequence of packets sent by the UE to the source base station and means for transmitting to the UE based at least in part on the context information.

A further apparatus is described. The apparatus may include a processor, memory in electronic communication with the processor, and instructions stored in the memory. The instructions may be operable by the processor to cause the apparatus to receive a handover indication that a UE is to be handed over from a source base station, transmit data compression capabilities to the source base station, receive context information for the UE from the source base station, wherein the context information identifies at least one gap in a sequence of packets sent by the UE to the source base station and transmit to the UE based at least in part on the context information.

A non-transitory computer readable medium for wireless communication is described. The non-transitory computer-readable medium may include instructions executable to receive a handover indication that a UE is to be handed over from a source base station, transmit data compression capabilities to the source base station, receive context information for the UE from the source base station, where the context information identifies at least one gap in a sequence of packets sent by the UE to the source base station and transmit to the UE based on the context information.

In some examples of the methods, apparatuses, or non-transitory computer-readable media described herein, the data compression capabilities of the target base station are compatible with data compression capabilities of the source base station, and where the context information comprises data compression context information for the UE.

In some examples of the methods, apparatuses, or non-transitory computer-readable media described herein, the data compression context information is used for processing a packet associated with the at least one gap in the sequence of packets sent by the UE to the source base station.

In some examples of the methods, apparatuses, or non-transitory computer-readable media described herein, transmitting to the UE comprises transmitting a status message that identifies the at least one gap in the sequence of packets sent by the UE to the source base station.

In some examples of the methods, apparatuses, or non-transitory computer-readable media described herein, the sequence of packets sent by the UE to the source base station comprises a sequence of uplink data packets, where the uplink data packets comprise information that is compressed according to the data compression routine, and where receiving the context information comprises receiving additional packets that arrived at the source base station subsequent to the at least one gap in the sequence of the uplink packets. Some examples of the methods, apparatuses, or non-transitory computer-readable media described herein may further include processes, features, means, or instructions for receiving a data compression buffer from the source base station, the data compression buffer for use in decompressing data contained in an uplink packet associated with the at least one gap.

In some examples of the methods, apparatuses, or non-transitory computer-readable media described herein, the data compression buffer comprises a static data compression portion and a non-static data compression portion.

Some examples of the methods, apparatuses, or non-transitory computer-readable media described herein may further include processes, features, means, or instructions for receiving the data compression buffer from the source base station comprises receiving the non-static data compression portion of the data compression buffer.

In some examples of the methods, apparatuses, or non-transitory computer-readable media described herein, the sequence of packets sent by the UE to the source base station comprises acknowledgment information for a sequence of downlink data packets sent by the source base station to the UE, the sequence of downlink data packets comprising information that is compressed according to the data compression routine, the method further comprising receiving a downlink data packet associated with the at least one gap in the sequence of downlink packets sent by the source base station to the UE and one or more data packets subsequent to the first gap in the sequence of downlink packets sent by the source base station to the UE.

In some examples of the methods, apparatuses, or non-transitory computer-readable media described herein, transmitting to the UE comprises retransmitting to the UE one or more of the received downlink data packets according to the data compression routine.

In some examples of the methods, apparatuses, or non-transitory computer-readable media described herein, the data compression capabilities of the target base station are different from the data compression capability of the source base station.

In some examples of the methods, apparatuses, or non-transitory computer-readable media described herein, transmitting to the UE comprises transmitting a status message that identifies the at least one gap in the sequence of data sent by the UE to the source base station.

In some examples of the methods, apparatuses, or non-transitory computer-readable media described herein, the context information comprises an indication of a latest sequential packet in the sequence of data sent by the UE to the source base station.

In some examples of the methods, apparatuses, or non-transitory computer-readable media described herein, transmitting to the UE comprises transmitting a status message to the UE, the status message comprising an identification of one or more packets subsequent to the latest sequential packet that are to be retransmitted.

Some examples of the methods, apparatuses, or non-transitory computer-readable media described herein may further include processes, features, means, or instructions for receiving, from the source base station, a downlink data packet unacknowledged by the UE and one or more downlink data packets of the sequence of packets. In some examples of the methods, apparatuses, or non-transitory computer-readable media described herein, and transmitting to the UE comprises transmitting the one or more downlink data packets to the UE.

A method of wireless communication is described. The method may include transmitting packets to a source base station, receiving a handover message from the source base station that indicates subsequent communications are to be transmitted to a target base station, the handover message including an indication of data compression capabilities of the target base station and receiving a transmission from the target base station, and the transmission is based at least in part on the data compression capabilities of the target base station.

An apparatus for wireless communication is described. The apparatus may include means for transmitting packets to a source base station, means for receiving a handover message from the source base station that indicates subsequent communications are to be transmitted to a target base station, the handover message including an indication of data compression capabilities of the target base station and means for receiving a transmission from the target base station, and the transmission is based at least in part on the data compression capabilities of the target base station.

A further apparatus is described. The apparatus may include a processor, memory in electronic communication with the processor, and instructions stored in the memory. The instructions may be operable by the processor to cause the apparatus to transmit packets to a source base station, receive a handover message from the source base station that indicates subsequent communications are to be transmitted to a target base station, the handover message including an indication of data compression capabilities of the target base station and receive a transmission from the target base station, wherein the transmission is based at least in part on the data compression capabilities of the target base station.

A non-transitory computer readable medium for wireless communication is described. The non-transitory computer-readable medium may include instructions executable to transmit packets to a source base station, receive a handover message from the source base station that indicates subsequent communications are to be transmitted to a target base station, the handover message including an indication of data compression capabilities of the target base station and receive a transmission from the target base station, where the transmission is based on the data compression capabilities of the target base station.

In some examples of the methods, apparatuses, or non-transitory computer-readable media described herein, transmitting packets to the source base station comprises transmitting a sequence of packets to the source base station, the packets comprising data that is compressed according to a data compression routine.

In some examples of the methods, apparatuses, or non-transitory computer-readable media described herein, receiving the transmission from the target base station comprises receiving a status report that identifies at least one gap in the sequence of packets that were received at the source base station.

Some examples of the methods, apparatuses, or non-transitory computer-readable media described herein may further include processes, features, means, or instructions for retransmitting the at least one packet identified by the status report, the retransmitted packet comprising data that is compressed according to data compression capabilities of the target base station.

In some examples of the methods, apparatuses, or non-transitory computer-readable media described herein, retransmitting the at least one packet identified by the status report comprises retransmitting uncompressed data in the at least one packet, where the handover message comprises an indication that the target base station does not support a data compression routine.

In some examples of the methods, apparatuses, or non-transitory computer-readable media described herein, the status report identifies a latest sequential packet in an ordered sequence of data packets.

Some examples of the methods, apparatuses, or non-transitory computer-readable media described herein may further include processes, features, means, or instructions for retransmitting packets subsequent to the latest sequential packet identified by the status report to the target base station.

In some examples of the methods, apparatuses, or non-transitory computer-readable media described herein, transmitting packets to the source base station comprises transmitting an acknowledgment for each packet in a sequence of downlink packets received from the source base station, the sequence of received downlink packets comprising data that is compressed according to a data compression routine.

Some examples of the methods, apparatuses, or non-transitory computer-readable media described herein may further include processes, features, means, or instructions for transmitting a status report to the target base station, the status report indicating at least one gap in the sequence of received downlink data packets.

In some examples of the methods, apparatuses, or non-transitory computer-readable media described herein, receiving the transmission from the target base station comprises receiving one or more retransmitted packets identified by the status report, the retransmitted packets comprising data that is compressed by the target base station according to the data compression routine.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
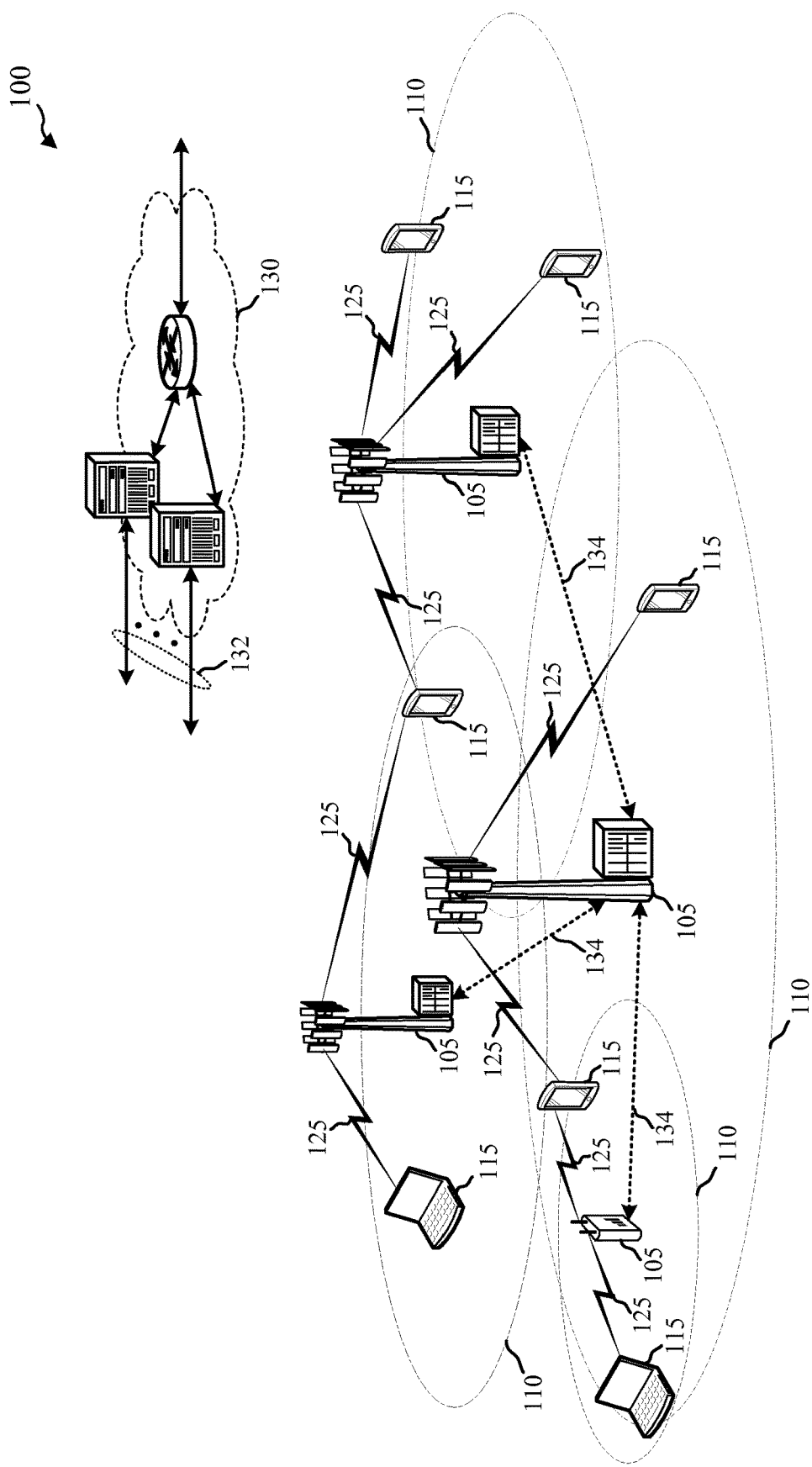
FIG. 1 shows a block diagram of a wireless communication system in accordance with various aspects of the present disclosure.

The present disclosure relates to enhancing network throughput, performance, and efficiency in wireless communications system through data compression techniques applied to handover and radio link failure operations. A UE and source base station may communicate using data compression for packets transmitted between one another, which may include those storing data compression buffers for an evolved data compression scheme (eDCS) between the UE and source base station. It may be determined that a handover of the UE from the source base station to a target base station will occur.

The source base station may determine the data compression capabilities of the target base station and transmit context information to the target base station based on the data compression capabilities of the target base station. By way of example, the context information may include packet data convergence protocol (PDCP) packets in a sequence of PDCP packets transmitted by the UE and information on one or more gaps in received packets of the sequence of packets. The context information may also include information on one or more gaps in a sequence of acknowledgments received from the UE, the one or more gaps indicating gaps in the reception of the sequence of data packets at the UE. The context information may also include data compression buffer information when the target base station has capabilities to perform data compression techniques of the source base station. In some examples, the context information includes an eDCS buffer, which may be referred to as a non-static buffer, or a static buffer, or both.

A handover command may be transmitted to the UE indicating the handover to the target base station and data compression capabilities of the target base station and, in some examples, may include an indication of data compression capabilities of the target base station. In certain examples, the handover command may not indicate the data compression capabilities of the target base station and the UE and target base station may communicate and determine that data compression may be continued based on compression context provided to the target base station from the source base station or the UE.

When a base station initiates a handover for a UE, the target base station and the UE may reduce delay associated with reestablishing data compression buffers, therefore providing more efficient communications more quickly with the target base station. This may mitigate the impact of a handover on the end user by reducing the disruption in data transmission. For example, if the UE is engaged in delay sensitive communications, Quality-of-Service (QoS) standards may be impacted by a handover delay and the techniques described in this disclosure may provide enhanced QoS for the UE.

In certain examples, the source base station may transmit control information instead of data compression context to the target base station. The control information may indicate packets that are to be retransmitted by the UE following a reset of compression context. In some examples, data compression context may be updated based on retransmitted packets and subsequent transmitted packets, or may be may be updated based on retransmitted packets and one or more packets subsequent to a gap that were not compressed by the UE during an initial transmission and that do not need to be retransmitted. In some examples, the source base station may not transmit the control information, and the UE may retransmit all packets for which a packet data protocol convergence (PDCP) discard timer has not expired and that have not been acknowledged by the receiver.

In some examples, maintaining the data compression buffers across radio resource control (RRC) connection setups may help maintain efficient data compression performance, which may include RRC connections at different base stations. It may therefore aid compression performance for a target base station to retrieve data compression context information from a source base station when the target establishes an RRC connection with the UE. That is, compression performance may be aided when buffers are maintained for a UE following an idle mode mobility procedure.

For example, a UE communicating with a source base station utilizing a data compression scheme may receive a context identifier associated with the data compression scheme. After transitioning to an idle mode and then camping on and reselecting a target base station, the UE may transmit the context identifier to the target. The target base station may use the context identifier to request data compression context information from the source base station, which may be passed to the target base station, and subsequently used by the target base station to communicate with the UE. In other words, buffers may be maintained across RRC connection setups associated with idle mode mobility procedures, and a UE and target base station may communicate using the same data compression scheme and according to the same data compression context information, as the UE and the source base station. A wireless communications system which employs such techniques for data compression may experience increased system capacity (e.g., by accommodating higher bandwidth and increased number of users), faster data exchange (e.g., quicker web page downloads), improved call setup (e.g., during cell edge scenarios when handover may occur during call setup), and UE transmit power benefits.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. In some examples, the core network 130 may also manage or activate aspects of data compression schemes (e.g., eDCS) utilized with the wireless communications system 100. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In instances where a UE 115 may move between coverage areas, the base station 105 serving the UE 115 (i.e., the source base station) may perform a handover procedure to allow the UE 115 to begin communications with an adjacent base station 105 (i.e., the target base station). Such handover procedures may be performed according to established techniques to provide mobility to UEs 115 within the wireless communications system 100. In other instances, a UE 115 may be in an idle mode, and may transition between base stations 105. This may involve a UE 115 camping on and reselecting a target or destination base station 105, with which the UE 115 establishes a new RRC connection (e.g., "sets up" an RRC connection). In some cases, reselection may also occur after a radio link failure (RLF).

According to various examples of the present disclosure, a source base station 105 may establish communications with a UE 115 and may initiate an eDCS techniques to enhance, for example, data rates for the communications. Such eDCS techniques may include data compression according to one or more data compression algorithms. Other eDCS techniques may include data compression using string matches for consecutive transmitted packets. In some examples, eDCS context information may be used to compress and decompress such packets. Such eDCS context may include, for example, a data compression buffer that includes information on string matches that is updated for each transmitted packet and used for compression and decompression of packets.

A UE 115 may compress one or more data packets prior to transmitting the data packets to a base station 105, and the base station 105 may receive the compressed packets, decompress the packets, and perform various further operations on the data packets. Similarly, a base station 105 may compress one or more data packets prior to transmitting the data packets to a UE 115, and the UE 115 may receive the compressed packets, decompress the packets, and perform various further operations on the data packets. In order to reliably compress and decompress such packets, both the UE 115 and base station 105 may operate according to the same data compression routines. Furthermore, such data compression routines may become more efficient as more data is processed. Thus, a data compression routine that initiates from a "cold start" may take more time to achieve a same level of compression compared to a same data compression routine that initiates from a "warm start."

A warm start—i.e., a scenario in which communication following a handover uses compressed data—may be accomplished by providing access to a data compression buffer that includes information that may be used for data compression by the data compression routine. According to various aspects of the present disclosure, techniques for handover of a UE 115 may allow for continued use of data compression techniques after handover as were used prior to handover. Furthermore, in certain examples, a warm start may be achieved following a radio link failure or across different radio resource control (RRC) connections through use of compression buffers that were previously used by the base station and UE.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100, and base stations 105 and UEs 115 within the wireless communications system 100, may be configured to communicate utilizing eDCS. For example, both base stations 105 and UEs 115 may be equipped with eDCS buffers, as described below. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier, or component carrier associated with a base station, or a coverage area (e.g., sector, etc.) of a carrier or base station, depending on context.

A macro cell may be a base station that generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. In some examples, data compression techniques may be implemented between the PDCP and RLC layers such that data packets from the PDCP layer may be compressed and provided to the RLC layer. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some cases, a UE 115 may determine that a radio link has failed and initiate a RLF procedure. For example, an RLF procedure may be triggered upon an RLC indication that a maximum number of retransmissions has been reached, upon receiving a maximum number of out-of-sync indications, or upon radio failure during a random access channel (RACH) procedure. In some cases (e.g., after reaching the limit for out-of-sync indications) a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure to regain access to network. The RACH procedure may include transmitting an RRC connection re-establishment request including the C-RNTI, the cell identification (ID), security verification information, and a cause for re-establishment. The base station 105 receiving the request may respond with either an RRC connection re-establishment message or an RRC connection re-establishment rejection. The RRC connection re-establishment message may contain parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

In some examples, as part of an RRC connection establishment or re-establishment (e.g., following a mobility procedure or RLF), a UE 115 may request data compression support at a base station 105. This may include requesting a transfer of data compression context information from a source base station 105 with which UE 115 was previously communicating utilizing a data compression scheme. A target base station 105 may signal its data compression capability, as well as its ability to retrieve context information from a source base station 105.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

According to the present disclosure, a base station 105 may determine that a handover is in order for a particular UE 115, and may initiate a handover procedure. The base station 105 may, for example, determine that the UE 115 is likely to exit a coverage area 110 or that another base station 105 may be able to provide better services to the UE 115. In some examples, a handover may be initiated by a UE 115. In some cases, a handover may be initiated by a UE 115. In some examples, a data compression (eDCS) buffer may be provided as part of the handover procedure in order to allow the UE 115 to continue using data compression techniques both before and after the handover.

Additionally, UEs 115 and base stations 105 may utilize context checkpoints to synchronize data compression buffers. A target base station 105 may thus indicate its data compression capability utilizing a context checkpoint identifier. A UE 115 may signal its ability to synchronize data compression buffers (e.g., "rollback" to a particular context checkpoint). When a UE 115 and a base station 105 are unable to synchronize data compression buffers to a particular checkpoint, they may reset their buffers (e.g., restart the buffer population) to a known initialization point. UEs 115 may maintain, in some examples, several context checkpoints. This may include a UE 115 caching earlier checkpoints to allow it to rollback as necessary, and a checkpoint corresponding to a current data compression buffer context. This ability to rollback to a specific data compression context or to reset data compression context may provide for flexible data compression buffer management and may support continuity data compression schemes through mobility procedures, including idle mode mobility procedures. The described techniques may, however, also be applied within an established RRC connection. For instance, a UE 115 that briefly tunes away a source base station 105 or momentarily loses a connection (e.g., upon expiration of a T310 timer), may resynchronize data compression context by rolling back to a previously signaling checkpoint.

Figure 2A:
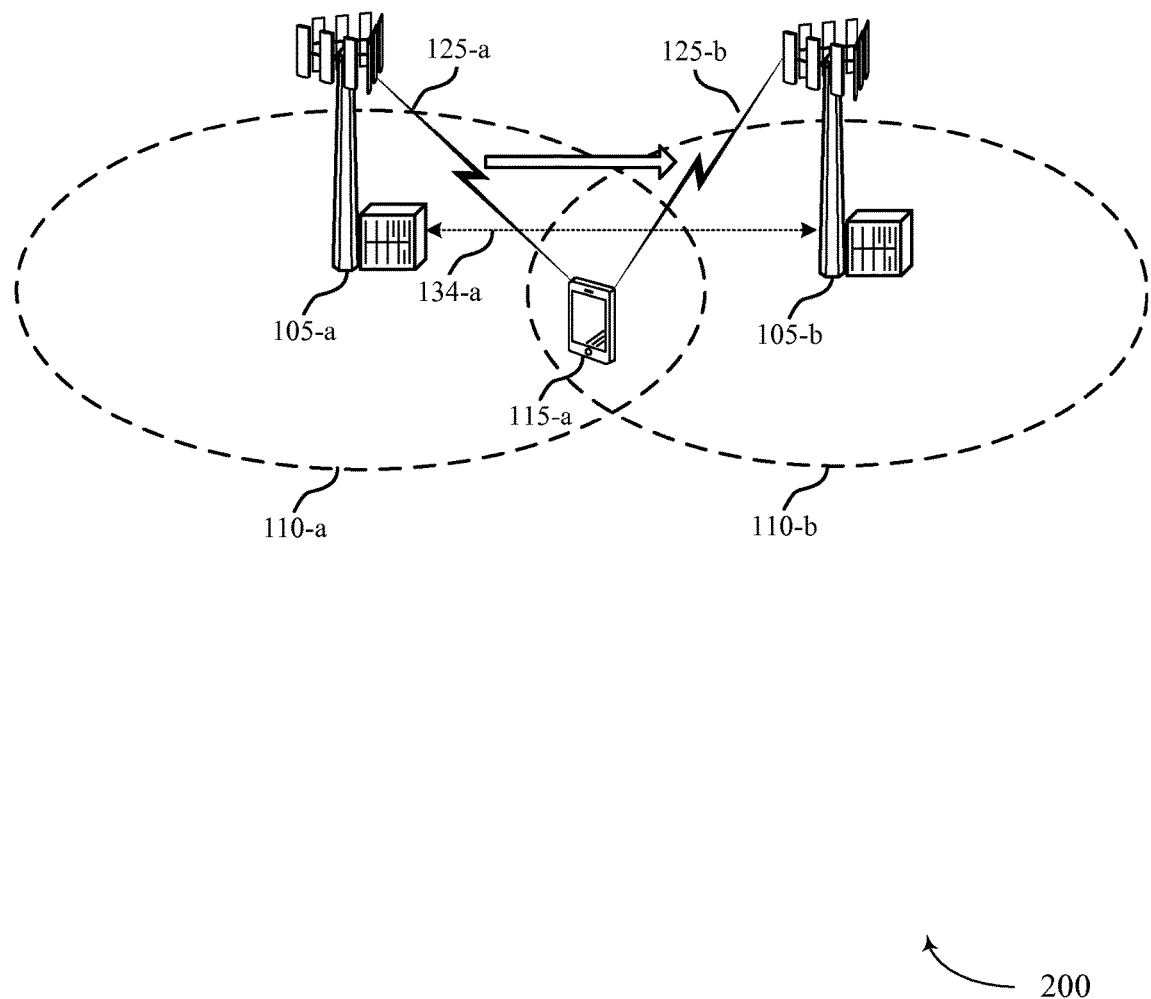
FIG. 2A illustrates an example of a wireless communication system for providing data compression of a source base station at a target base station following a handover in accordance with various aspects of the present disclosure.

FIG. 2A illustrates an example of a wireless communication system 200 for providing data compression being performed at a source base station that may be continued at a target base station following a handover in accordance with various aspects of the present disclosure. Wireless communication system 200 may include a UE 115-a, which may be an example of a UE 115 described above with reference to FIG. 1. Wireless communication system 200 may also include a base station 105-a and base station 105-b, which may be examples of base stations 105 described above with reference to FIG. 1.

Wireless communication system 200 illustrates an example of a handover from source base station 105-a to target base station 105-b. For example, UE 115-a may move from the coverage area 110-a of base station 105-a to coverage area 110-b of base station 105-b. A handover may also be initiated if base station 105-b can provide better service for UE 115-a or for reasons related to network load or inter-cell interference mitigation, for example. Wireless communication system 200 illustrates an example in which source base station 105-a communicates compressed data packets over wireless communication link 125-a for UE 115-a.

Prior to an inter-cell handover, source base station 105-a may configure a UE 115-a to use data compression procedures to enhance communications between the UE 115-a and source base station 105-a (e.g., by using data compression techniques such as eDCS). Source base station 105-a may determine the data compression capabilities of adjacent base station 105-b and may also determine data compression capabilities of other base stations 105 (not shown) of wireless communication system 200.

In the case of uplink, when handing over from source base station 105-a to target base station 105-b, UE 115-a may update its PDCP buffer with the last packet in a sequence of packets that are compressed and transmitted to the source base station 105-a using wireless communication link 125-a. The source base station 105-a may receive and decompress transmissions and place decompressed data packets into the source base station 105-a PDCP buffer. Each packet transmitted by the UE 115-a may include a PDCP sequence number (SN) that allows source base station 105-a to place received data packets in a proper order upon receipt. If there is a hole (as referred to as a gap) in a sequence of the received PDCP SNs at the source base station 105-a, a handover of the UE to target base station 105-b may result in a RLC reset, which may in turn trigger delivery of all the consecutive received packets to the upper layer and core network (e.g., core network 130 of FIG. 1). If the consecutive PDCP packets are compressed according to a eDCS routine at the UE, the target base station 105-b may be unable to decompress the data packets, as proper decompression relies on a synchronized eDCS buffer. In instances where a hole or gap in the sequence of received PDCP packets is present, forwarding by the source base station 105-a of received packets subsequent to the gap to the target base station 105-b may not be useful, as the eDCS buffer in target base station 105-b is not synchronized.

When UE 115-a is handed over to target base station 105-b, UE 115-a may continue to transmit compressed packets via wireless communication link 125-b to target base station 105-b. In some examples, source base station 105-a may handle the holes of gaps in received PDCP SNs when an RLC reset happens due to handover. In some examples, the target base station 105-b may synchronize with the source base station 105-a and with the UE 115-a in order to continue receiving compressed packets from the UE 115-a, and perform repopulation of the PDCP holes such as, for example, over backhaul link 134-a (e.g., an X2 link) between source base station 105-a and target base station 105-b. UE 115-a, in some examples, may start sending packets to target base station 105-b via wireless communication link 125-b. In some examples, if target base station 105-b supports the same eDCS routine as source base station 105-a, UE 115-a may be notified and continue eDCS operations. If target base station 105-b does not support the same eDCS routines as source base station 105-a, UE 115-a may be notified, and may disable eDCS, e.g., UE 115-a may send uncompressed transmissions to target base station 105-b In certain examples, the source base station 105-a may transmit control information and not data compression context to the target base station 105-b. The control information may indicate, for example, packets that are to be retransmitted by the UE 115-a following a reset of compression context. In some examples, data compression context may be updated based only on retransmitted packets and subsequent transmitted packets. In other examples, data compression context may be updated based on retransmitted packets and one or more packets subsequent to a gap that were not compressed by the UE 115-a during an initial transmission and that do not need to be retransmitted. In some examples, the source base station 105-a may not transmit the control information, and the UE 115-a will retransmit all packets for which a packet data protocol convergence (PDCP) discard timer has not expired and that have not been acknowledged by the receiver.

In the case of downlink, UE 115-a may update its PDCP buffer with the last packet in a sequence of packets received and decompressed from source base station 105-a using wireless communication link 125-a. Each packet transmitted by source base station 105-a may be properly ordered based on the included PDCP SN. The PDCP buffer at source base station 105-a may be updated based on the last packet transmitted from source base station 105-a to UE 115-a, and the PDCP buffer at UE 115-a may be based on the last packet received and decompressed at UE 115-a. As discussed above, if there is a gap in the received PDCP packets at UE 115-a, the handover may cause a RLC reset which may in turn trigger delivery of all the consecutive received packets to the upper layer at UE 115-a.

If consecutive PDCP packets are compressed packets, they may not be decompressed unless a data compression buffer between the source base station 105-a and the UE 115-a are synchronized. In operation, the source base station 105-a and the UE 115-a may continually update their respective compression buffers, and synchronization may be maintained. When UE 115-a receives packets, it may transmit an acknowledgment (ACK) to source base station 105-a to indicate a packet is successfully received. In the event source base station 105-a does not receive an ACK from UE 115-a for a particular packet upon the expiration of a timer, source base station 105-a may retransmit the packet. In the event that gaps in acknowledged packets are present upon a handover operation, the compression buffer of the target base station 105-b may not be synchronized with the compression buffer of the UE 115-a, and the target base station 105-b may not be able to send the compressed packets, as it does not have compression context and compression buffers to use for the transmission. Unacknowledged packets of the source base station 105-a may be provided to the target base station 105-b via a backhaul link 134-a (e.g., an X2 link), and in certain examples compression context information may also be provided to the target base station 105-b via the backhaul link 134-a.

The source base station 105-a may transmit, for example, the PDCP packet associated with the first gap in acknowledged PDCP packets, and each packet subsequent to the first gap, regardless of whether the packet has been acknowledged. Upon handover, UE 115-a may transmit status information (e.g., in a status protocol data unit (PDU)), which may include an indication of any gaps in received packets. In some examples, target base station 105-b may start transmitting packets that have a later PDCP SN than the first gap identified in the status information from UE 115-a, in which case UE 115-a may discard any earlier gaps and forwards the received packet to a PDCP layer for processing (which may result in a retransmission request for any missing PDCP SNs).

When UE 115-a is handed over to target base station 105-b, target base station 105-b may continue to transmit compressed packets via wireless communication link 125-b to UE 115-a, and also may retransmit one or more unacknowledged packets as compressed packets according to the compression used at the source base station 105-a. In some examples, target base station 105-b may synchronize with source base station 105-a and with UE 115-a in order to continue transmitting compressed packets to the UE 115-a and perform repopulation of the PDCP holes or gaps through retransmission of unacknowledged packets. In some examples, if target base station 105-b supports the same eDCS routine as source base station 105-a, UE 115-a may be notified and continue eDCS operations. If the target base station 105-b does not support the same eDCS routines as the source base station 105-a, the UE 115-a may be notified, may disable eDCS, and the target base station 105-b may retransmit a first unacknowledged packet along with all subsequent packets as uncompressed packets or according to an eDCS routine that is supported by the target base station 105-b.

In some examples, maintaining the data compression buffers across RRC connection setups may help maintain efficient data compression performance, which may include RRC connections at different base stations. It may therefore aid compression performance for a target base station to retrieve data compression context information from a source base station when the target establishes an RRC connection with the UE.

Figure 2B:
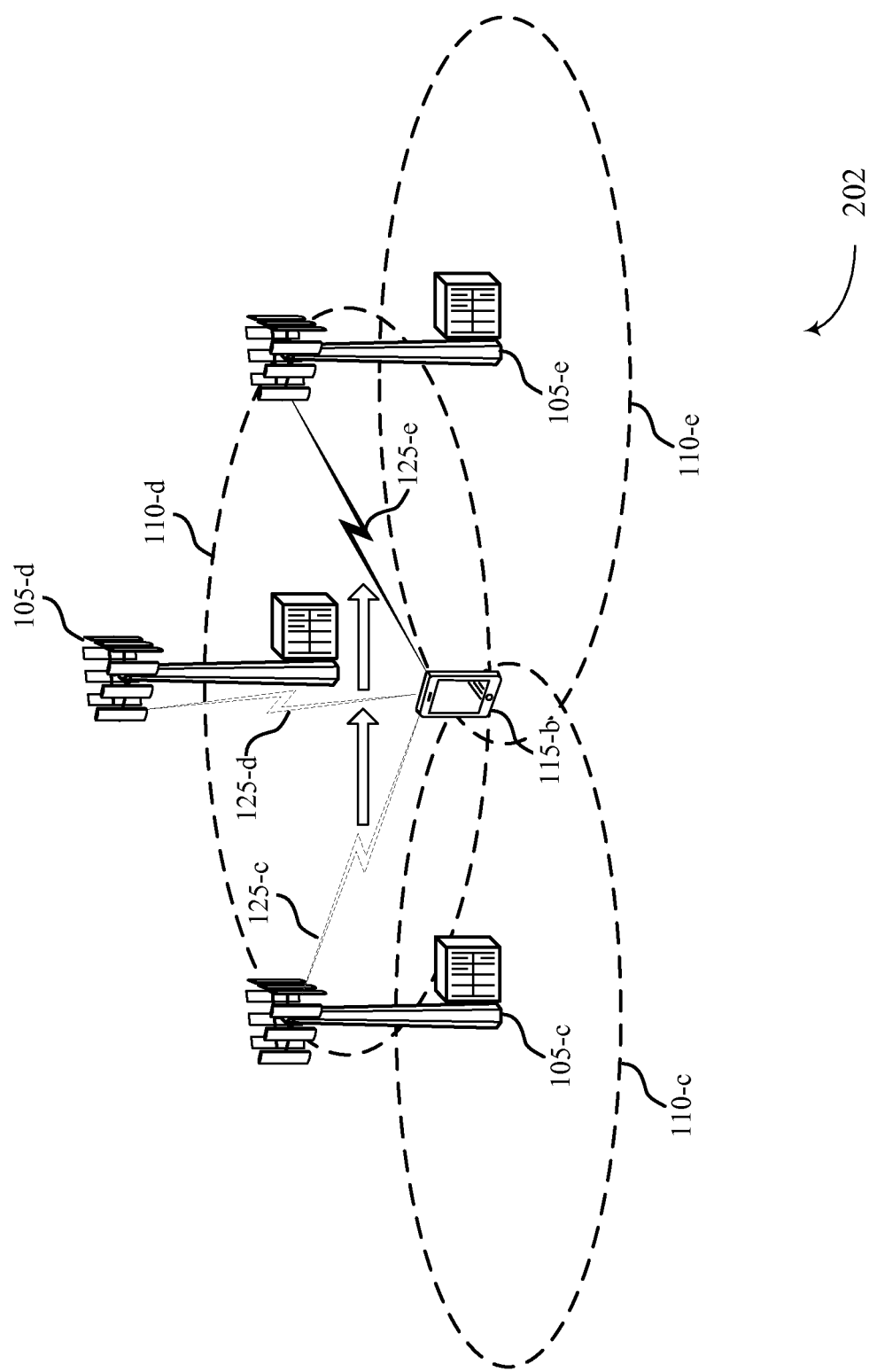
FIG. 2B illustrates an example of a wireless communication system for facilitating data compression through connection establishment procedure in accordance with various aspects of the present disclosure.

FIG. 2B illustrates an example of a wireless communication system 202 for facilitating data compression through a connection establishment procedure in accordance with various aspects of the present disclosure. Wireless communication system 202 may include a UE 115-b, which may be an example of a UE 115 described above with reference to FIGS. 1 and 2A. Wireless communication system 202 may also include a base station 105-c, a base station 105-d, and a base station 105-e, which may be examples of base stations 105 described above with reference to FIGS. 1 and 2A, and that, may have coverage areas 110. UE 115-b may communicate with base stations 105 via communication links 125.

In some examples, UE 115-b may be communicating with base station 105-c utilizing a data compression scheme, such as eDCS. As part of the data compression scheme, specific checkpoints may be created and communicated from the compressor (e.g., base station 105-c) to the decompressor (e.g., UE 115-b). These checkpoints may represent a "snap shot"—e.g., a specific configuration at a specific instance in time—of a data compression buffer. In some examples, the checkpoints represent data compression context information at a particular time. These checkpoints may be updated and earlier checkpoints—e.g., checkpoints representative of earlier context information—may be periodically discarded by a compressor or decompressor (e.g., base station 105-c or UE 115-b) as necessary. For instance, base station 105-c may maintain checkpoints for several UEs 115, and may discard "stale" checkpoints to address issues of limited data storage.

As discussed below, UE 115-b may use these checkpoints to synchronize data compression buffers with a target base station 105. That is, UE 115-b may "rollback" a buffer to the version indicated by a checkpoint identifier once UE 115-b determines a target base station received data compression context information corresponding to the checkpoint. In some examples, UE 115-b may regenerate a hash table used as part of the compression process based on the checkpoint. The UE 115-b may rely on the checkpoint for other synchronization features as well.

As depicted in FIG. 2B, UE 115-b may be communicating with base station 105-c via communication link 125-c, and UE 115-b may receive a context identifier from base station 105-c. The context identifier may provide information about base station 105-c, such as a cell identification number. In some examples, the context identifier also provides information about data compression context information at base station 105-c. For instance, the context identifier may correspond to a checkpoint of context information maintained in a buffer of base station 105-c.

UE 115-b may transition to an idle mode while communicating with base station 105-c. The UE 115-b may perform a mobility procedure and establish a connection with base station 105-d. For instance, UE 115-b may camp on and reselect base station 105-d, and UE 115-b may communicate with base station 105-d via communication link 125-d. This mobility procedure may, in some examples, be referred to as an idle mode handover. In some cases, only control information may be exchanged between base station 105-*d* and UE 115-*b*.

UE 115-*b* may perform a mobility procedure, such as a cell reselection, with base station 105-*e*. UE 115-*b* may transmit a context identifier received from base station 105-*c* to base station 105-*e*. This may occur as UE 115-*b* associates with or sets up its connection with base station 105-*e*. Base station 105-*e* may use the context information to determine a source base station 105 with data compression context information stored for UE 115-*b*. For example, base station 105-*e* may determine that UE 115-*b* was previously communicating with base station 105-*c* utilizing a data compression scheme, and base station 105-*e* may request the data compression context information from base station 105-*c*. This request may be via a backhaul link 134 (as shown in FIG. 1), such as an X2 interface.

In some cases, base station 105-*c* may provide the requested context information to base station 105-*e*, or base station 105-*c* may provide a message indicating that the requested context information is unavailable. The data compression context information may include a checkpoint or a checkpoint identifier, or both. If base station 105-*e* receives the data compression context information or a checkpoint, or both, base station 105-*e* may send an indication of its data compression capabilities, which may include a checkpoint identifier, to UE 115-*b*. In some cases, the indication of data compression capabilities also includes an indication of static buffer contents or context. In other examples, the indication of data compression capabilities provides an indication that base station 105-*e* is capable of eDCS, but that context of a previous eDCS session with another base station is unavailable. UE 115-*b* may thus learn the data compression capabilities and whether continuity of a data compression scheme is supported at base station 105-*e* upon receiving the indication of the data compression capability (e.g., a checkpoint identifier) from base station 105-*e*.

In scenarios in which base station 105-*e* is able to retrieve data compression context information from another base station 105, and when base station 105-*e* provides a checkpoint identifier to UE 115-*b*, UE 115-*b* may utilize the checkpoint identifier to synchronize data compression context information with base station 105-*e*. If base station 105-*e* is unable to retrieve data compression context information, or if UE 115-*b* is otherwise unable to synchronize context information with base station 105-*e*, UE 115-*b* and base station 105-*e* may each reset data compression context information, refresh data compression buffers, and begin a new data-compression-supported communication session.

In some examples, UE 115-*b* moves quickly between connections with base stations 105. For instance, UE 115-*b* may be in car traveling through coverage areas 110 of base stations 105. UE 115-*b* may thus not provide a context identifier to each base station 105 with which it establishes a connection. Rather, in some examples, a triggering event may cause UE 115-*b* to transmit a context identifier to a target base station 105 in order to cause the target base station 105-*e* to retrieve context information. Or, in some examples, a network configuration of the system 202 may trigger a target base station 105 to retrieve context information for a UE 115-*b*.

Because a base station 105 may request context information from many or all of the other base stations 105 within system 202, context information need not, in some cases, be passed to each base station 105 with which UE 115-*b* communicates. For example, this may unnecessarily increase the number of connection setups with the system 202 to simply move data compression context information. UE 115-*b* may thus request context information retrieval opportunistically, which may allow data compression buffers to be updated at various base stations 105 as necessary. This may, however, cause UE 115-*b* to check on data compression context information with each RRC connection establishment, even when, for instance, UE 115-*b* has not moved from a base station 105 with which UE 115-*b* was previously associated. In some cases, UE 115-*b* may also need to check whether eDCS will be employed for an existing RRC connection.

A variety of triggering events may be used to manage context information retrieval. For instance, UE 115-*b* may request a data compression context information retrieval (e.g., transmit a context identifier) based on real traffic, such as a received page or a mobile originated (MO) message at UE 115-*b*. In other examples, information learned or known by UE 115-*b* may be used—e.g., if UE 115-*b* typically camps on a given base station 105 for long durations, UE 115-*b* may request a context information retrieval without a predicate page or MO message. In other examples, a network subscription for UE 115-*b* may govern or trigger context information retrieval. For instance, a user of UE 115-*b* may pay a premium for eDCS within system 202, in which case, UE 115-*b* may transmit context identifiers (e.g., context information retrieval requests) for each base station 105 at which UE 115-*b* connects.

In some examples, the system 202 operator may impose a time limit for maintaining context information at a base station 105. Accordingly, if UE 115-*b* remains idle for some threshold period of time and a network timer expires, context information may be unavailable for subsequent requests. But in some examples, so long as a base station 105 is data-compression-enabled, UE 115-*b* may, as discussed below, be able to reference static context information, which may not be UE-specific. In other words, context information may include static and non-static portions.

A non-static portion may relate to a particular UE's use or network access. For instance, data associated with a website that a UE accesses may be retained in a non-static portion of a buffer. By contrast, static context information may not be UE-specific, but may be associated with information that is more broadly applicable to several UEs. For instance, static context information may be associated with data frequently accessed within a particular cell (e.g., a website or data base for a business in the proximity of the cell). Static context information may thus be associated with cell-specific, rather than UE-specific, data.

Figure 3A:
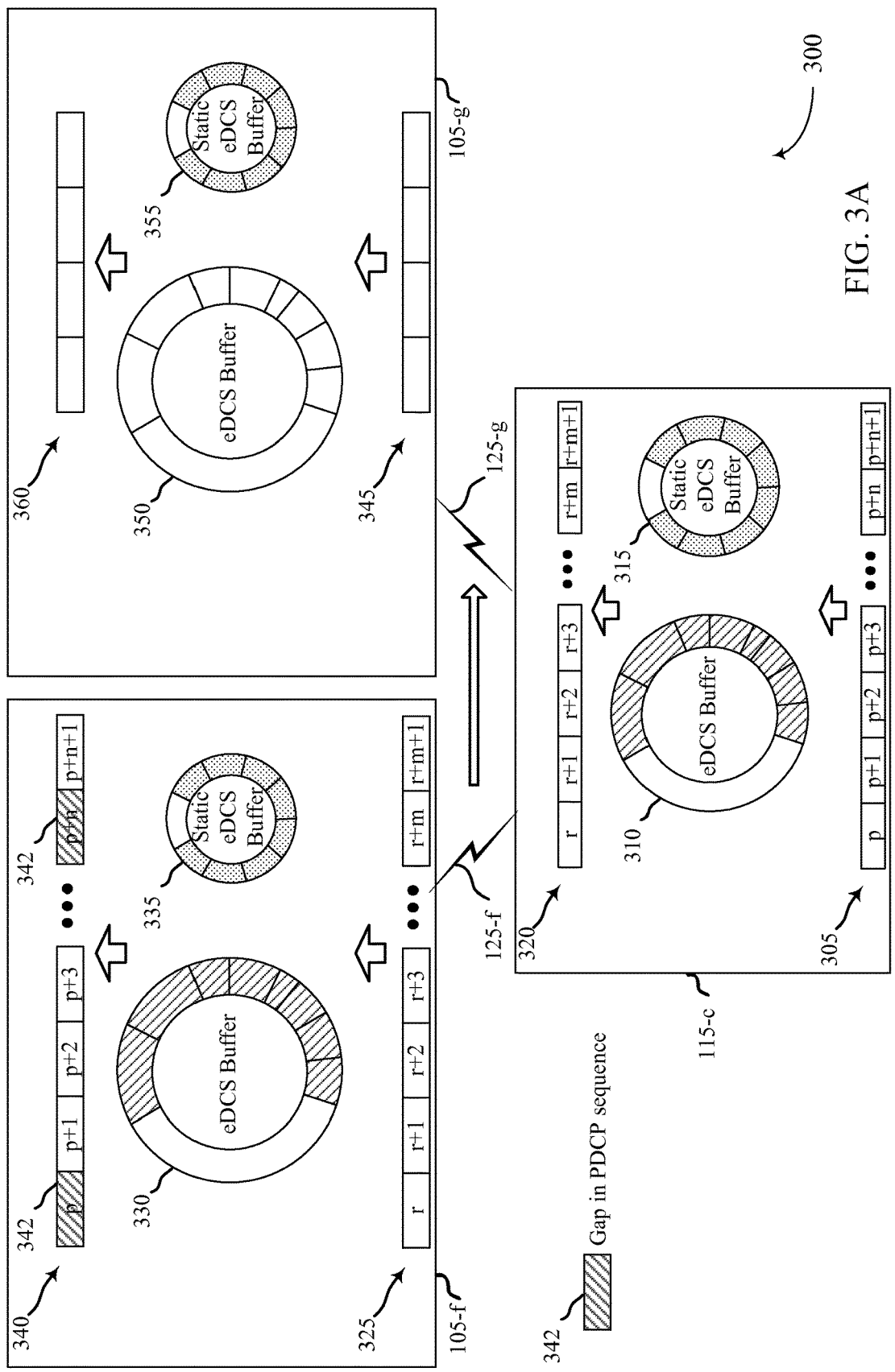
FIGS. 3A-3C illustrate an example of a wireless communication system for facilitating data compression at a target base station following a handover in accordance with various aspects of the present disclosure.

FIG. 3A illustrates an example of a wireless communication system 300 for facilitating uplink data compression at a target base station 105-*g* following a handover in accordance with various aspects of the present disclosure. Wireless communication system 300 may include a UE 115-*c*, which may be an example of a UE 115 described above with reference to one or more of FIG. 1, 2A, or 2B. Wireless communication system 300 may also include a source base station 105-*f* and target base station 105-*g*, which may be examples of base station 105 described above with reference to one or more of FIG. 1, 2A, or 2B.

Wireless communication system 300 illustrates an example of a handover from source base station 105-*f* to target base station 105-*g*. For example, UE 115-*c* may move from the coverage area of source base station 105-*f* to the coverage area of target base station 105-*g*. Similarly as discussed above, a handover also may be initiated if base station 105-*g* can provide better service for UE 115-*c* or for reasons related to network load or inter-cell interference mitigation, for example. Wireless communication system 300 illustrates an example in which base station 105-*f* communicates using compressed data packets over wireless communication link 125-*f* with UE 115-*c*.

Prior to an inter-cell handover, source base station 105-*f* may configure a UE 115-*c* to use data compression procedures to enhance communications between the UE 115-*c* and source base station 105-*f* (e.g., by using data compression techniques). Within UE 115-*c*, data packets are received at a PDCP buffer 305 and passed into eDCS buffer 310 which, in some examples, may include a static eDCS buffer 315. When the PDCP buffer 305 data packets (p through p+n+1) are passed into the eDCS buffer 315, the packets may be compressed according to a compression scheme that has been configured by the source base station 105-*f*. In some examples, as noted, a static eDCS buffer 315 may be provided that may be used for compression of, for example, data packets associated with particular data sources. For example, static eDCS buffer 315 may provide compression information for data packets from a specific sports or news website, and when a user of the UE 115-*c* accesses such a website, the data compression routines may immediately use the information in the static eDCS buffer 315 for compression. The data packets then move from the eDCS buffers 310, 315 to RLC buffer 320 for transmission via wireless communication link 125-*f* to source base station 105-*f*.

Within source base station 105-*f*, data packets may be received via wireless communication link 125-*f* into base station RLC buffer 325. From the RLC buffer 325, the data packets are provided to eDCS buffer 335 and/or static eDCS buffer 335 for decompression, and are then placed into PDCP buffer 340. The source base station 105-*f* may analyze PDCP SNs of packets in the PDCP buffer and determine whether any gaps in the PCDP sequence are present. In the example of FIG. 3A, two gaps 342 in packets received into the PDCP buffer 340 are present at packet p, and at packet p+n. Such gaps 342 may be the result of one or more various factors, such as interference or poor channel conditions, for example. The source base station 105-*f*, in the normal course of communications with UE 115-*c*, may request retransmission of any packets that correspond to the gaps 342 in the sequence of PDCP buffer 340 packets received at the source base station 105-*f*. The UE 115-*c* may perform the same compression techniques using the UE eDCS buffer 310 and UE static eDCS buffer 315 for the retransmitted packets.

In the event of a handover to target base station 105-*g*, the UE 115-*c* may discontinue communications with source base station 105-*f* and begin communications with target base station 105-*g* via communications link 125-*g*. The target base station 105-*g* may have the same data compression capabilities as the source base station 105-*f*, may have different data compression capabilities as the source base station 105-*f*, or may not support data compression for the UE 115-*c* at all. In the example of FIG. 3A, the target base station 105-*g* may support data compression, and have a similar architecture as source base station 105-*f* in that data packets may be decoded from the wireless communication link 125-*g* and moved into RLC buffer 345. Data packets from the RLC buffer 345 may be moved to eDCS buffer 350 and/or static eDCS buffer 355, decompressed, and then moved to PDCP buffer 360.

As mentioned above, a number of different scenarios may be present at an inter-base station handover. One possibility is that UE 115-*c* is in RRC connected mode and using data compression techniques in communications with source base station 105-*f*, the handover may be to base station 105-*g* that is not capable of compression and thus not capable of data compression techniques. In some examples, UE 115-*c* may indicate data compression compatibility through a signaling radio bearer (SRB) RRC transmission. If target base station 105-*g* does not support such data compression, the target base station 105-*g* will not configure the UE 115-*d* for data compression, and the UE 115-*c* may transmit uncompressed data packets. If the target base station 105-*g* supports the same compression techniques as the source base station 105-*f*, in some examples, the source base station 105-*f* may forward information on the UE 115-*c* data compression capability, and may also forward context for data compression to the target base station 105-*g*. The context for data compression may be used by the target base station 105-*g* to decompress packets received from the UE 115-*c* following handover. The UE 115-*c*, in such a situation, may also receive signaling that the target base station 105-*g* supports the same compression as the source base station 105-*f*, and the UE 115-*c* may assume the target base station to be capable of the same compression and start sending and receiving data as per previous compression configuration with the source base station 105-*f*.

In some examples, the source base station 105-*f* may not provide the data compression capabilities of UE 115-*c* to the target base station 105-*g*. In such a situation, the target base station 105-*g* may set up a connection with the UE 115-*c* and will trigger a new capability procedure to determine the data compression capabilities of the UE 115-*c*. This procedure may act as a trigger for UE 115-*c* to reset the previous compressor state. In such situations, the UE 115-*c* may decompress previously compressed buffered packets, and re-compress the packets according to the new compression configuration received from the target base station 105-*g*. In examples where the target base station 105-*g* does not support data compression, this may be signaled to the UE 115-*c* by the source base station 105-*f* (e.g., through a handover message or in information regarding adjacent base stations provided to a UE when an RRC connection is established). In certain examples, the indication that the target base station 105-*g* does not support data compression may be signaled upon handover and the target base station 105-*g* may transmit a status message to the UE 115-*c* from which it may be determined that data compression is not supported. When it is determined that the target base station 105-*g* does not support data compression, the UE 115-*c* may flush any packets in the RLC buffer 320 and also flush the eDCS buffer 310. The UE 115-*c* also may disable the data compression algorithm, remove PDCP packets prior to the first PDCP SN in the status message from the target base station 105-*g*, and retransmit the remaining PDCP packets to the target base station 105-*g*.

In still further examples, the target base station 105-*g* may support data compression techniques, but not the same data compression techniques as the source base station 105-*f*. In such examples, the target base station 105-*g*, upon handover of the UE 115-*c* may trigger a new capability procedure. This may act as a trigger for the UE 115-*d* to reset the previous compressor state. Previously compressed buffered packets, in such a situation, may then be decompressed and compressed as per the new compression configuration provided by the target base station 105-*g*.

In some examples, UE 115-*c* may experience a radio link failure (RLF). Such an occurrence may result, for example, due to poor channel conditions or physical layer related problems such as loss of synchronization. In some examples, data compression may be maintained following such an RLF. Following a RLF, UE 115-*c* may attempt to reestablish an RRC connection. The UE 115-*c* may attempt to reestablish an RRC connection with the same base station 105 (e.g., source base station 105-f). In such a case, the UE 115-c may use the existing data compression context and restart transmission of compressed packets from the point where acknowledgments of receipt of packets were not received. In some examples, the UE 115-c may attempt to reestablish an RRC connection with a different base station 105 (e.g., target base station 105-g). In such a case, the target base station 105-g may provide configuration information, which may include data compression capabilities of the target base station 105-g. If the provided data compression capabilities match the data compression that the UE 115-c was using prior to RLF, the UE 115-c may transmit compressed packets using the data compression context from prior to the RLF. This may be done, in some examples, when the target base station 105-g is able to retrieve the prior data compression context (e.g., eDCS buffer 330) from the source base station 105-f. In order to facilitate the retrieval of the data compression context, in some examples, the UE 115-c may provide information on the source base station 105-f so that the target base station 105-g can determine where to obtain this information. If the data compression capabilities of the target base station 105-g do not match the data compression being used prior to RLF, the UE 115-c may request for a reset of the data compression context, flush its existing buffers, and initiate a fresh data compression procedure.

In further examples, similarly as with an RRC reestablishment following a RLF, a UE 115-c may continue data compression routines across separate RRC connections. In such examples, data compression may be started from a "warm" state and thus provide more efficient communications relative to initiating compression associated with data compression routines from a cold state. In some examples, during an active data call, UE 115-c and a base station 105 may periodically request a peer to back-up the existing data compression context. In some examples, such a back-up request may be performed via an extended eDCS protocol data unit (PDU) header, and a cyclic redundancy check (CRC) of the eDCS PDU header may be used as a context ID. Upon a new RRC connection, a base station 105 may transmit the context ID as part of a data compression configuration request. If the UE 115-c has the same context ID backed-up, it will accept that configuration and use existing eDCS buffer 310 for compression. If the context ID of the base station 105 does not match the context ID of the UE 115-c, the UE 115-c may reject the base station 105 configuration, thus triggering the base station 105 to start a fresh data compression routine.

Figure 3B:
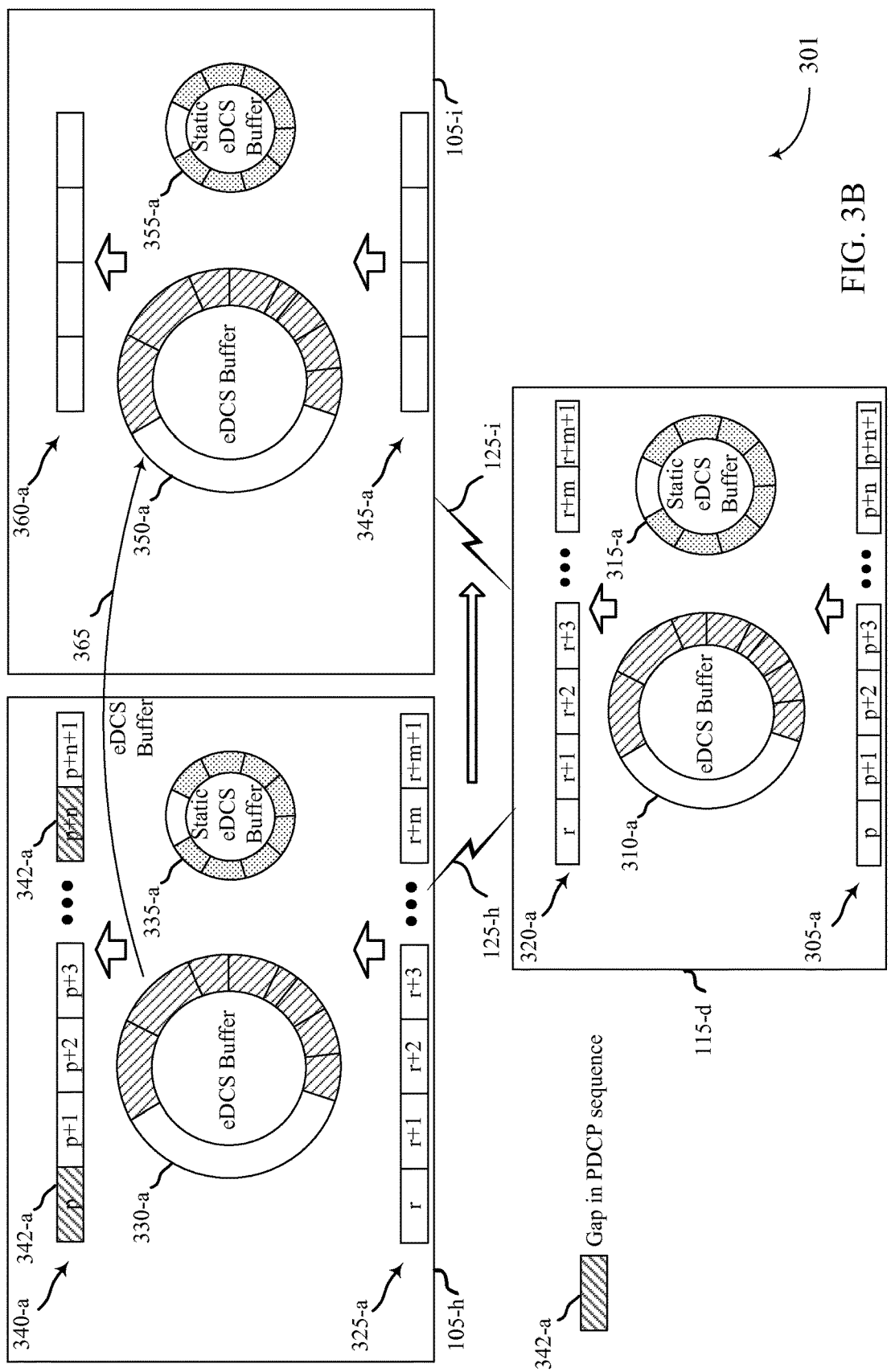

As discussed above, in some examples, data compression context may be forwarded to a target base station 105 as part of an inter-base station handover to facilitate uplink data compression. FIG. 3B illustrates an example of a wireless communication system 301 for transmitting data compression context information to a target base station 105-i for a handover in accordance with various aspects of the present disclosure. Wireless communication system 301 may include a UE 115-d, which may be an example of a UE 115 described above with reference to one or more of FIG. 1-3A. Wireless communication system 301 may also include a source base station 105-h and target base station 105-i, which may be examples of base stations 105 described above with reference to one or more of FIG. 1-3A.

Similarly as discussed with respect to FIG. 3A, prior to an inter-cell handover source base station 105-h may configure a UE 115-d to use data compression procedures to enhance communications between the UE 115-d and source base station 105-h (e.g., by using data compression techniques).

Within UE 115-d, data packets are received at a PDCP buffer 305-a and passed into eDCS buffer 310-a which, in some examples, may include a static eDCS buffer 315-a. When the PDCP buffer 305-a data packets (p through p+n+1) are passed into the eDCS buffer 310-a, the packets may be compressed according to a compression scheme that has been configured by the source base station 105-h. In some examples, as noted, a static eDCS buffer 315-a may be provided that may be used for compression of, for example, data packets associated with particular data sources. The data packets then move from the eDCS buffer 310-a and static eDCS buffer 315-a to RLC buffer 320-a for transmission via wireless communication link 125-h to source base station 105-h.

Within source base station 105-h, data packets may be received via wireless communication link 125-h into base station RLC buffer 325-a. From the RLC buffer 325-a, the data packets are provided to eDCS buffer 330-a and/or static eDCS buffer 335-a for decompression, and are then placed into PDCP buffer 340-a. The source base station 105-h may analyze PDCP SNs of packets in the PDCP buffer and determine whether any gaps in the PCDP sequence are present. In the example of FIG. 3B, two gaps 342-a in packets received into the PDCP buffer 340-a are present at packet p, and at packet p+n.

In the event of a handover to target base station 105-i, the UE 115-d may discontinue communications with source base station 105-h and begin communications with target base station 105-i via communications link 125-i. In this example, the target base station 105-i may have the same data compression capabilities as the source base station 105-h, and have a similar architecture as source base station 105-h in that data packets may be decoded from the wireless communication link 125-i and moved into RLC buffer 345-a, into the eDCS buffer 350-a and/or static eDCS buffer 355-a, decompressed, and then moved to PDCP buffer 360-a.

In the example of FIG. 3B, the source base station 105-h, may forward the received PDCP packets after the first hole (i.e., packets p+1 through p+n−1) to the target base station 105-i. Such a communication may be made through, for example, an X2 interface of each base station 105. Additionally, the source base station 105-h may forward the contents of the eDCS buffer 330-a to the target base station 105-i, as indicated at 365. Such a communication also may be made through the X2 interface, for example. The contents of the eDCS buffer 330-a may be placed into the target base station 105-i eDCS buffer 350-a, and may allow the target base station 105-i to decompress the packets identified by the gaps 342-a in the sequence of packets in the PDCP buffer 340-a. The target base station 105-i may transmit a status PDU to the UE 115-d requesting the missed PDCP packets, and the UE 115-d may retransmit the missing packets using the same compression as originally used to transmit the packets, and the UE 115-d may continue using the same eDCS buffer 310-a for compression of new packets. The source base station 105-h may indicate to the UE 115-d when the eDCS compression buffer 330-a is be forwarded to target base station 105-i so that the UE 115-d knows when to continue using the eDCS context without reset.

Figure 3C:
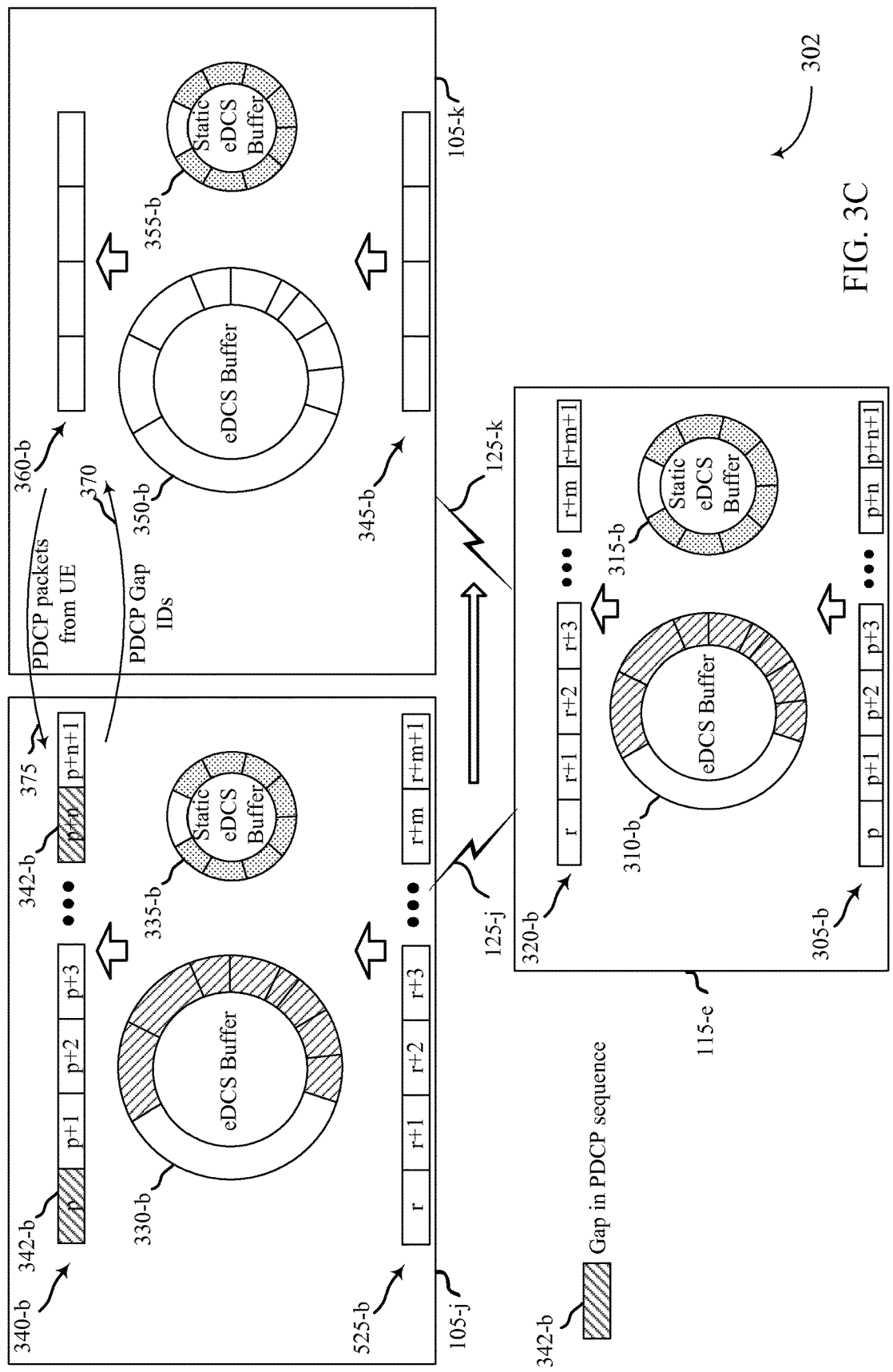

With reference now to FIG. 3C an example is provided illustrating a wireless communication system 302 for providing retransmitted packets to a source base station 105-j for decompression to facilitate uplink transmissions following a handover in accordance with various aspects of the present disclosure. In certain examples, as discussed above, source base station 105-j and target base station 105-k may not support the same data compression routines, and in some examples target base station 105-*k* may not support data compression at all. In the example of FIG. 3C, packets that are retransmitted due to gaps in a sequence of received packets may continue to be retransmitted to the target base station 105-*k* using an existing data compression context.

Similarly as discussed above with respect to FIGS. 1-3B, wireless communication system 302 may include a UE 115-*e*, which may be an example of a UE 115 described above with reference to one or more of FIGS. 1-3B. Wireless communication system 302 may also include a source base station 105-*j* and target base station 105-*k*, which may be examples of base stations 105 described above with reference to one or more of FIGS. 1-3B.

Similarly as discussed above, prior to an inter-cell handover source base station 105-*j* may configure a UE 115-*e* to use data compression procedures to enhance communications between the UE 115-*e* and source base station 105-*j* (e.g., by using data compression techniques). Within UE 115-*e*, data packets are received at a PDCP buffer 305-*b* and passed into eDCS buffer 310-*b* which, in some examples, may include a static eDCS buffer 315-*b*. When the PDCP buffer 305-*b* data packets (p through p+n+1) are passed into the eDCS buffer 310-*b*, the packets may be compressed according to a compression scheme that has been configured by the source base station 105-*j*. In some examples, as noted, a static eDCS buffer 315-*b* may be provided that may be used for compression of, for example, data packets associated with particular data sources. The data packets then move from the eDCS buffer 310-*b* and static eDCS buffer 315-*b* to RLC buffer 320-*b* for transmission via wireless communication link 125-*j* to source base station 105-*j*.

Within source base station 105-*j*, data packets may be received via wireless communication link 125-*j* into base station RLC buffer 325-*b*. From the RLC buffer 325-*b*, the data packets are provided to eDCS buffer 330-*b* and/or static eDCS buffer 335-*b* for decompression, and are then placed into PDCP buffer 340-*b*. The source base station 105-*j* may analyze PDCP SNs of packets in the PDCP buffer and determine whether any gaps in the PCDP sequence are present. In the example of FIG. 3C, two gaps 342-*b* in packets received into the PDCP buffer 340-*b* are present at packet p, and at packet p+n.

In the event of a handover to target base station 105-*k*, the UE 115-*e* may discontinue communications with source base station 105-*j* and begin communications with target base station 105-*k* via communications link 125-*k*. In this example, the target base station 105-*k* may not be compatible with the same data compression capabilities as the source base station 105-*j*. Target base station 105-*k* may have a similar architecture as source base station 105-*j* in that data packets may be decoded from the wireless communication link 125-*k* and moved into RLC buffer 345-*b*, into the eDCS buffer 350-*b* and/or static eDCS buffer 355-*b*, decompressed, and then moved to PDCP buffer 360-*b*.

In the example of FIG. 3C, the source base station 105-*j*, may transmit a control message 370 to the target base station 105-*k* indicating the missed PDCP packets (e.g., gaps 542-*b*) and the PDCP SN of the last packet that is received in sequence. The target base station 105-*k* may transmit a status PDU to the UE 115-*e* and request retransmission for the compressed PDCP packets. The UE 115-*e* may transmit the requested packets to the target base station 105-*k*. As mentioned, the target base station 105-*k* may not support the same data compression as the source base station 105-*j*, and the target base station 105-*k* may forward the received compressed retransmitted packets to the source base station 105-*j* in communication 375 via, for example, the X2 interface. The source base station 105-*j* may perform decompression on the received PDCP packets and forward the IP packets directly into the core network. In examples where the target base station 105-*k* has some data compression capabilities, a new eDCS context may be used for communications with the target base station 105-*k* for packets that have sequence number greater than the last sequence number received at source base station 105-*j*. In some examples, this can run in parallel with the already compressed packets/holes being repopulated at source base station 105-*j* with the packets being sent through the target base station 105-*k*.

Figure 4:
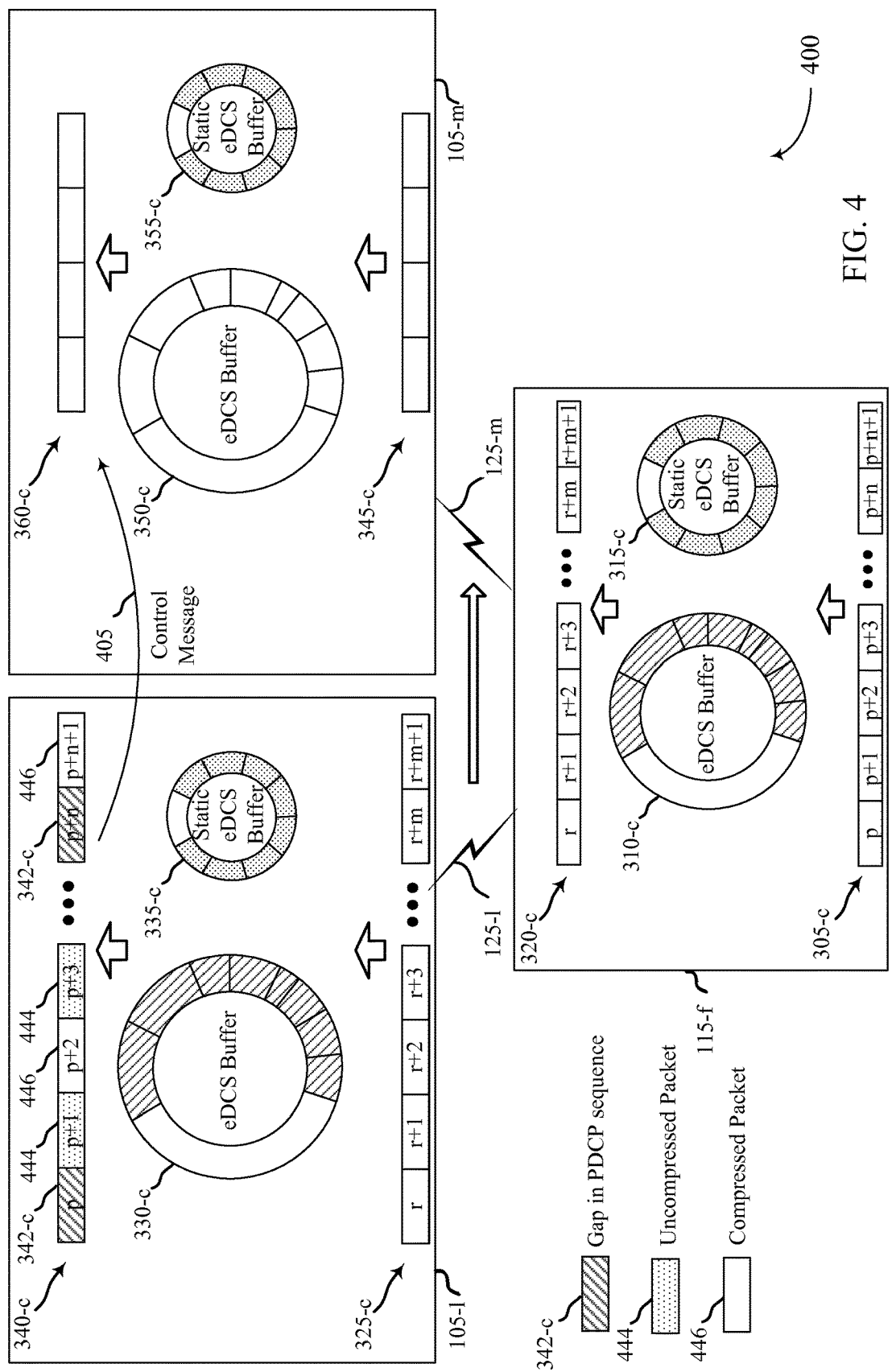
FIG. 4 illustrates an example of a wireless communication system for transmitting control information to a target base station for a handover in accordance with various aspects of the present disclosure.

As discussed above, in some examples, data compression context may not be forwarded to a target base station 105 as part of facilitating uplink following an inter-base station handover. Instead, control information may be forwarded to the target base station 105 that may indicate packets that may be retransmitted following a handover. FIG. 4 illustrates an example of a wireless communication system 400 for transmitting control information to the target base station 105-*m* for a handover in accordance with various aspects of the present disclosure. Wireless communication system 400 may include UE 115-*f*, source base station 105-1 and target base station 105-*m*, as described above with respect to FIGS. 1-3C.

Similarly as discussed with respect to FIG. 3A, prior to an inter-cell handover source base station 105-1 may configure a UE 115-*f* to use data compression procedures to enhance communications between the UE 115-*f* and source base station 105-1 (e.g., by using data compression techniques). Within UE 115-*f*, data packets are received at a PDCP buffer 305-*c* and passed into eDCS buffer 310-*c* which, in some examples, may include a static eDCS buffer 315-*c*. When the PDCP buffer 305-*c* data packets (p through p+n+1) are passed into the eDCS buffer 310-*c*, the packets may be compressed according to a compression scheme that has been configured by the source base station 105-1. In some examples, as noted, a static eDCS buffer 315-*c* may be provided that may be used for compression of, for example, data packets associated with particular data sources. The data packets then move from the eDCS buffer 310-*c* and static eDCS buffer 315-*c* to RLC buffer 320-*c* for transmission via wireless communication link 125-1 to source base station 105-1. In some instances, UE 115-*f* may not compress certain packets using the eDCS buffer 310-*c*, and such packets may be transmitted as uncompressed packets. Such uncompressed packets may be transmitted, for example, when compression would not significantly reduce the amount of data to be transmitted.

Within source base station 105-1, data packets may be received via wireless communication link 125-1 into base station RLC buffer 325-*c*. From the RLC buffer 325-*c*, compressed data packets are provided to eDCS buffer 330-*c* and/or static eDCS buffer 335-*c* for decompression, and the resulting packets 446 are then placed into PDCP buffer 340-*c*. Uncompressed data packets 444 may be simply placed into the PDCP buffer 340-*c* without being decompressed at the eDCS buffer 330-*c* and/or static eDCS buffer 335-*c*. The source base station 105-1 may analyze PDCP SNs of packets in the PDCP buffer and determine whether any gaps in the PCDP sequence are present. In the example of FIG. 4, two gaps 342-*c* in packets received into the PDCP buffer 340-*c* are present at packet p and at packet p+n.

In the event of a handover to target base station 105-*m*, the UE 115-*f* may discontinue communications with source base station 105-1 and begin communications with target base station 105-*m* via communications link 125-*m*. In this example, the target base station 105-*m* may have the same data compression capabilities as the source base station 105-1, and have a similar architecture as source base station 105-1 in that data packets may be decoded from the wireless communication link 125-*m* and moved into RLC buffer 345-*c*, into the eDCS buffer 350-*c* and/or static eDCS buffer 355-*c*, decompressed, and then moved to PDCP buffer 360-*c*.

In the example of FIG. 4, the source base station 105-1, may not forward eDCS context, and may transmit a control message 405 to target base station 105-*m*. In some examples, the control message 405 from the source base station 105-1 includes only information related to the handover, and may not include a status PDU or and packets received subsequent to the first gap 342-*c* in the PDCP sequence. In such examples, UE 115-*f* may assume that all of the packets that have not transitioned the packet data convergence protocol (PDCP) discard timer will be retransmitted to the target base station 105-*m*. For example, the PDCP discard timer of packets p−1 through P+3 may not have expired, and the UE 115-*f* may retransmit each one of these packets.

In other examples, the control message 405 sent by the source base station 105-1 may include an identification of a latest sequential packet received from the UE 115-*f*, namely packet p−1 in the example of FIG. 4. The target base station 105-*m* may then transmit a status PDU to the UE 115-*f* that indicates that all packets subsequent to the latest sequential packet received from the UE 115-*f* are to be retransmitted. The UE 115-*f* may reset the compression context in eDCS buffer 310-*c* and retransmit the indicated packets, along with any further subsequent packets ready for transmission. The eDCS buffer 310-*c* may then be populated according to the compression scheme employed (if any) by the target base station 105-*m*. The retransmissions from the UE 115-*f* will include packets for which the PDCP discard timer has expired or not.

In further examples, the control information 405 from the source base station 105-1 may include an indication any gaps in the PDCP sequence. In some examples, if a PDCP packet was compressed at the UE 115-*f*, the source base station 105-1 may report the packet as a gap, and not forward those compressed packets to the target base station 105-*m*. The target base station 105-*m* may then transmit a status PDU to the UE 115-*f* and request retransmission of the PDCP PDUs that are indicated as gaps 342-*c* from the source base station 105-1, which would include both PDCP sequence numbers that were not received at the source base station 105-1 and compressed PDCP sequence numbers (e.g., packets 446) that were received at the source base station 105-1. The UE 115-*f* may then send the missing PDCP PDUs to the target base station 105-*m* using a reset eDCS buffer 310-*c*, and thus reset data compression context.

In such examples, the data compression context may be restarted from the pre-fill eDCS buffer 310-*c* context in the target base station 105-*m* and rebuilt from the first missing packet (i.e., gap 342-*c*) sequence number, with all the subsequent packets processed in order at the UE 115-*f* from eDCS buffer 310-*c* perspective. The PDCP sequence numbers not announced as gaps may not be transmitted by the UE 115-*f*, but may still be used to update the eDCS buffer 310-*c* context at the UE 115-*f* and the target base station 105-*m* eDCS buffer 350-*c*. Note that the rebuilding the eDCS buffers 310-*c* and 350-*c* after the handover happens in the sequence, and includes successfully received PDCP packets yet to be delivered to the higher layers that are forwarded from the source base station 105-1, and not necessarily just the gaps that are retransmitted. In further examples, rather than insert the packets that are not retransmitted, the compression contexts of the target base station eDCS buffer 350-*c* and the UE 115-*f* eDCS buffer 310-*c* may be populated using only transmitted packets. Thus, in the example of FIG. 4, packets 444 are not included in the eDCS buffers 310-*c* and 350-*c* after transitioning to the target base station 105-*m*.

Figure 5A:
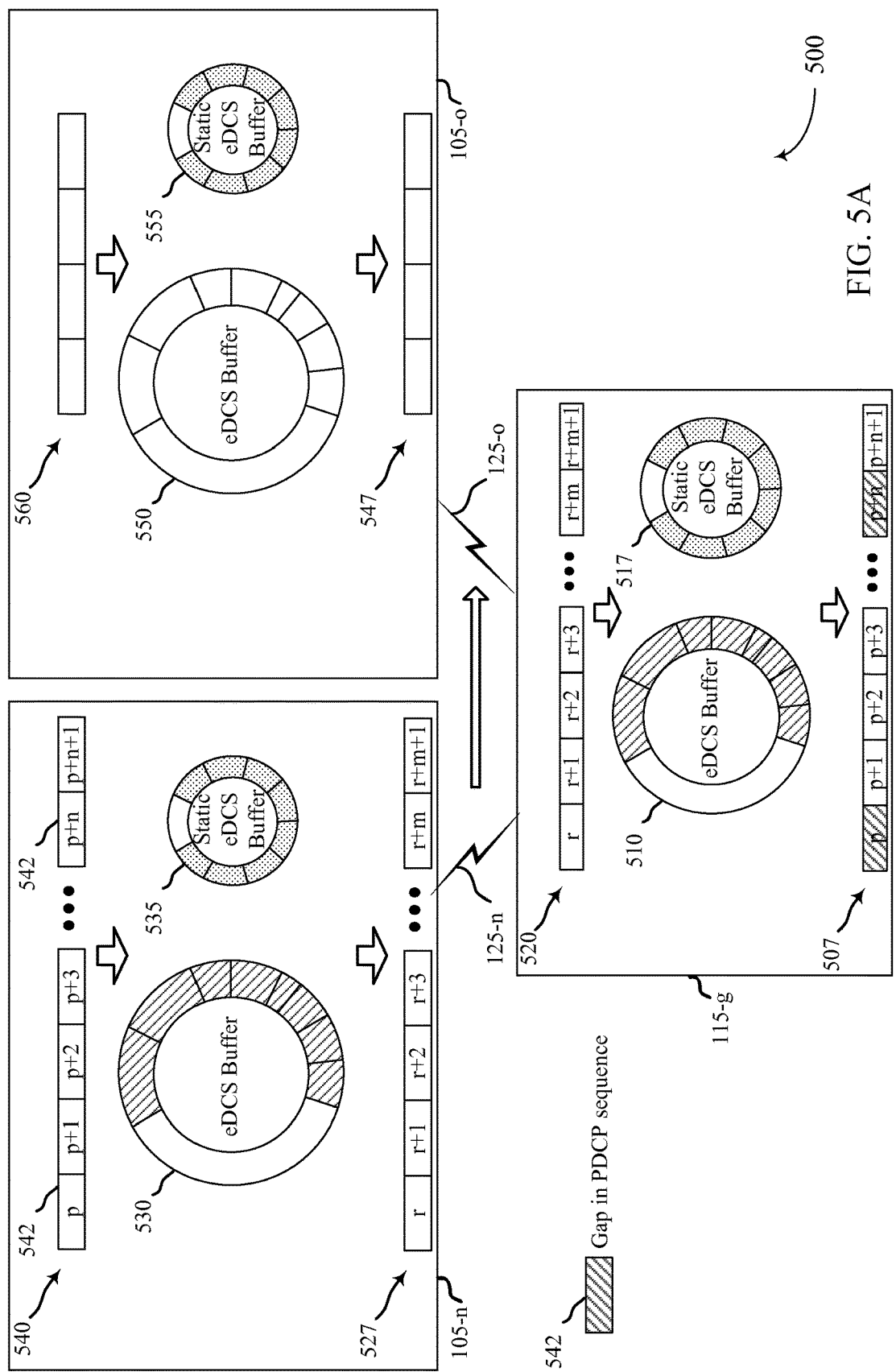
FIGS. 5A-5C illustrate an example of a wireless communication system for facilitating data compression at a target base station following a handover, in accordance with various aspects of the present disclosure.

Techniques may also be employed to facilitate downlink data compression after a handover. FIG. 5A illustrates an example of a wireless communications system 500 for initiating data compression at a target base station 105-*o* following a handover in accordance with various aspects of the present disclosure. Wireless communications system 500 may include a UE 115-*g*, which may be an example of a UE 115 described above with reference to FIGS. 1-4. Wireless communications system 500 may also include a source base station 105-*n* and target base station 105-*o*, which may be examples of base stations 105 described above with reference to FIGS. 1-4.

Wireless communications system 500 illustrates an example of a handover from source base station 105-*n* to target base station 105-*o*. For example, UE 115-*g* may move from the coverage area of source base station 105-*n* to the coverage area of target base station 105-*o*. Similarly as discussed above, a handover also may be initiated if target base station 105-*o* can provide better service for UE 115-*g* or for reasons related to network load or inter-cell interference mitigation, for example. Wireless communications system 500 illustrates an example in which source base station 105-*n* communicates using compressed data packets over wireless communication link 125-*n* with UE 115-*g*.

Prior to an inter-cell handover, source base station 105-*n* may configure UE 115-*g* to use data compression procedures to enhance communications between the UE 115-*g* and source base station 105-*n* (e.g., by using eDCS techniques). At the source base station 105-*n*, data packets are received at a PDCP buffer 540 and passed into eDCS buffer 530 which, in some examples, may include a static eDCS buffer 535. When the PDCP buffer 540 data packets (p through p+n+1) are passed into the eDCS buffer 530, the packets may be compressed according to a compression scheme that has been configured by the source base station 105-*n*. In some examples, as noted, a static eDCS buffer 535 may be used for compression of, for example, data packets associated with particular data sources. For example, static eDCS buffer 535 may provide compression information for data packets from a specific sports or news website, and when a user of the UE 115-*g* accesses such a website, the data compression routines may immediately use the information in the static eDCS buffer 535 for compression. The data packets then move from the eDCS buffers 530, 535 to RLC buffer 527 for transmission via wireless communication link 125-*n* to UE 115-*g*.

Within the UE 115-*g*, data packets may be received via wireless communication link 125-*n* into UE RLC buffer 520. From the UE RLC buffer 520, the data packets are provided to UE eDCS buffer 510 and/or UE static eDCS buffer 517 for decompression, and are then placed into UE PDCP buffer 507. The UE 115-*g* may analyze PDCP SNs of packets in the UE PDCP buffer 507 and determine whether any gaps in the PCDP sequence are present. In the example of FIG. 5A, two gaps 542 in packets received into the UE PDCP buffer 507 are present at packet p, and at packet p+n. Such gaps 542 may be the result of one or more various factors, such as interference or poor channel conditions, for example. The UE 115-*g* may transmit ACKs for the received packets, and in the normal course of communications the source base station 105-*n* may retransmit unacknowledged packets, such as following the expiration of a timer associated with the packets. The source base station 105-*n* may perform the same compression techniques using the eDCS buffer 530 and static eDCS buffer 535 for the retransmitted packets.

In the event of a handover to target base station 105-*o*, the UE 115-*g* may discontinue communications with source base station 105-*n* and begin communications with target base station 105-*o* via wireless communication link 125-*o*. The target base station 105-*o* may have the same data compression capabilities as the source base station 105-*n*, may have different data compression capabilities as the source base station 105-*n*, or may not support data compression for the UE 115-*g* at all. In the example of FIG. 5A, the target base station 105-*o* may support data compression, and have a similar architecture as source base station 105-*n* in that data packets may be received at a PDCP buffer 560 and passed into eDCS buffer 550 which, in some examples, may include a static eDCS buffer 555. The packets may be compressed according to a compression scheme that has been configured by the target base station 105-*o*, and then move from the eDCS buffers 550, 555 to RLC buffer 547 for transmission via wireless communication link 125-*o* to UE 115-*g*.

As mentioned above, a number of different scenarios may be present at an inter-base station handover. One possibility is that UE 115-*g* is in RRC connected mode and using data compression techniques in communications with source base station 105-*n*, the handover may be to base station 105-*o* that is not capable of compression and thus not capable of data compression techniques. In some examples, UE 115-*g* may indicate data compression compatibility through a signaling radio bearer (SRB) RRC transmission. If target base station 105-*o* does not support such data compression, the target base station 105-*o* will not configure the UE 115-*g* for data compression, and the target base station 105-*o* may transmit uncompressed data packets to UE 115-*g*. If the target base station 105-*o* supports the same compression techniques as the source base station 105-*n*, in some examples, the source base station 105-*n* may forward information on the UE 115-*g* data compression capability, and may also forward context for data compression to the target base station 105-*o*. The context for data compression may be used by the target base station 105-*o* to compress packets transmitted to the UE 115-*g* following handover. The UE 115-*g*, in such a situation, may also receive signaling that the target base station 105-*o* supports the same compression as the source base station 105-*n*, and the UE 115-*g* may assume the target base station to be capable of the same compression and start receiving data as per previous compression configuration with the source base station 105-*n*.

In some examples, the source base station 105-*n* may not provide the data compression capabilities of UE 115-*g* to the target base station 105-*o*. In such a situation, the target base station 105-*o* may set up a connection with the UE 115-*g* and will trigger a new capability procedure to determine the data compression capabilities of the UE 115-*g*. In some examples, the source base station 105-*n* may forward compression context information, including data from eDCS buffer 530, to the target base station 105-*o*, and upon determining the UE 115-*g* compression capabilities through the capability procedure, the target base station 105-*o* may transmit compressed packets to the UE 115-*g*. In the event that the target base station 105-*o* has different compression capabilities than the source base station 105-*n*, this procedure may act as a trigger for UE 115-*g* and target base station 105-*o* to reset the previous compressor state. The UE 115-*g* may flush any packets in the UE PDCP buffer 507 and also flush the UE eDCS buffer 510. The target base station 105-*o* also may disable the data compression algorithm and retransmit unacknowledged PDCP packets as well as any PDCP packets transmitted subsequent to a first unacknowledged packet, to the UE 115-*g*.

In still further examples, the target base station 105-*o* may support data compression techniques, but not the same data compression techniques as the source base station 105-*n*. In such examples, the target base station 105-*o*, upon handover of the UE 115-*g* may trigger a new capability procedure. This may act as a trigger for the UE 115-*g* to reset the previous compressor state, and transmissions/retransmissions from the target base station 105-*o* may be performed according to the new data compression configuration provided by the target base station 105-*o*.

In some examples, UE 115-*g* may experience a radio link failure (RLF). Such an occurrence may result, for example, due to poor channel conditions or physical layer related problems such as loss of synchronization. In some examples, data compression may be maintained following such an RLF. Following a RLF, UE 115-*g* may attempt to reestablish an RRC connection. The UE 115-*g* may attempt to reestablish an RRC connection with the same base station, namely source base station 105-*n*. In such a case, the source base station 105-*n* may use the existing data compression context and restart transmission of compressed packets from the point where acknowledgments of receipt of packets were not received. In some examples, the UE 115-*g* may attempt to reestablish an RRC connection with a different base station, such as target base station 105-*o*. In such a case, the target base station 105-*o* may provide configuration information, which may include data compression capabilities of the target base station 105-*o*. If the provided data compression capabilities match the data compression that the UE 115-*g* was using prior to RLF, the target base station 105-*o* may transmit compressed packets using the data compression context from prior to the RLF. This may be done, in some examples, when the target base station 105-*o* is able to retrieve the prior data compression context (e.g., eDCS buffer 530) from the source base station 105-*n*. In order to facilitate the retrieval of the data compression context, in some examples, the UE 115-*g* may provide information on the source base station 105-*n* so that the target base station 105-*o* can determine where to obtain this information. If the data compression capabilities of the target base station 105-*o* do not match the data compression being used prior to RLF, the UE 115-*g* may reset of the data compression context, flush its existing buffers, and initiate a fresh data compression procedure.

In further examples, similarly as with an RRC reestablishment following a RLF, a UE 115-*g* may continue data compression routines across separate RRC connections. In such examples, data compression may be started from a "warm" state and thus provide more efficient communications relative to initiating compression associated with data compression routines from a cold state. In some examples, during an active data call, UE 115-*g* and source base station 105-*n* may periodically request a peer to back-up the existing data compression context. In some examples, such a back-up request may be performed via an extended eDCS protocol data unit (PDU) header, and a cyclic redundancy check (CRC) of the eDCS PDU header may be used as a context ID. Upon a new RRC connection, source base station 105-*n* or target base station 105-*o* may transmit the context ID as part of a data compression configuration request. If the UE 115-*g* has the same context ID backed-up, it will accept that configuration and use existing UE eDCS buffer 510 for compression/decompression. If the context ID does not match the context ID of the UE 115-g, the UE 115-g may reject the configuration, thus triggering a fresh data compression routine.

Figure 5B:
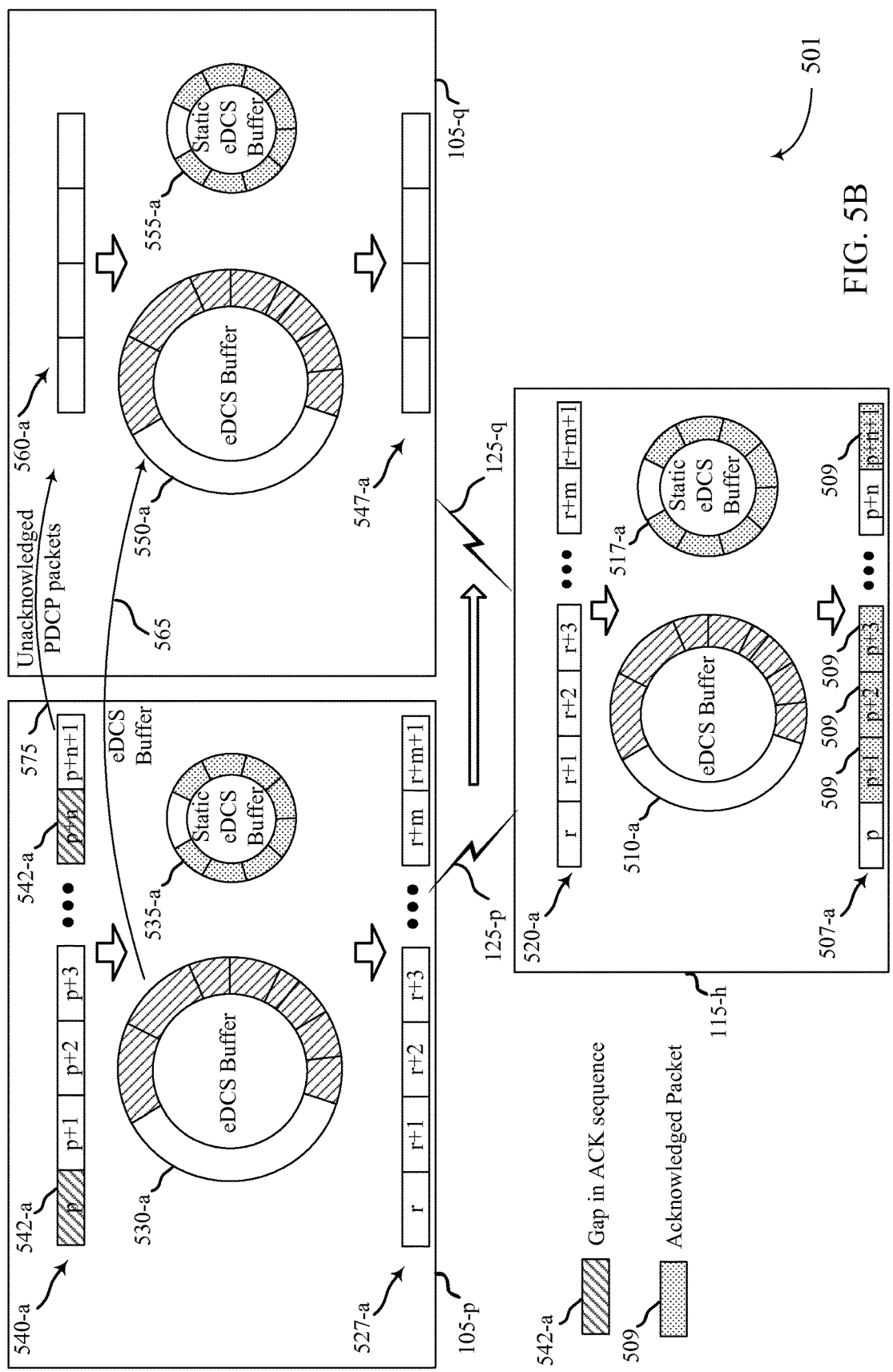

As discussed above, the inter-base station handover may include forwarding data compression context to a target base station 105 to facilitate data compression during downlink. FIG. 5B illustrates an example of a wireless communications system 501 for transmitting data compression context information to a target base station 105-q for a handover, in accordance with various aspects of the present disclosure. Wireless communications system 501 may include a UE 115-h, which may be an example of a UE 115 described above with reference to FIGS. 1-5A. Wireless communications system 501 may also include a source base station 105-p and target base station 105-q, which may be examples of base stations 105 described above with reference to one or more of FIGS. 1-5A.

Similarly as discussed with respect to FIG. 5A, prior to an inter-cell handover, source base station 105-p may configure a UE 115-h to use data compression procedures to enhance communications between UE 115-h and source base station 105-p (e.g., by using eDCS techniques). Within source base station 105-p, data packets are received at a PDCP buffer 540-a and passed into eDCS compression buffer 530-a which, in some examples, may include a static eDCS buffer 535-a. When the PDCP buffer 540-a data packets (p through p+n+1) are passed into the eDCS compression buffer 530-a, the packets may be compressed according to a compression scheme that has been configured by source base station 105-p. In some examples, as noted, a static eDCS buffer 535-a may be provided that may be used for compression of, for example, data packets associated with particular data sources. The data packets then move from the eDCS compression buffer 530-a and static eDCS buffer 535-a to RLC buffer 527-a for transmission via wireless communication link 125-p to UE 115-h.

Within the UE 115-h, data packets may be received via wireless communication link 125-p into UE RLC buffer 520-a. From the UE RLC buffer 520-a, the data packets are provided to UE eDCS buffer 510-a and/or static UE eDCS buffer 517-a for decompression, and are then placed into UE PDCP buffer 507-a. The UE 115-h may analyze PDCP SNs of packets in the UE PDCP buffer 507-a and transmit ACKs for received PDCP SNs. In the example of FIG. 5B, the UE 115-h may receive and transmit ACKs for packets 509 (packets p+1, p+2, p+3, p+n+1), and two gaps 542-a in acknowledgments are present at source base station 105-p at packet p, and at packet p+n.

In the event of a handover to target base station 105-q, the UE 115-h may discontinue communications with source base station 105-p and begin communications with target base station 105-q via wireless communication link 125-q. In this example, the target base station 105-q may have the same data compression capabilities as the source base station 105-p, and have a similar architecture as source base station 105-p in that data packets may be received at a PDCP buffer 560-a and passed into eDCS buffer 550-a which, in some examples, may include a static eDCS buffer 555-a. The packets may be compressed according to a compression scheme that has been configured by the target base station 105-q, and then move from the eDCS buffers 550-a, 555-a to RLC buffer 547-a for transmission via wireless communication link 125-q to UE 115-h.

In the example of FIG. 5B, the source base station 105-p, may forward the PDCP packets starting at the first gap (i.e., packets p through p+n-1) to the target base station 105-q, as indicated at 575. Such a communication may be made through, for example, an X2 interface of each base station 105. Additionally, the source base station 105-p may forward the contents of the eDCS compression buffer 530-a to the target base station 105-q, as indicated at 565-a. Such a communication also may be made through an X2 interface, for example. The contents of the eDCS compression buffer 530-a may be placed into the target base station 105-q eDCS buffer 550-a, and may allow the target base station 105-q to compress the packets identified by the gaps 542-a in the sequence of packets in the PDCP buffer 540-a and retransmit the packets according to the same compression as used in the initial transmissions of the packets. The UE 115-h may transmit a status PDU to the target base station 105-q requesting retransmission of the unacknowledged packets, and the target base station 105-q may retransmit the missing packets using the same compression as originally used to transmit the packets, and the UE 115-h may continue using the same UE eDCS buffer 510-a for decompression of the retransmitted and any subsequent new packets. The source base station 105-p may indicate to the UE 115-h when the eDCS compression buffer 530-a is be forwarded to target base station 105-q so that the UE 115-h knows when to continue using the eDCS context without reset. In some examples, the UE 115-h may extend a timer for PDCP discard for the packets that went through compression to allow for the compression context to be handled correctly through retransmissions. In the event that such a timer expires, the compression context may be reset in the target base station 105-q and the UE 115-h, and a fresh compression routine may be initiated.

Figure 5C:
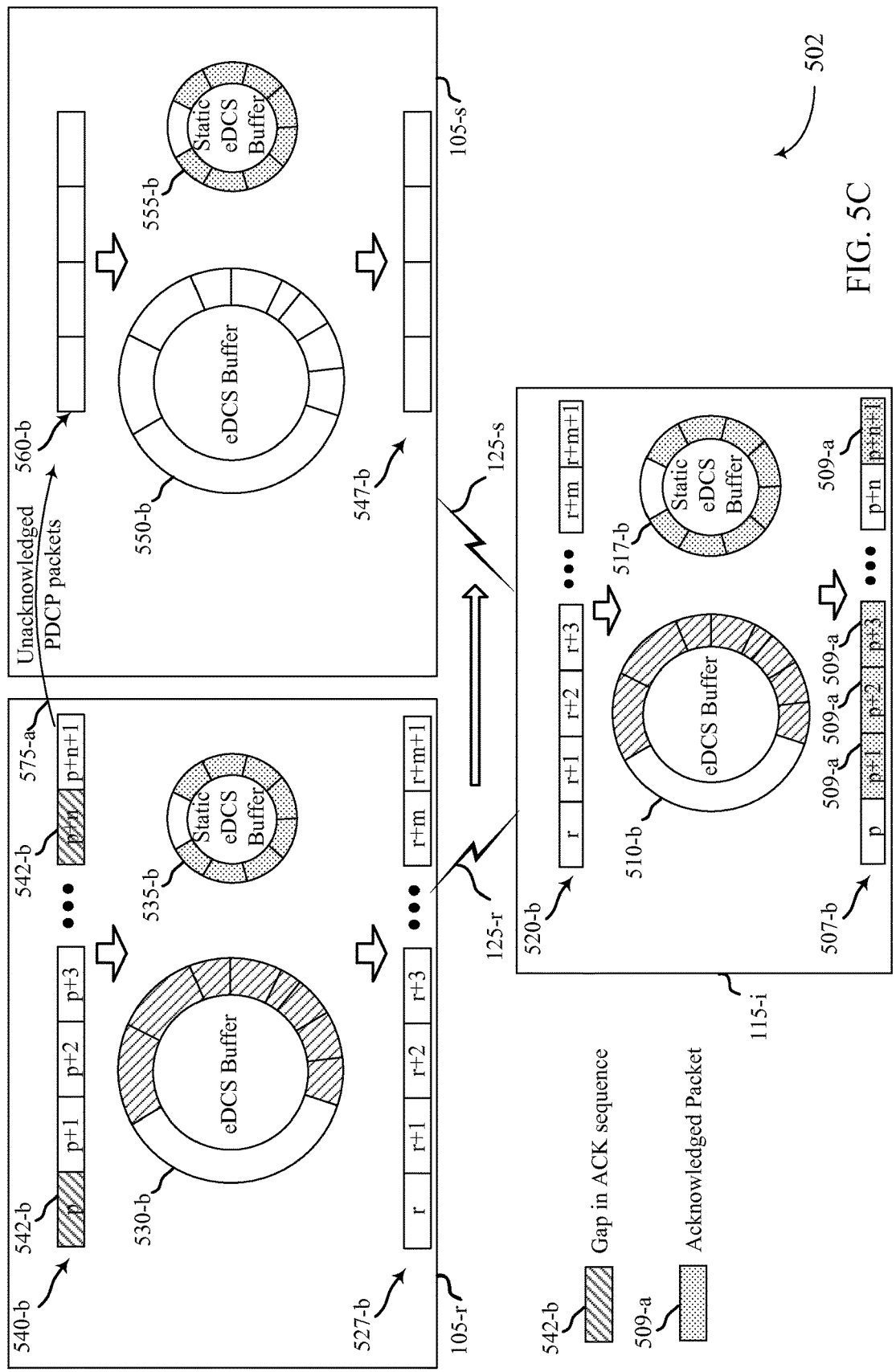

With reference now to FIG. 5C an example is provided illustrating a wireless communication system 502 for providing retransmitted packets to a source base station 105-r for decompression to support downlink data compression following a handover, in accordance with various aspects of the present disclosure. In certain examples, as discussed above, source base station 105-r and target base station 105-s may not support the same data compression routines, and in some examples target base station 105-s may not support data compression at all. In some examples, the target base station 105-s may support the same data compression routines as the source base station 105-r, but there may not be sufficient resources in the backhaul links to support transfer of the full compression context. In the example of FIG. 5C, due to differences in compression capabilities, or lack of resources to transfer compression context, the source base station 105-r does not transmit compression context to the target base station 105-s, and thus a reset in compression routines is triggered between the target base station 105-s and the UE 115-i.

Similarly as discussed above with respect to FIGS. 5A and 5B, wireless communication system 502 may include a UE 115-i, which may be an example of a UE 115 described above with reference to FIGS. 1-5B. Wireless communication system 502 may also include a source base station 105-r and target base station 105-s, which may be examples of base stations 105 described above with reference to FIGS. 1-5B.

Similarly as discussed above, prior to an inter-cell handover source base station 105-r may configure a UE 115-i to use data compression procedures to enhance communications between the UE 115-i and source base station 105-r (e.g., by using eDCS techniques). Within source base station 105-r, data packets are received at a PDCP buffer 540-b and passed into eDCS buffer 530-b which, in some examples, may include a static eDCS buffer 535-*b*. When the PDCP buffer 540-*b* data packets (p through p+n+1) are passed into the eDCS buffer 530-*b*, the packets may be compressed according to a compression scheme that has been configured by the source base station 105-*r*. In some examples, as noted, a static eDCS buffer 535-*b* may be provided that may be used for compression of, for example, data packets associated with particular data sources. The data packets then move from the eDCS buffer 530-*b* and static eDCS buffer 535-*b* to RLC buffer 527-*b* for transmission via wireless communication link 125-*r* to UE 115-*i*.

Within the UE 115-*i*, data packets may be received via wireless communication link 125-*r* into UE RLC buffer 520-*b*. From the UE RLC buffer 520-*b*, the data packets are provided to UE eDCS buffer 510-*b* and/or static UE eDCS buffer 517-*b* for decompression, and are then placed into UE PDCP buffer 507-*b*. The UE 115-*i* may analyze PDCP SNs of packets in the UE PDCP buffer 507-*b* and transmit ACKs for received PDCP SNs. In the example of FIG. 5C, the UE 115-*i* may receive and transmit ACKs for packets 509-*a* (packets p+1, p+2, p+3, p+n+1), and two gaps 542-*b* in acknowledgments are present at source base station 105-*r* at packet p, and at packet p+n.

In the event of a handover to target base station 105-*s*, the UE 115-*i* may discontinue communications with source base station 105-*r* and begin communications with target base station 105-*s* via wireless communication link 125-*s*. In this example, the target base station 105-*s* may have a similar architecture as source base station 105-*r* in that data packets may be received at a PDCP buffer 560-*b* and passed into eDCS buffer 550-*b* which, in some examples, may include a static eDCS buffer 555-*b*. The packets may be compressed according to a compression scheme that has been configured by the target base station 105-*s*, and then move from the eDCS buffers 550-*b*, 555-*b* to RLC buffer 547-*b* for transmission via wireless communication link 125-*s* to UE 115-*i*.

In the example of FIG. 5C, the source base station 105-*r*, may forward the PDCP packets starting at the first gap (i.e., packets p through p+n−1) to the target base station 105-*s*, as indicated at 575-*a*. Such a communication may be made through, for example, an X2 interface of each base station 105. In this example, target base station 105-*s* may not support data compression, or may have different data compression capabilities than the source base station. In such a case, eDCS buffer 530-*b* may not be forwarded to the target base station 105-*s*. The UE 115-*i* may transmit a status PDU to the target base station 105-*s* requesting retransmission of the unacknowledged packets, and that may indicate the missed packets and the PDCP SN of the last packet that is received in sequence at the UE 115-*i*. The target base station 105-*s* may retransmit the missing packets to the UE 115-*i* either in an uncompressed state, or the target base station 105-*s* may initiate a new compression routing and a new compression context may be built using both the retransmitted and new packets sent from the target base station 105-*s*.

Figure 6:
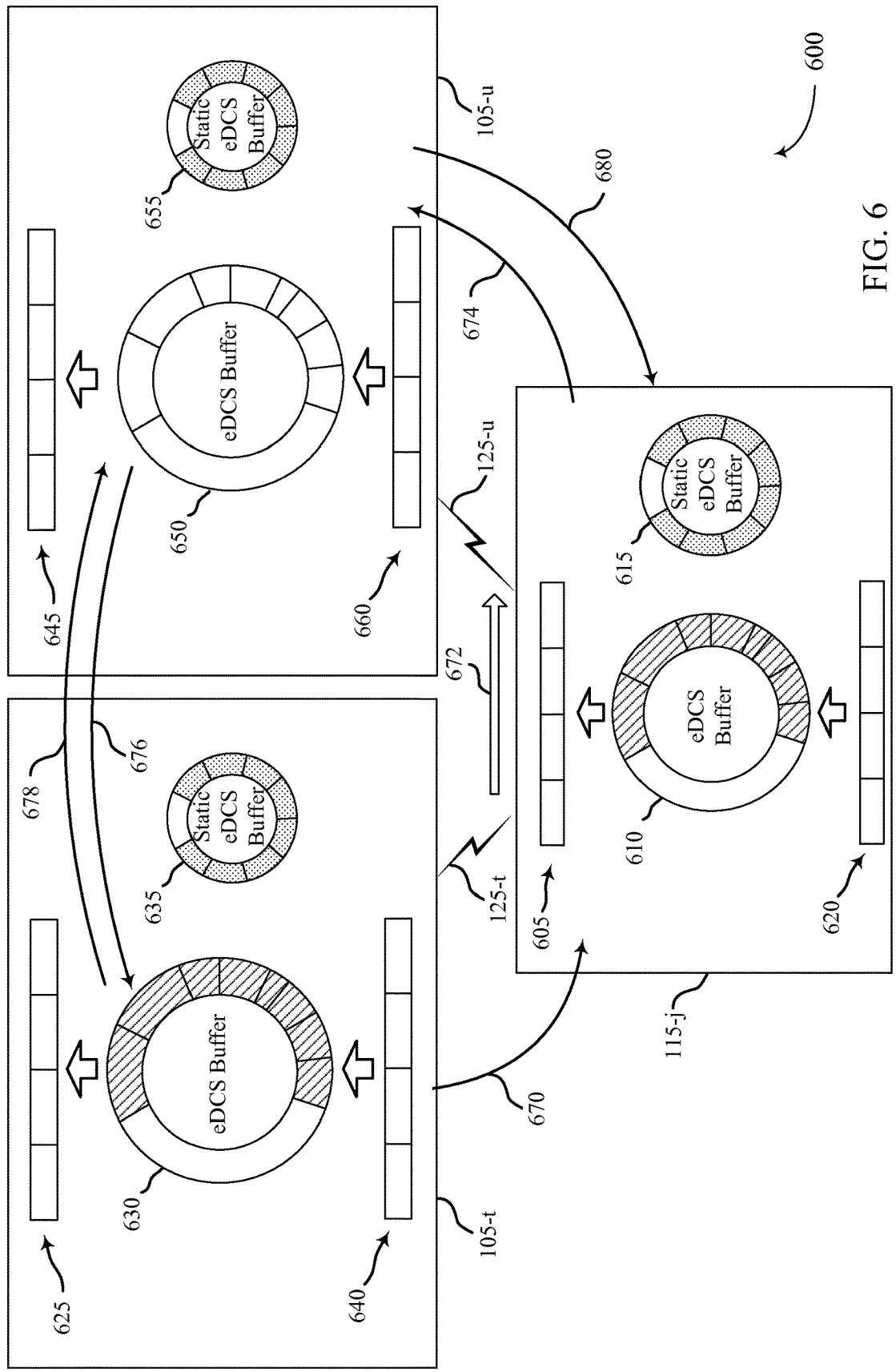
FIG. 6 illustrates an example of a wireless communication system for facilitating data compression through a connection establishment procedure in accordance with various aspects of the present disclosure.

As noted above, maintaining the data compression buffers across RRC connection setups may help maintain efficient data compression performance, which may include RRC connections at different base stations. This may aid compression performance for a target base station to retrieve data compression context information from a source base station when the target establishes an RRC connection with the UE. FIG. 6 illustrates an example of a wireless communication system 600 for facilitating data compression through a connection establishment procedure in accordance with various aspects of the present disclosure. System 600 may include a UE 115-*j*, which may be an example of a UE 115 described above with reference to FIGS. 1-5C. System 300 may also include a base stations 105-*t* and 105-*u*, which may each be examples of a base stations 105 described above with reference to FIGS. 1-5C, and which may be in communication with UE 115-*j* via communication links 125.

UE 115-*j* may include a packet data convergence protocol (PDCP) buffer 605, an eDCS buffer 610, a static eDCS buffer 615, and an RLC buffer 620. Base station 105-*t* may include a PDCP buffer 625, an eDCS buffer 630, a static eDCS buffer 635, and an RLC buffer 640. Likewise, base station 105-*u* may include a PDCP buffer 645, an eDCS buffer 650, a static eDCS buffer 655, and an RLC buffer 660. UE 115-*j* may thus be configured for eDCS, as may base stations 105-*t* and 105-*u*. UE 115-*j* may communicate with base station 105-*t* through communication link 125-*t* and UE 115-*j* may communicate with base station 105-*u* through communication link 125-*u*. UE 115-*j* may receive a context identifier 670 from base station 105-*t*, which may identify base station 105-*t* or eDCS buffer 630 context information, including a checkpoint for eDCS buffer 630. eDCS buffer 610 of UE 115-*j* may be synchronized to eDCS buffer 630, e.g., utilizing a checkpoint. Static eDCS buffers 615 and 635 may likewise be synchronized. Additionally or alternatively, static eDCS buffer 655 may be synchronized to static eDCS buffers 615 and 635.

UE 115-*j* may transition to idle mode and may perform an idle mode handover or cell reselection 672 to base station 105-*u*. UE 115-*j* may then initiate a context information retrieval by transmitting the context identifier 674 to the base station 105-*u*. Base station 105-*u* may then send a request 676 for eDCS context information to base station 105-*t* based on the context identifier 674. Base station 105-*t* may send a response 678, which may include eDCS context information and checkpoint information. Base station 105-*u* may thus send an indication 680 of its data compression capability, including whether continuity of eDCS is supported. UE 115-*j* and base station 105-*u* may then communicate utilizing eDCS.

Figure 7:
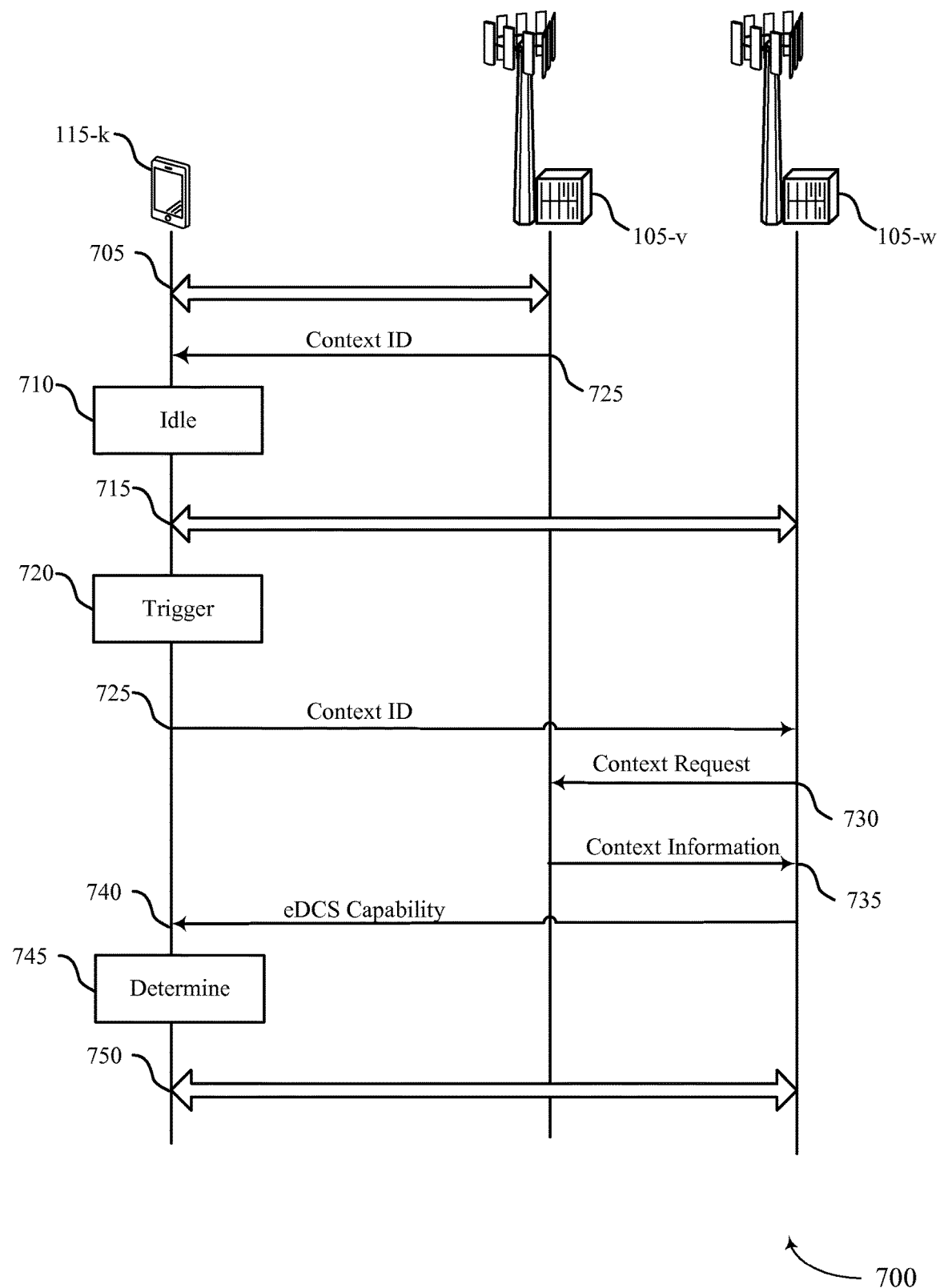
FIG. 7 illustrates an example of a process flow for facilitating data compression through a connection establishment procedure in accordance with various aspects of the present disclosure.

FIG. 7 illustrates an example of a process flow 700 for facilitating data compression through a connection establishment procedure in accordance with various aspects of the present disclosure. Process flow 700 may include a UE 115-*k*, which may be an example of a UE 115 described above with reference to FIGS. 1-6. Process flow 700 may also include a source base station 105-*v* and a target base station 105-*w*, which each may be an example of a base station 105 described above with reference to FIGS. 1-6.

The UE 115-*k* may communicate with a source base station utilizing a data compression scheme via link 705. The UE 115-*k* may receive, from the source base station 105-*v*, a context identifier 725 associated with the data compression scheme. The context identifier 725 may identify the source base station 105-*v* and, for example, a checkpoint or checkpoints for context information associated with the data compression scheme.

In some examples, UE 115-*k* may, at block 710, transition to an idle mode while connected to the source base station 105-*v*. The UE 115-*k* may perform an idle mode mobility procedure from the source base station 105-*v* to the target base station 105-*w*. In some cases, UE 115-*k* establishes connections with intermediate base stations 105 (not shown). The UE 115-*k* may thus not move directly from source base station 105-*v* to target base station 105-*w*, but, instead, may reselect to several base stations 105 before establishing an RRC connection 715 with target base station 105-*w*. Accordingly, in some instances, base station 105-*w* may be referred to as destination base station 105-*w*.

At block 720, an event or circumstance may trigger UE 115-*k* to request data compression context retrieval by target base station 105-*w*. In some examples, the transmission of a context identifier 725 is triggered by real traffic at UE 115-*k*, such as a paging message received from target base station 105-*w* or an MO message (e.g., MO data or an MO voice call) from UE 115-*k*.

In other examples, the transmission of the context identifier 725 is triggered by historical behavior of a UE. For instance, UE 115-*k* may determine (e.g., based on a global cell identity) that target base station 105-*w* is a base station 105 at which UE 115-*k* camps for long durations each day. Target base station 105-*w* may, for example, be a base station 105 nearest the office of the user of UE 115-*k*, and UE 115-*k* may camp on target base station 105-*w* for several hours a day many or most weekdays.

In still other examples, UE 115-*k*, context identifier 725 is triggered by a subscription criterion of UE 115-*k*. That is, in some examples, UE's 115-*k* subscription for the network of target base station 105-*w* provides for eDCS, and anytime UE 115-*k* camps on target base station 105-*w*, UE 115-*k* may request context information retrieval.

Following these or other triggering events, UE 115-*k* may transmit the context identifier 725 to target base station 105-*w*. In some examples, UE 115-*k* transmits a set of context capabilities to target base station 105-*w*, which may include the context identifier 725. For instance, UE 115-*k* may send an transmit information related to versions eDCS that UE 115-*k* supports, or UE 115-*k* may send a number of checkpoint identifiers with which in can utilize to resume an eDCS-enabled session.

The target base station 105-*w*, upon receiving context identifier 725, may send a request 730 for data compression context information to source base station 105-*v*. This request 730 may be based on the context identifier 725—e.g., target base station 105-*w* may identify base station 105-*v* as the location of UE's 115-*k* requested context information based on context identifier 725. Target base station 105-*w* may thus receive a response 735 indicating the availability or unavailability of the requested context information. In some examples, if context information is available, the response 735 may include context information, including one or several checkpoints, and one or several checkpoint identifiers.

The target base station 105-*w* may then send, and UE 115-*k* may receive, from the an indication of a data compression capability 740 of target base station 105-*w*, the indication based at least in part on the context identifier. At block 745, UE 115-*k* may determine, based on the indication of the data compression capability, that continuity of the data compression scheme (e.g., the data compression scheme utilized for communication with source base station 105-*v*) is supported at target base station 105-*w*. The UE 115-*k* may then communicate via link 750 with target base station 105-*w* utilizing the data compression scheme.

In some examples, the indication of data compression capability 740 includes a context checkpoint identifier received at target base station 105-*w* from source base station 105-*v*. The context checkpoint identifier may correspond to a current version of data compression context information maintained in a data compression buffer of UE 115-*k*. In which case, UE 115-*k* may communicate via link 750 with target base station 105-*w* utilizing the current version of context information.

Or, in other examples, the context checkpoint identifier may correspond to an earlier version of data compression context information than currently maintained in a data compression buffer of UE 115-*k*. In which case, UE 115-*k* may rollback to the earlier version of context information. For example, UE 115-*k* may reset a data compression buffer to correspond with the earlier version of context information, which UE 115-*k* may have cached. Or, in some examples, UE 115-*k* may reset its data compression buffer to a value (e.g., an initial value) known a priori to UE 115-*k* and target base station 105-*w*. In any case, UE 115-*k* may communicate via link 750 its ability to utilize the context information corresponding to a checkpoint identifier. The UE 115-*k* may thus request target base station 105-*w* to reset or initialize its data compression buffer when UE 115-*k* is unable to rollback to context information associated with a checkpoint identifier.

In some examples, the indication of data compression capability 740 may indicate that target base station 105-*w* was unable to retrieve context information from source base station 105-*v*. This may be because the context information was unavailable at source base station 105-*v*, because of errors in receiving the context information at target base station 105-*w*, or the like. The UE 115-*k* may thus determine, at block 745, that continuity of the data compression scheme is unsupported at target base station 105-*w*. UE 115-*k* may therefore resetting a data compression buffer and request (e.g., via communication link 750) that base station 105-*w* also reset a data compression buffer.

In some examples, UE 115-*k* and target base station 105-*w* may reference context information of a static buffer (e.g., static eDCS buffer 315, 355 of FIG. 3) irrespective of UE-specific data compression context information that may or may not be available for communications with target base station 105-*w*. For instance, data-compression capable base stations 105 and UEs 115 within a system may maintain a static buffer with context information for frequency access data—e.g., frequently visited websites and the like. The UE 115-*k* and target base station 105-*w* may communicated with reference to the context information of the static buffers without the necessity of synchronizing the buffers at each RRC connection setup.

Figure 8:
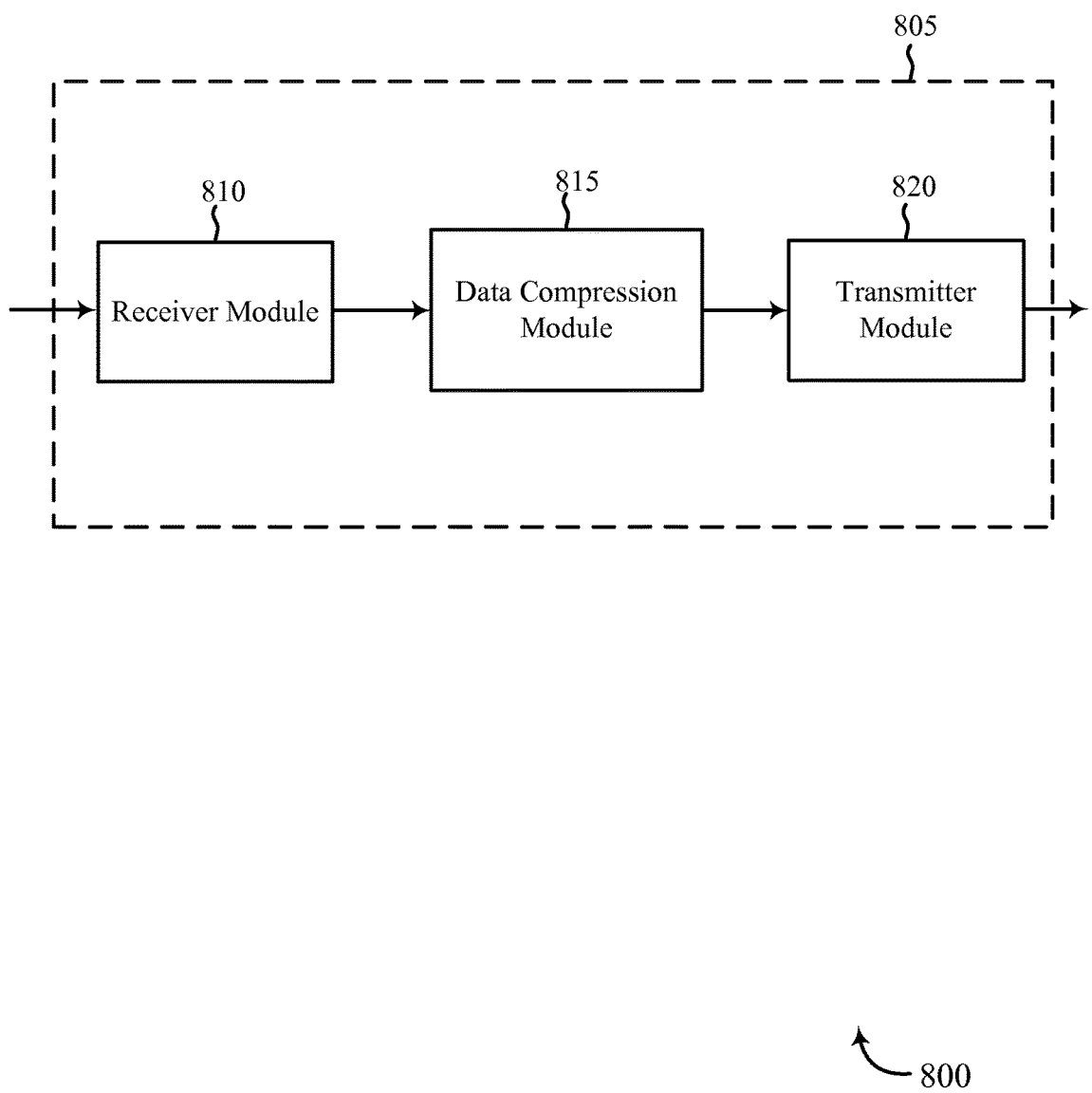
FIG. 8 shows a block diagram of a device configured for use in wireless communication, in accordance with various aspects of the present disclosure.

FIG. 8 shows a block diagram 800 of a device 805 for use in wireless communication in accordance with various aspects of the present disclosure. The device 805 may be an example of one or more aspects of a UE 115 described with reference to one or more of FIGS. 1-7. The device 805 may include a receiver module 810, a UE data compression module 815, and/or a transmitter module 820. The device 805 may also be or include a processor (not shown). Each of these modules may be in communication with each other.

The components of the device 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 810 may receive information such as packets, user data, and/or control information associated with various information channels (e.g., control channels, data channels, etc.) over one or more communication links of a wireless communication system, such as one or more communication links of the wireless communications systems 100, 200, 300-302, 400, 500, 501, 600, or 700 as described with reference to FIGS. 1-7. The receiver module 810 may be configured to receive compressed data packets and signaling information. Information may be passed on to the UE data compression module 815, and to other components of the device 805. In some examples, the information may include data compression information related to initiating or continuing data compression on transmitted/received packets. In other examples, receiver module 810 may receive, from a target base station, an indication of a data compression capability of the target base station, the indication based at least in part on the context identifier.

The UE data compression module 815 may receive packets from a PDCP layer and compress the packets according to data compression algorithms identified by a base station, in a manner similarly as discussed above with respect to FIGS. 1-7. The UE data compression module 815 may, in some cases, receive packets from a RLC layer and decompress the packets according to data compression algorithms identified by a base station, in a manner similarly as discussed above with respect to FIGS. 1-7. The UE data compression module 815 also may determine that data compression techniques may be continued following a handover to a target base station, following a RLF, or upon the establishment of a new RRC connection, such as discussed above with respect to FIGS. 1-7.

In some examples, the UE data compression module 815 may communicate with a source base station utilizing a data compression scheme, receive a context identifier associated with the data compression scheme from a source base station, transmit the context identifier to a target base station, and receive, from the target base station, an indication of a data compression capability of the target base station, the indication based at least in part on the context identifier The transmitter module 820 may transmit the one or more signals received from other components of the device 805. The transmitter module 820 may transmit, for example, compressed data packets to a base station over a wireless communication link, in a manner similarly as discussed above. The transmitter module 820 may also transmit acknowledgments, status PDUs, and compressed or decompressed data packets to a base station over a wireless communication link. In some examples, the transmitter module 820 may transmit the context identifier to a target base station. In some cases, the transmitter module 820 may send an indication of a data compression capability to the UE based at least in part on the context identifier and the information received from the source base station. In some examples, the transmitter module 820 may be collocated with the receiver module 810 in a transceiver module.

Figure 9:
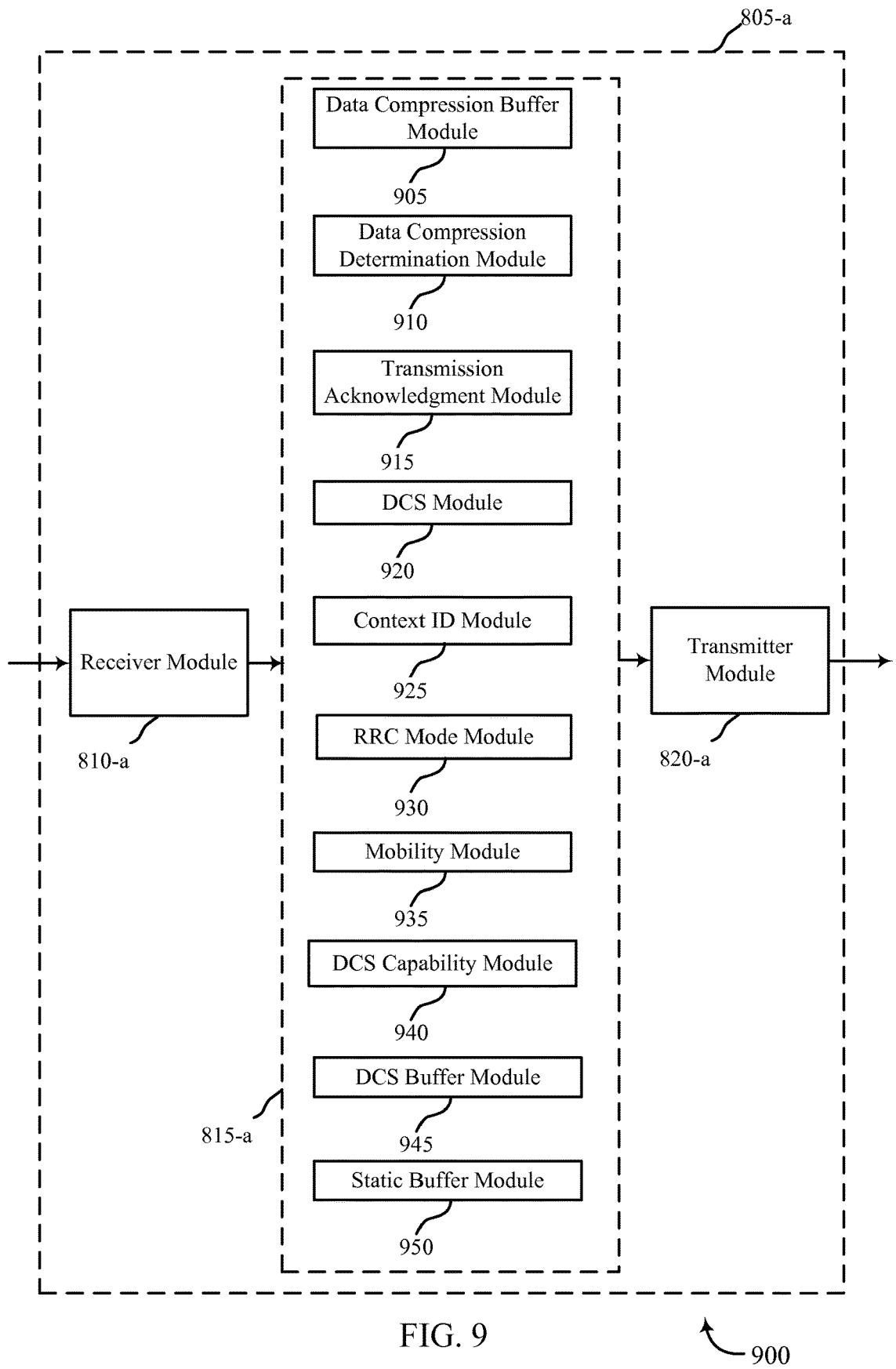
FIG. 9 shows a block diagram of a device configured for use in wireless communication, in accordance with various aspects of the present disclosure.

FIG. 9 shows a block diagram 900 of a device 805-*a* for use in wireless communication, in accordance with various examples. The device 805-*a* may be an example of one or more aspects of a UE 115 described with reference to one or more of FIGS. 1-7. It may also be an example of a device 805 described with reference to FIG. 8. The device 805-*a* may include a receiver module 810-*a*, a UE data compression module 815-*a*, and/or a transmitter module 820-*a*, which may be examples of the corresponding modules of device 805. The device 805-*a* may also include a processor (not shown). Each of these components may be in communication with each other. The UE data compression module 815-*a* may include a data compression buffer module 905, a data compression determination module 910, a transmission acknowledgment module 915, a DCS module 920, and a context ID module 925, a RRC mode module 930, a mobility module 935, a DCS capability module 940, a DCS buffer module 945, and a static buffer module 950. The receiver module 810-*a* and the transmitter module 820-*a* may perform the functions of the receiver module 810 and the transmitter module 820, of FIG. 8, respectively.

The data compression buffer module 905 may include, for example, eDCS buffer and static eDCS buffer as discussed above with respect to FIGS. 1-7. The data compression determination module 910 may perform data compression management and determination of whether and what type of data compression is to be used for wireless communications. For example, data compression determination module 910 may receive information related to data compression capabilities of a source or target base station, and initiate or continue data compression routines based on the received information, in a manner similarly as described above with respect to FIGS. 1-7.

The transmission acknowledgment module 915 may perform acknowledgment functions and determination of any holes in a sequence of received packets. For example, transmission acknowledgment module 915 may identify PDCP SNs of received packets, transmit associated ACKs to a base station that transmitted the packets, and may provide status information related to received packets for transmission in a status PDU, in a manner similarly as described above with respect to FIGS. 1-7. The DCS module 920 may communicate with a source base station utilizing a data compression scheme as described above with reference to FIGS. 1-7. The DCS module 920 may also transmit a set of context capabilities to the target base station, which may include the context identifier.

The context ID module 925 may receive a context identifier associated with the data compression scheme from a source base station as described above with reference to FIGS. 1-7. In some examples, the transmission of the context identifier may be triggered by a paging message or an MO message. In some examples, the transmission of the context identifier may be triggered by historical behavior of a UE. In some examples, the transmission of the context identifier may be triggered by a subscription criterion.

RRC mode module 930 may cause a wireless device of which module 815-*a* is a part (e.g., a UE 115) to transition to an idle mode while connected to a source base station as described above with reference to FIGS. 1-7. The mobility module 935 may perform an idle mode mobility procedure from the source base station to a target base station, which may occur after receiving the context identifier from the source base station and after transitioning to an idle mode, as described above with reference to FIGS. 1-7.

The DCS capability module 940 may determine that continuity of the data compression scheme is supported at the target base station based on the indication of the data compression capability as described above with reference to FIGS. 1-7. The DCS capability module 940 may also determine that continuity of the data compression scheme is unsupported at the target base station based on the indication of the data compression capability.

The DCS buffer module 945 may communicate with the target base station utilizing the data compression scheme based determining that continuity of the data compression scheme is supported as described above with reference to FIGS. 1-7. The DCS buffer module 945 may, additionally or alternatively, reset a data compression buffer based at least in part on the determining.

In some examples, the indication of a data compression capability of at target base station includes a context checkpoint identifier. The context checkpoint identifier may correspond to a current version of data compression context information maintained in a data compression buffer. Or, the context checkpoint identifier may correspond to an earlier version of data compression context information than currently maintained in a data compression buffer. The DCS buffer module 945 may reset the data compression buffer based on the checkpoint identifier. The static buffer module 950 may reference context information of a static buffer irrespective of UE specific data compression context information as described above with reference to FIGS. 1-7.

Figure 10:
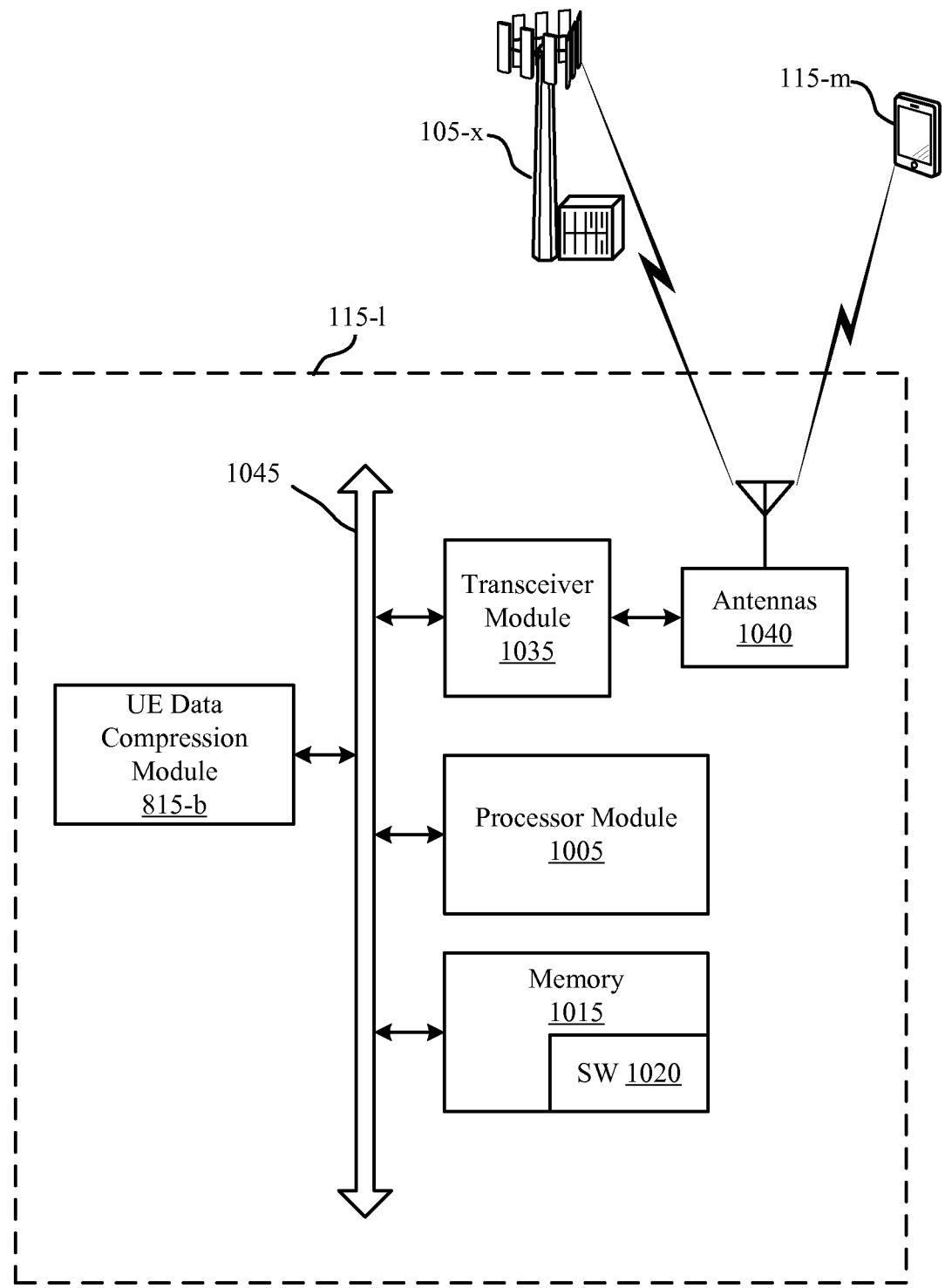
FIG. 10 shows a block diagram of a wireless communication system, in accordance with various aspects of the present disclosure.

FIG. 10 shows a system 1000 for use in wireless communication in accordance with various examples. System 1000 may include a UE 115-1, which may be an example of the UEs 115 of one or more of FIGS. 1-7. UE 115-1 may also be an example of one or more aspects of devices 805 of FIGS. 8 and 9. UE 115-1 may include an data compression module 815-*b*, which may be an example of an data compression module 815 described with reference to FIGS. 8 and 9. UE 115-1 may also include components for bi-directional voice and data communications including components for transmitting communications and components for receiving communications. For example, UE 115-1 may communicate bi-directionally with base station 105-*x* or UE 115-*m*.

The UE 115-1 may generally include components for bi-directional voice and data communications including components for transmitting communications and components for receiving communications. The UE 115-1 may include antenna(s) 1040, a transceiver module 1035, a processor module 1005, and memory 1015 (including software (SW) 1020), where each may communicate, directly or indirectly, with each other (e.g., via one or more buses 1045). The transceiver module 1035 may be configured to communicate bi-directionally, via the antenna(s) 1040 and/or one or more wired or wireless communication links, with one or more networks, as described above. For example, the transceiver module 1035 may be configured to communicate bi-directionally with base stations 105, such as base station 105-*x*, or with UEs 115, such as UE 115-*m*. The transceiver module 1035 may include a modem configured to modulate the packets and provide the modulated packets to the antenna(s) 1040 for transmission, and to demodulate packets received from the antenna(s) 1040. While the UE 115-1 may include a single antenna 1040, the UE 115-1 may have multiple antennas 1040 capable of concurrently transmitting and/or receiving multiple wireless transmissions. The transceiver module 1035 may be capable of concurrently communicating with one or more base stations 105 via multiple component carriers.

The UE 115-1 may include a UE data compression module 815-*b*, which may perform the functions, described above for the UE data compression modules 815 of device 805 of FIG. 8 or 9. For example, the UE data compression module 815-*b* may receive packets from a PDCP layer and compress the packets according to data compression algorithms identified by a base station, in a manner similarly as discussed above with respect to FIGS. 1-7. The UE data compression module 815-*b* also may determine that data compression techniques may be continued following a handover to a target base station, following a RLF, or upon the establishment of a new RRC connection, such as discussed above with respect to FIGS. 1-7

In some cases, the UE data compression module 815-*b* may receive packets at an RLC layer and decompress the packets according to data compression algorithms identified by a base station, in a manner similarly as discussed above with respect to FIGS. 1-7. The UE data compression module 815-*b* also may determine that data compression techniques may be continued following a handover to a target base station, following a RLF, or upon the establishment of a new RRC connection, such as discussed above with respect to FIGS. 1-7.

The memory 1015 may include random access memory (RAM) and read-only memory (ROM). The memory 1015 may store computer-readable, computer-executable software/firmware code 1020 containing instructions that are configured to, when executed, cause the processor module 1005 to perform various functions described herein (e.g., data compression, determination of continued use of data compression following handover, etc.). Alternatively, the computer-readable, computer-executable software/firmware code 1020 may not be directly executable by the processor module 1005 but be configured to cause a computer (e.g., when compiled and executed) to perform functions described herein. The processor module 1005 may include an intelligent hardware device, e.g., a central processing unit (CPU), a microcontroller, an application-specific integrated circuit (ASIC), etc.

Figure 11:
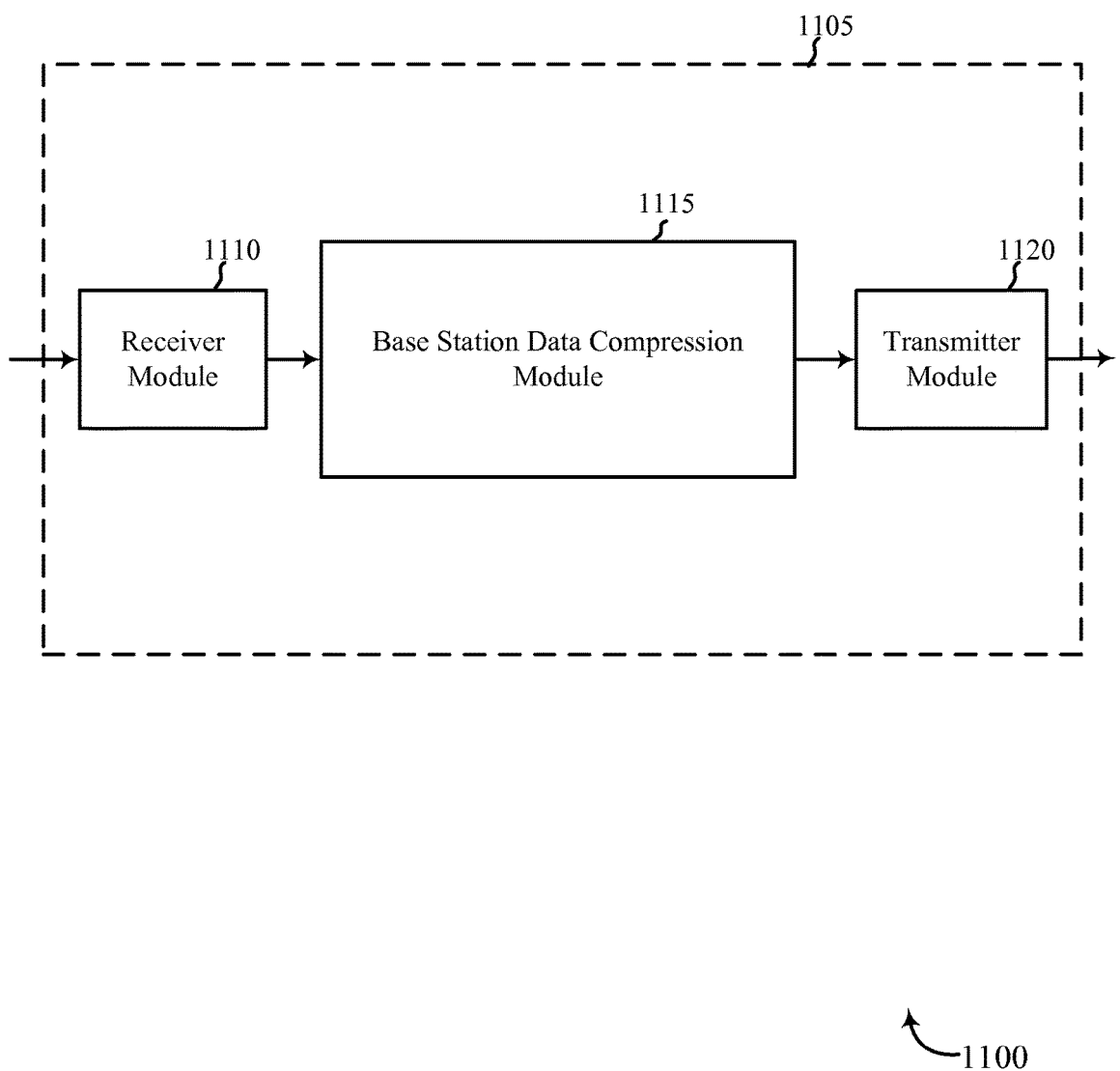
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base stations 105 described with reference to one or more of FIGS. 1-7. In some examples, the apparatus 1105 may be part or include an LTE/LTE-A eNB and/or an LTE/LTE-A base station. The apparatus 1105 may also be a processor. The apparatus 1105 may include a receiver module 1110, a base station data compression module 1115, and/or a transmitter module 1120. Each of these modules may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1110 may include at least one radio frequency (RF) receiver, such as an RF receiver operable to receive compressed data packets from one or more UEs. The receiver module 1110 may be used to receive various types of data and/or control signals (i.e., transmissions) over one or more communication links of a wireless communication system, such as one or more communication links of the wireless communications systems 100, 200, 300-302, 400, 500, 501, 600, or 700 as described with reference to FIGS. 1-7. In some examples, the receiver module 810 may receive, from the UE, a context identifier associated with the data compression scheme.

The base station data compression module 1115 may perform data compression operations and determinations such as discussed above with respect to FIGS. 1-7. For example, the base station data compression module 1115 may, in combination with receiver module 1110 or transmitter module 1120, establish a connection with a UE, receive, from the UE, a context identifier associated with the data compression scheme, send a request for data compression context information to a source base station based on the context identifier, and receive a response from the source base station. The response may indicate the availability of context information for the data compression scheme or that the context information is unavailable. The base station data compression module 1115, in combination with the transmitter module 1120, may thus send an indication of a data compression capability to the UE based on the context identifier and the information received from the source base station.

In some examples, the transmitter module 1120 may include at least one RF transmitter, such as at least one RF transmitter operable to transmit information related to data compression, in a manner similarly as discussed above with respect to FIGS. 1-7. The transmitter module 1120 may be used to transmit various types of data and/or control signals (i.e., transmissions) over one or more communication links of a wireless communication system, such as one or more communication links of the wireless communications system 100-500 described with reference to FIGS. 1-7. In some examples, the transmitter module 1120 may send an indication of a data compression capability to the UE based at least in part on the context identifier and the information received from the source base station.

Figure 12:
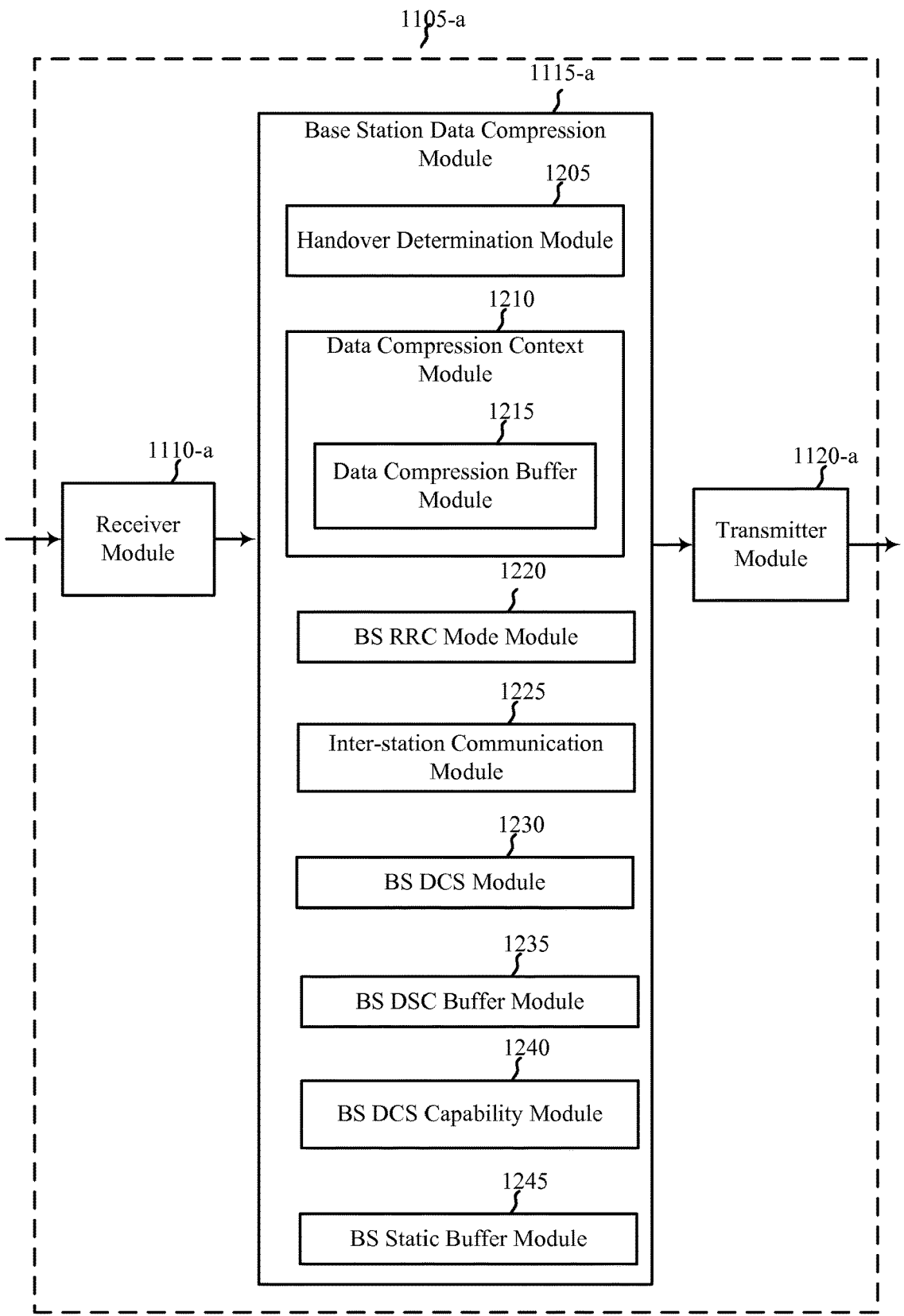
FIG. 12 shows a block diagram of an apparatus for use in wireless communication, in accordance with various aspects of the present disclosure.

FIG. 12 shows a block diagram 1200 of an apparatus 1105-*a* for use in wireless communication, in accordance with various aspects of the present disclosure. In some examples, the apparatus 1105-*a* may be an example of aspects of one or more of the base stations 105 described with reference to one or more of FIGS. 1-7 and/or an example of aspects of the apparatus 1105 described with reference to FIG. 11. In some examples, the apparatus 1105-*a* may be part or include an LTE/LTE-A eNB and/or an LTE/LTE-A base station. The apparatus 1105-*a* may also be a processor. The apparatus 1105-*a* may include a receiver module 1110-*a*, a base station data compression module 1115-*a*, and/or a transmitter module 1120-*a*. Each of these modules may be in communication with each other.

The components of the apparatus 1105-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1110-*a* may be an example of one or more aspects of the receiver module 1110 described with reference to FIG. 11. In some examples, the receiver module 1110-*a* may include at least one radio frequency (RF) receiver, such as at least one RF receiver operable to receive compressed data packets. The receiver module 1110-*a* may be used to receive various types of data and/or control signals (i.e., transmissions) over one or more communication links of a wireless communication system, such as one or more communication links of the wireless communications systems 100, 200, 300-302, 400, 500, 501, 600, or 700 as described with reference to FIGS. 1-7.

In some examples, the transmitter module 1120-*a* may be an example of one or more aspects of the transmitter module 1120 described with reference to FIG. 11. In some examples, the transmitter module 1120-*a* may include at least one RF transmitter, such as at least one RF transmitter operable to transmit compressed data packets and control information related to the use of data compression routines. The transmitter module 1120-*a* may be used to transmit various types of data and/or control signals (i.e., transmissions) over one or more communication links of a wireless communications system, such as one or more communication links of the wireless communications system 100, 200, 300-302, 400, 500, 501, 600, or 700 as described with reference to FIGS. 1-7.

In the example of FIG. 12, the base station data compression module 1115-*a* includes a handover determination module 1205 and a data compression context module 1210 that includes a data compression buffer module 1215. The handover determination module 1205, in some examples, may make determinations related to handover of a UE to a target base station. Such determinations may be made according to established techniques and be based on, for example, channel conditions, loading at the base station, loading at other base stations, capabilities of base stations, etc. The data compression context module 1210 may establish and maintain data compression context information, and may include data compression buffer module 1215 that may contain, for example, eDCS buffer and static eDCS buffer such as discussed above with respect to FIGS. 1-7. The data compression context module 1210 may be used to forward data compression context information to one or more other base stations in a manner similarly as discussed above with respect to FIGS. 1-7.

The base station data compression module 1115-*a* may also include a base station RRC mode module 1220, an inter-station communication module 1225, a base station DCS module 1230. The base station RRC mode module 1220 may establish a connection with a UE as described above with reference to FIGS. 1-7. The inter-station communication module 1225 may send a request for data compression context information to a source base station based at least in part on the context identifier as described above with reference to FIGS. 1-7. The base station DCS module 1230 may receive a response from the source base station, the response indicating the availability of context information for the data compression scheme or that the context information is unavailable as described above with reference to FIGS. 1-7.

The base station data compression module 1115-*a* may also include a base station DCS buffer module 1235, base station DCS capability module 1240, and a base station static buffer module 1245. The base station DCS buffer module 1235 may be configured to include a context checkpoint identifier in an indication of data compression capability as described above with reference to FIGS. 1-7. The base station DCS capability module 1240 may receive a set of context capabilities from a UE, in some examples, the set of context capabilities comprises the context identifier as described above with reference to FIGS. 1-7. The base station static buffer module 1245 may reference context information of a static buffer context irrespective of UE-specific data compression context information as described above with reference to FIGS. 1-7.

Figure 13:
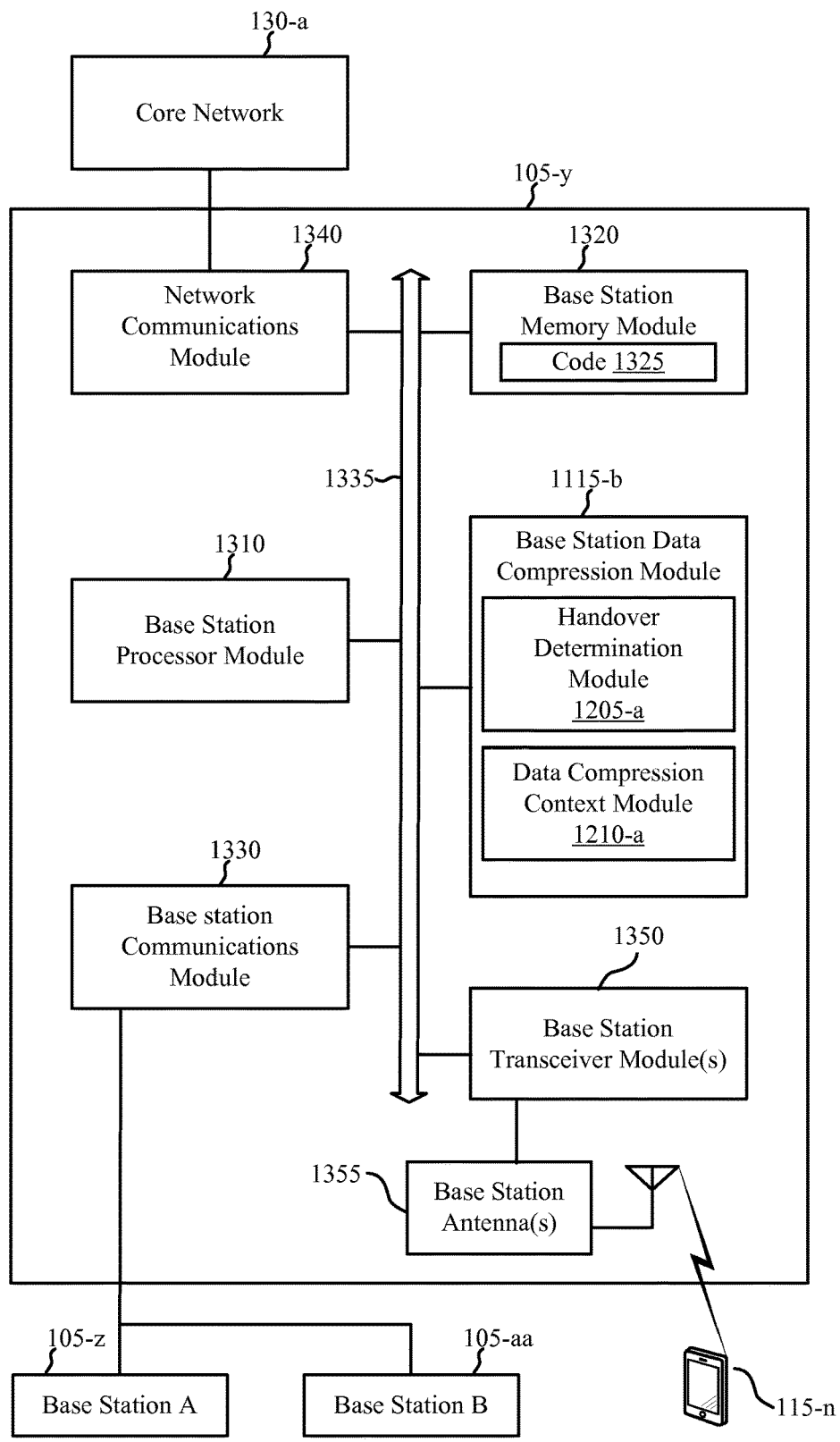
FIG. 13 shows a block diagram of a base station (e.g., a base station forming part or all of an eNB) for use in wireless communication, in accordance with various aspects of the present disclosure.

FIG. 13 shows a block diagram 1300 of a base station 105-*y* (e.g., a base station forming part or all of an eNB) for use in wireless communication, in accordance with various aspects of the present disclosure. In some examples, the base station 105-*y* may be an example of aspects of one or more of the base stations 105 described with reference to one or more of FIGS. 1-7, and/or aspects of one or more of the apparatus 1105 when configured as a base station, as described with reference to FIG. 11 or 12. The base station 105-*y* may be configured to implement or facilitate at least some of the base station and/or apparatus features and functions described with reference to one or more of FIG. 1-7, 11 or 12.

The base station 105-*y* may include a base station processor module 1310, a base station memory module 1320, at least one base station transceiver module (represented by base station transceiver module(s) 1350), at least one base station antenna (represented by base station antenna(s) 1355), and/or a base station data compression module 1115-*b*. The base station 105-*a* may also include one or more of a base station communications module 1330 and/or a network communications module 1340. Each of these modules may be in communication with each other, directly or indirectly, over one or more buses 1335.

The base station memory module 1320 may include random access memory (RAM) and/or read-only memory (ROM). The base station memory module 1320 may store computer-readable, computer-executable software/firmware code 1325 containing instructions that are configured to, when executed, cause the base station processor module 1310 to perform various functions described herein related to wireless communication (e.g., data compression operations, support continuity of an evolved data compression scheme through an idle mobility procedure or RRC connection setup procedure, etc.). Alternatively, the computer-readable, computer-executable software/firmware code 1325 may not be directly executable by the base station processor module 1310 but be configured to cause the base station 105-*y* (e.g., when compiled and executed) to perform various of the functions described herein.

The base station processor module 1310 may include an intelligent hardware device, e.g., a central processing unit (CPU), a microcontroller, an ASIC, etc. The base station processor module 1310 may process information received through the base station transceiver module(s) 1350, the base station communications module 1330, and/or the network communications module 1340. The base station processor module 1310 may also process information to be sent to the transceiver module(s) 1350 for transmission through the antenna(s) 1355, to the base station communications module 1330, for transmission to one or more other base stations 105, and/or to the network communications module 1340 for transmission to a core network 130-*a*, which may be an example of one or more aspects of the core network 130 described with reference to FIG. 1. The transceiver module may be an example of a combined receiver module 1110 and transmitter module 1120 of FIG. 11. The base station processor module 1310 may handle, alone or in connection with the base station data compression module 1115-*b*, various aspects of data compression techniques as discussed above with respect to FIGS. 1-7.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in a first radio frequency spectrum band and/or a second radio frequency spectrum band. The base station transceiver module(s) 1350 may be configured to communicate bi-directionally, via the antenna(s) 1355, with one or more UEs or apparatuses, such as UE 115-*n* or one or more of the UEs 115 described with reference to FIGS. 1-10. The base station 105-*y* may, for example, include multiple base station antennas 1355 (e.g., an antenna array). The base station 105-*y* may communicate with the core network 130-*a* through the network communications module 1340. The base station 105-*y* may also communicate with other base stations, such as the base stations 105-*z* and 105-*aa*, using the base station communications module 1330.

The base station data compression module 1115-*b* may be configured to perform and/or control some or all of the features and/or functions described with reference to FIGS. 1-7 related to data compression operations. The base station data compression module 1115-*b*, or portions of the module 1115-*b*, may include a processor, and/or some or all of the functions of the base station data compression module 1115-*b* may be performed by the base station processor module 1310 and/or in connection with the base station processor module 1310. In some examples, the base station data compression module 1115-*b* may be an example of the base station data compression module 1115 and/or 1115-*a* described with reference to FIGS. 11 and/or 12.

Figure 14:
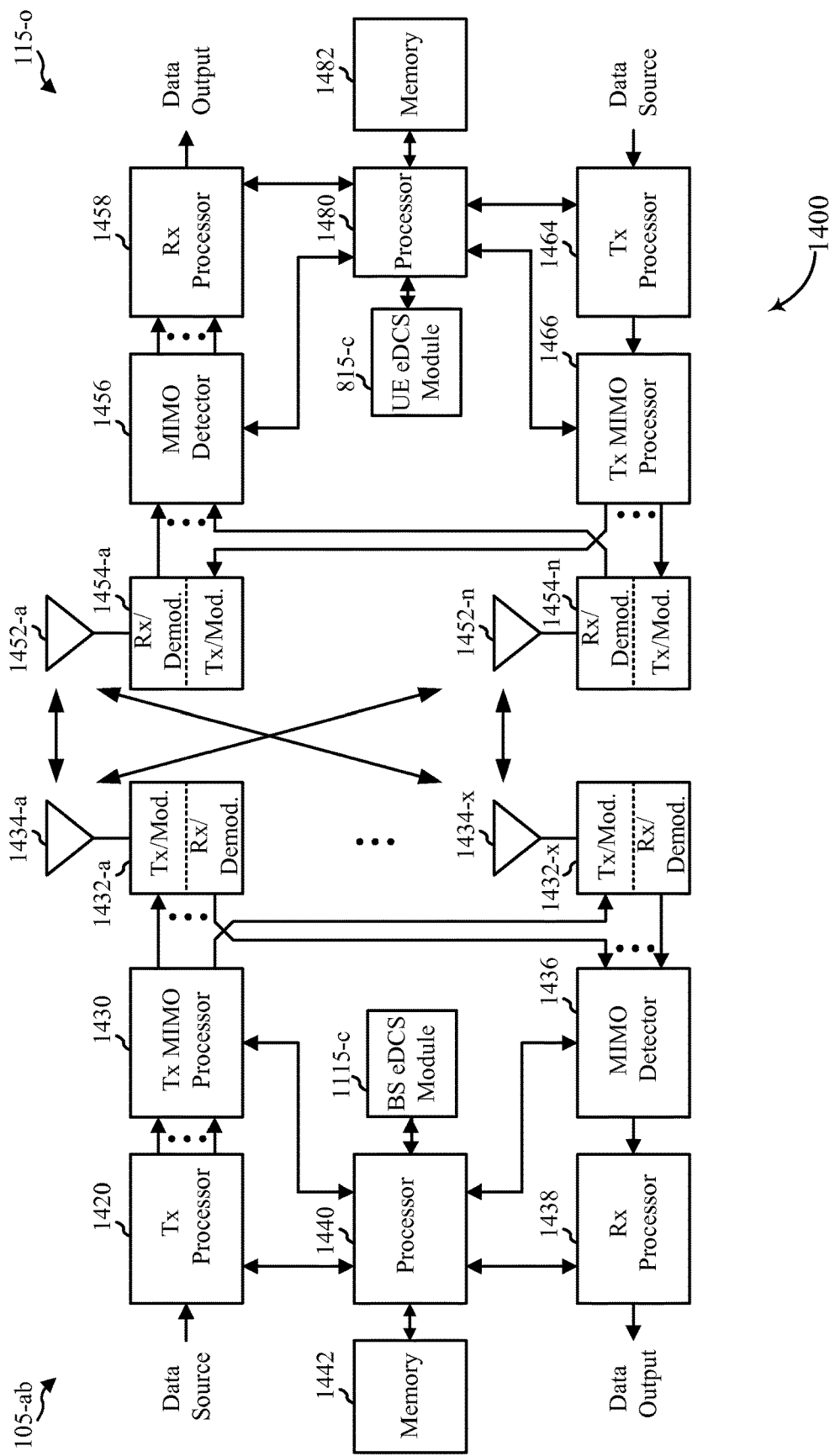
FIG. 14 shows a block diagram of a multiple-input/multiple-output communication system, in accordance with various aspects of the present disclosure.

FIG. 14 is a block diagram of a multiple input/multiple output (MIMO) communication system 1400 including a base station 105-*ab* and a UE 115-*o*. The MIMO communication system 1400 may illustrate aspects of the wireless communications systems 100, 200, 300-302, 400, 500, 501, 600, or 700 shown in FIGS. 1-7. The base station 105-*ab* may be equipped with antennas 1434-*a* through 1434-*x*, and the UE 115-*o* may be equipped with antennas 1452-*a* through 1452-*n*. In the MIMO communication system 1400, the base station 105-*ab* may be able to send data over multiple communication links at the same time. Each communication link may be called a "layer" and the "rank" of the communication link may indicate the number of layers used for communication. For example, in a 2×2 MIMO communication system where base station 105-*ab* transmits two "layers," the rank of the communication link between the base station 105-*ab* and the UE 115-*o* is two.

At the base station 105-*ab*, a transmit processor 1420 may receive data from a data source. The transmit processor 1420 may process the data. The transmit processor 1420 may also generate control symbols and/or reference symbols. A transmit (TX) MIMO processor 1430 may perform spatial processing (e.g., precoding) on data symbols, control symbols, and/or reference symbols, if applicable, and may provide output symbol streams to the transmit modulators/demodulators 1432-*a* through 1432-*x*. Each modulator/demodulator 1432 may process a respective output symbol stream (e.g., for OFDM, etc.) to obtain an output sample stream. Each modulator/demodulator 1432 may further process (e.g., convert to analog, amplify, filter, and upconvert) the output sample stream to obtain a DL signal. In one example, DL signals from modulators/demodulators 1432-*a* through 1432-*x* may be transmitted via the antennas 1434-*a* through 1434-*x*, respectively.

At the UE 115-*o*, the UE antennas 1452-*a* through 1452-*n* may receive the DL signals from the base station 105-*ab* and may provide the received signals to the modulators/demodulators 1454-*a* through 1454-*n*, respectively. Each modulators/demodulator 1454 may condition (e.g., filter, amplify, downconvert, and digitize) a respective received signal to obtain input samples. Each modulator/demodulator 1454 may further process the input samples (e.g., for OFDM, etc.) to obtain received symbols. A MIMO detector 1456 may obtain received symbols from all the modulators/demodulators 1454-*a* through 1454-*n*, perform MIMO detection on the received symbols, if applicable, and provide detected symbols. A receive processor 1458 may process (e.g., demodulate, deinterleave, and decode) the detected symbols, providing decoded data for the UE 115-*o* to a data output, and provide decoded control information to a processor 1480, or memory 1482.

The processor 1480 may in some cases execute stored instructions to instantiate one or more of a UE eDCS module 815-*c*. The UE eDCS module 815-*c* may be an example of aspects of the UE data compression module 815 described with reference to FIGS. 8-10.

On the uplink (UL), at the UE 115-0, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the modulators/demodulators 1454-*a* through 1454-*n* (e.g., for SC-FDMA, etc.), and be transmitted to the base station 105-*ab* in accordance with the transmission parameters received from the base station 105-*ab*. At the base station 105-*ab*, the UL signals from the UE 115-*o* may be received by the antennas 1434, processed by the modulators/demodulators 1432, detected by a MIMO detector 1436 if applicable, and further processed by a receive processor 1438. The receive processor 1438 may provide decoded data to a data output and to the processor 1440 and/or memory 1442. The processor 1440 may in some cases execute stored instructions to instantiate one or more of a base station data compression (eDCS) module 1115-*c*. The base station data compression (eDCS) module 1115-*c* may be an example of aspects of the base station data compression module 1115 described with reference to FIGS. 11-13.

The components of the UE 115-*o* may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 105-*f* may, individually or collectively, be implemented with one or more ASICs adapted to perform some or all of the applicable functions in hardware. Each of the noted components may be a means for performing one or more functions related to operation of the MIMO communication system 1400.

Figure 15:
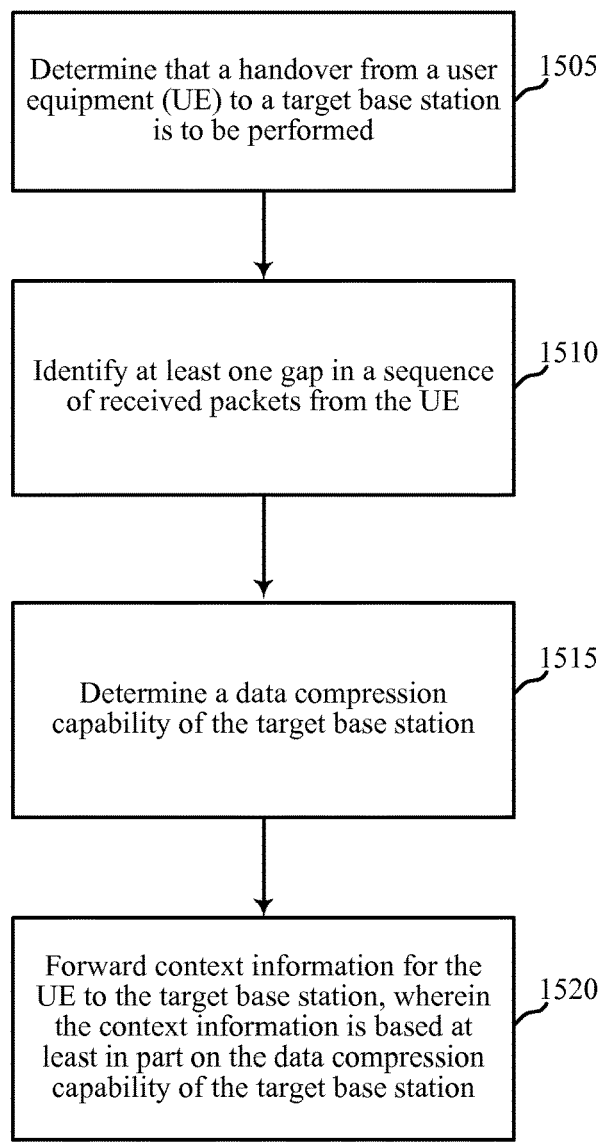
FIGS. 15-18 are flow charts illustrating examples of a method for facilitating data compression at a base station following handover in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105 described with reference to FIGS. 1-7 and/or aspects of one or more of the apparatus 1105 described with reference to FIGS. 11-13. In some examples, a base station may execute one or more sets of codes to control the functional elements of the base station to perform the functions described below. Additionally or alternatively, the base station may perform one or more of the functions described below using special-purpose hardware. The method 1500 may also incorporate aspects of methods 1600-2200 of FIGS. 16-22.

At block 1505, the method 1500 may determine that a handover from a user equipment (UE) to a target base station is to be performed. The operation(s) at block 1505 may be performed using the base station data compression module 1115 described with reference to FIGS. 11-13, or using the handover determination module 1205 of FIG. 12.

At block 1510, the method 1500 may identify at least one gap in a sequence of received packets from the UE. The operation(s) at block 1510 may be performed using the base station data compression module 1115 described with reference to FIG. 11, for example.

At block 1515, the method 1500 may determine a data compression capability of the target base station. The operation(s) at block 1515 may be performed using the base station data compression module 1115 described with reference to FIG. 11.

At block 1520, the method 1500 may forward context information for the UE to the target base station, wherein the context information is based at least in part on the data compression capability of the target base station. The operation(s) at block 1520 may be performed using the base station data compression module 1115 described with reference to FIG. 11, and/or the base station communications module 1330 of FIG. 13, for example.

Thus, the method 1500 may provide for wireless communication. It should be noted that the method 1500 is just one implementation and that the operations of the method 1500 may be rearranged or otherwise modified such that other implementations are possible.

Figure 16:
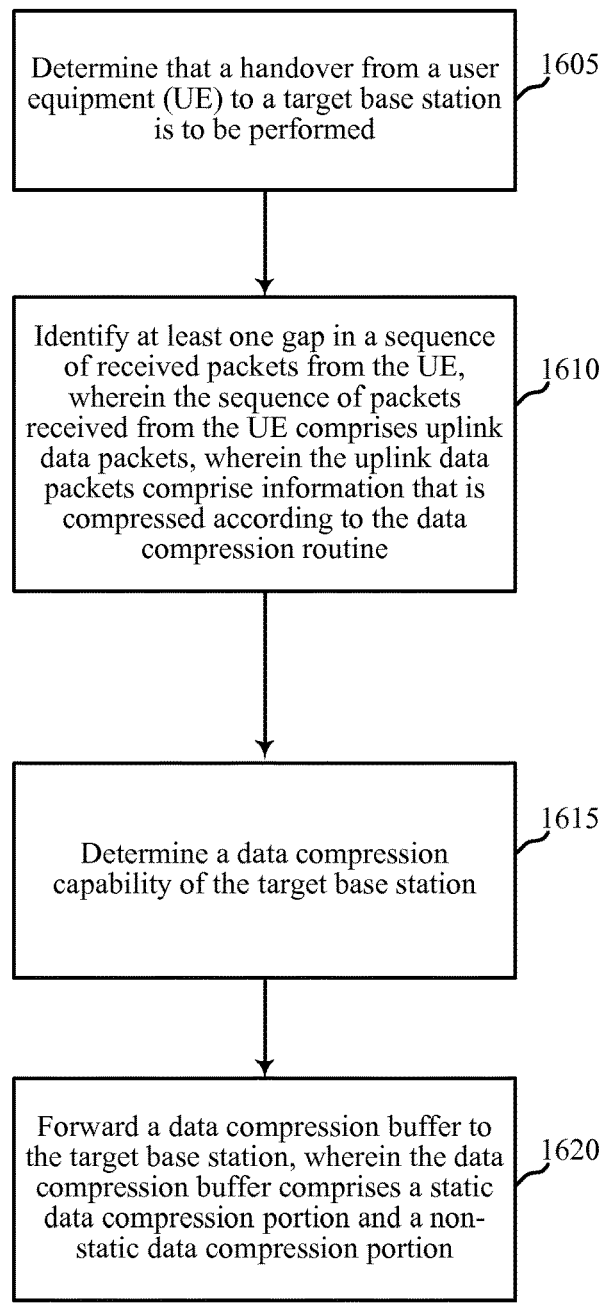

FIG. 16 is a flow chart illustrating an example of a method 1600 for wireless communication in accordance with various aspects of the present disclosure. For clarity, the method 1600 is described below with reference to aspects of one or more of the base stations 105 described with reference to FIGS. 1-7 and/or aspects of one or more of the apparatus 1105 described with reference to FIGS. 11-13. In some examples, a base station may execute one or more sets of codes to control the functional elements of the base station to perform the functions described below. Additionally or alternatively, the base station may perform one or more of the functions described below using special-purpose hardware. The method 1600 may also incorporate aspects of methods 1500 or 1700-2200 of FIGS. 15 and 17-22.

At block 1605, the method 1600 may determine that a handover from a user equipment (UE) to a target base station is to be performed. The operation(s) at block 1605 may be performed using the base station data compression module 1115 described with reference to FIGS. 11-13, or using the handover determination module 1205 of FIG. 12.

At block 1610, the method 1600 may identify at least one gap in a sequence of received packets from the UE, where the sequence of packets received from the UE comprises uplink data packets, where the uplink data packets comprise information that is compressed according to the data compression routine. The operation(s) at block 1610 may be performed using the base station data compression module 1115 described with reference to FIG. 11, for example.

At block 1615, the method 1600 may determine a data compression capability of the target base station. The operation(s) at block 1615 may be performed using the base station data compression module 1115 described with reference to FIG. 11.

At block 1620, the method 1600 Forward a data compression buffer to the target base station, wherein the data compression buffer comprises a static data compression portion and a non-static data compression portion. The operation(s) at block 1620 may be performed using the base station data compression module 1115 described with reference to FIG. 11, and/or the base station communications module 1330 of FIG. 13, for example.

Figure 17:
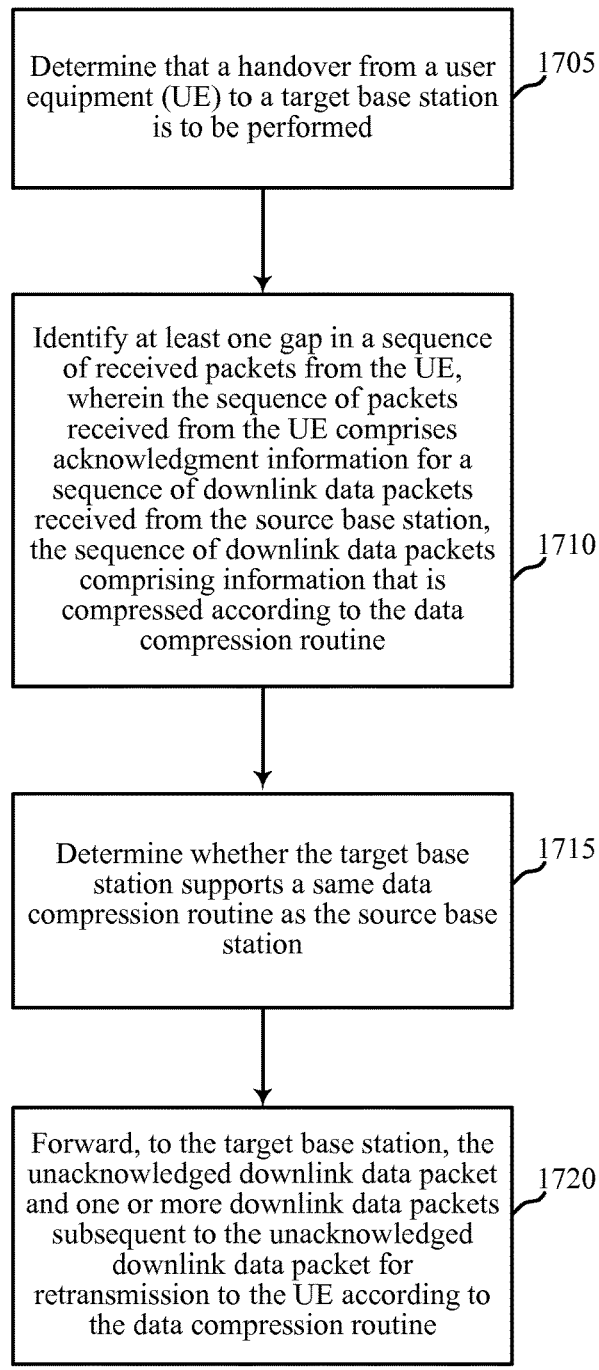

FIG. 17 is a flow chart illustrating an example of a method 1700 for wireless communication in accordance with various aspects of the present disclosure. For clarity, the method 1700 is described below with reference to aspects of one or more of the base stations 105 described with reference to FIGS. 1-7 and/or aspects of one or more of the apparatus 1105 described with reference to FIGS. 11-13. In some examples, a base station may execute one or more sets of codes to control the functional elements of the base station to perform the functions described below. Additionally or alternatively, the base station may perform one or more of the functions described below using special-purpose hardware. The method 1700 may also incorporate aspects of methods 1500, 1600, or 1800-2200 of FIGS. 15, 16, and 18-22.

At block 1705, the method 1700 may determine that a handover from a user equipment (UE) to a target base station is to be performed. The operation(s) at block 1705 may be performed using the base station data compression module 1115 described with reference to FIGS. 11-13, or using the handover determination module 1205 of FIG. 12.

At block 1710, the method 1700 may identify at least one gap in a sequence of received packets from the UE, where the sequence of packets received from the UE comprises acknowledgment information for a sequence of downlink data packets received from the source base station (thus identifying an unacknowledged downlink data packet), the sequence of downlink data packets comprising information that is compressed according to the data compression routine. The operation(s) at block 1710 may be performed using the base station data compression module 1115 described with reference to FIG. 11, for example.

At block 1715, the method 1700 may determine whether the target base station supports a same data compression routine as the source base station. In some cases, the method may also include determining a data compression capability of the target base station. The operation(s) at block 1715 may be performed using the base station data compression module 1115 described with reference to FIG. 11.

At block 1720, the method 1700 may forward, to the target base station, the unacknowledged downlink data packet and one or more downlink data packets subsequent to the unacknowledged downlink data packet for retransmission to the UE according to the data compression routine. The operation(s) at block 1720 may be performed using the base station data compression module 1115 described with reference to FIG. 11, and/or the base station communications module 1330 of FIG. 13, for example.

Figure 18:
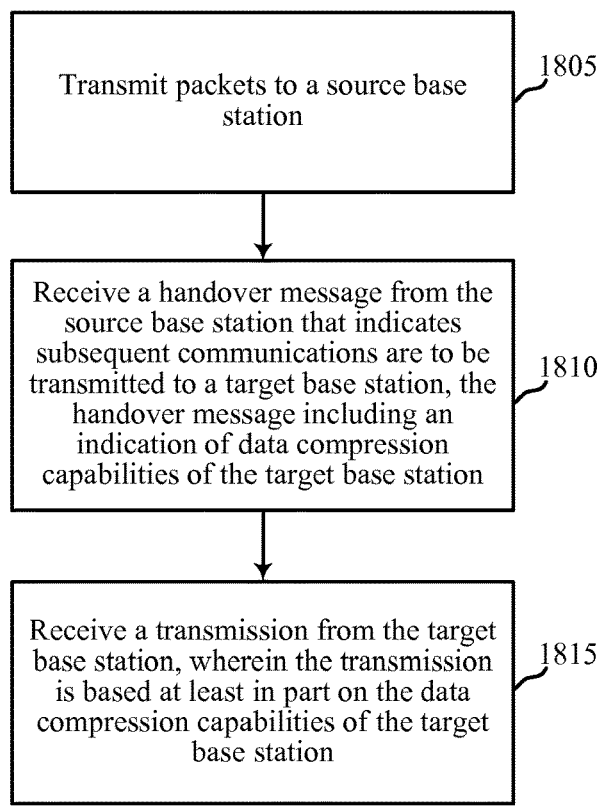

FIG. 18 is a flow chart illustrating an example of a method 1800 for wireless communication, in accordance with various aspects of the present disclosure. For clarity, the method 1800 is described below with reference to aspects of one or more of the UEs 115 described with reference to FIGS. 1-7, and/or aspects of one or more of the device 805 described with reference to FIGS. 8-10. In some examples, a UE 115 may execute one or more sets of codes to control the functional elements of the base station to perform the functions described below. Additionally or alternatively, the UE 115 may perform one or more of the functions described below using special-purpose hardware. The method 1800 may also incorporate aspects of methods 1500-1700, or 1900-2200 of FIGS. 15-17 and 19-22.

At block 1805, the method 1800 may transmit packets to a source base station. The operation(s) at block 1805 may be performed using the UE data compression module 815 and transmitter module 820 described with reference to FIG. 8, the transceiver module 1035 and antennas 1040 of FIG. 10, and/or using the antennas 1452 and modulators/demodulators 1454 of FIG. 14.

At block 1810, the method 1800 may receive a handover message from the source base station that indicates subsequent communications are to be transmitted to a target base station, the handover message including an indication of data compression capabilities of the target base station. The operation(s) at block 1810 may be performed using the UE data compression module 815 and receiver module 810 described with reference to FIG. 8, using the transceiver module 1035 and antennas 1040 of FIG. 10, and/or using the antennas 1452 and modulators/demodulators 1454 of FIG. 14.

At block 1815, the method 1800 may receive a transmission from the target base station, wherein the transmission is based at least in part on the data compression capabilities of the target base station. The operation(s) at block 1815 may be performed using the UE data compression module 815 and receiver module 810 described with reference to FIG. 8, using the transceiver module 1035 and antennas 1040 of FIG. 10, and/or using the antennas 1452 and modulators/demodulators 1454 of FIG. 14.

Thus, the method 1800 may provide for wireless communication. It should be noted that the method 1800 is just one implementation and that the operations of the method 1800 may be rearranged or otherwise modified such that other implementations are possible.

Figure 19:
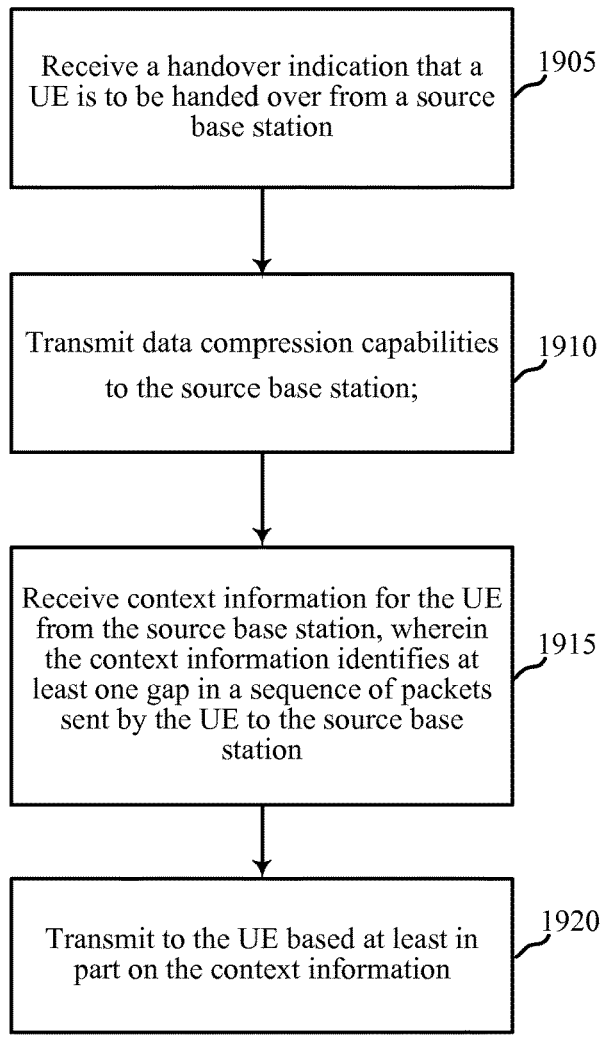
FIGS. 19-22 are flow charts illustrating examples of a method for facilitating data compression through a connection establishment procedure in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105 described with reference to FIGS. 1-7, and/or aspects of one or more of the apparatus 1105 described with reference to FIGS. 11-13. In some examples, a base station may execute one or more sets of codes to control the functional elements of the base station to perform the functions described below. Additionally or alternatively, the base station may perform one or more of the functions described below using special-purpose hardware. The method 1900 may also incorporate aspects of methods 1500-1800 or 1900-2200 of FIGS. 15-18 and 19-22.

At block 1905, the method 1900 may receive a handover indication that a UE is to be handed over from a source base station. The operation(s) at block 1905 may be performed using the base station data compression module 1115 described with reference to FIG. 11 or the handover determination module 1205 of FIG. 12.

At block 1910, the method 1900 may transmit data compression capabilities to the source base station. The operation(s) at block 1910 may be performed using performed using the base station data compression module 1115, for example, and/or transmitter module 1120 with reference to FIG. 11, and/or the base station communications module 1330 of FIG. 13.

At block 1915, the method 1900 may receive context information for the UE from the source base station, wherein the context information identifies at least one gap in a sequence of packets sent by the UE to the source base station. The operation(s) at block 1915 may be performed using the base station data compression module 1115 described with reference to FIG. 11 and/or the base station communications module 1330 of FIG. 13, for example.

At block 1920, the method 1900 may transmit to the UE based at least in part on the context information. The operation(s) at block 1920 may be performed using performed using the base station data compression module 1115, for example, and/or transmitter module 1120 with reference to FIG. 11.

Thus, the method 1900 may provide for wireless communication. It should be noted that the method 1900 is just one implementation and that the operations of the method 1900 may be rearranged or otherwise modified such that other implementations are possible.

Figure 20:
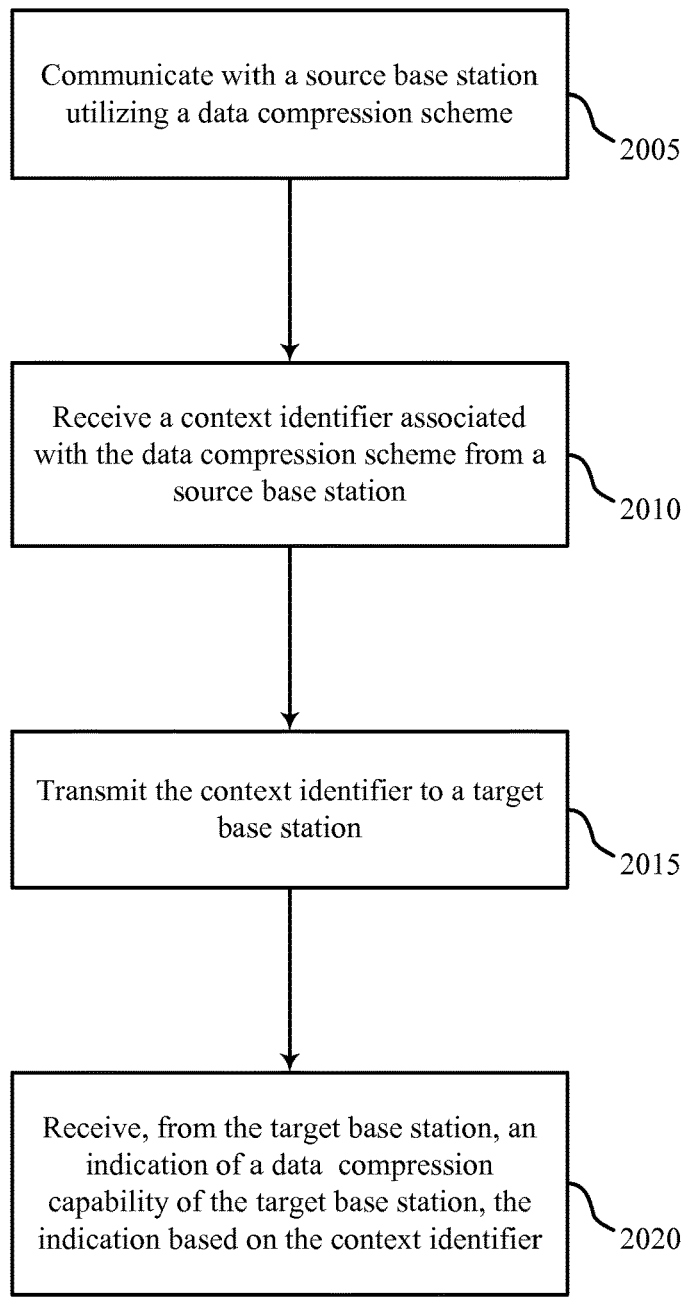

FIG. 20 shows a flowchart illustrating a method 2000 for facilitating data compression through a connection establishment procedure in accordance with various aspects of the present disclosure. The operations of method 2000 may be implemented by a UE 115 or its components as described with reference to FIGS. 1-10. For example, the operations of method 2000 may be performed by the data compression module 815 as described with reference to FIGS. 8-10. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1500-1900, 2100, or 2200 of FIGS. 15-19, 21 and 22.

At block 2005, the UE 115 may communicate with a source base station utilizing a data compression scheme as described above with reference to FIGS. 1-7. In certain examples, the operations of block 2005 may be performed by the data compression module 815 as described above with reference to FIG. 8.

At block 2010, the UE 115 may receive a context identifier associated with the data compression scheme from a source base station as described above with reference to FIGS. 1-7. In certain examples, the operations of block 2010 may be performed by the context ID module 925 as described above with reference to FIG. 9.

At block 2015, the UE 115 may transmit the context identifier to a target base station as described above with reference to FIGS. 1-7. In certain examples, the operations of block 2015 may be performed by the transmitter module 820 as described above with reference to FIG. 8.

At block 2020, the UE 115 may receive, from the target base station, an indication of a data compression capability of the target base station, the indication based at least in part on the context identifier as described above with reference to FIGS. 1-7. In certain examples, the operations of block 2020 may be performed by the receiver module 810 as described above with reference to FIG. 8.

Figure 21:
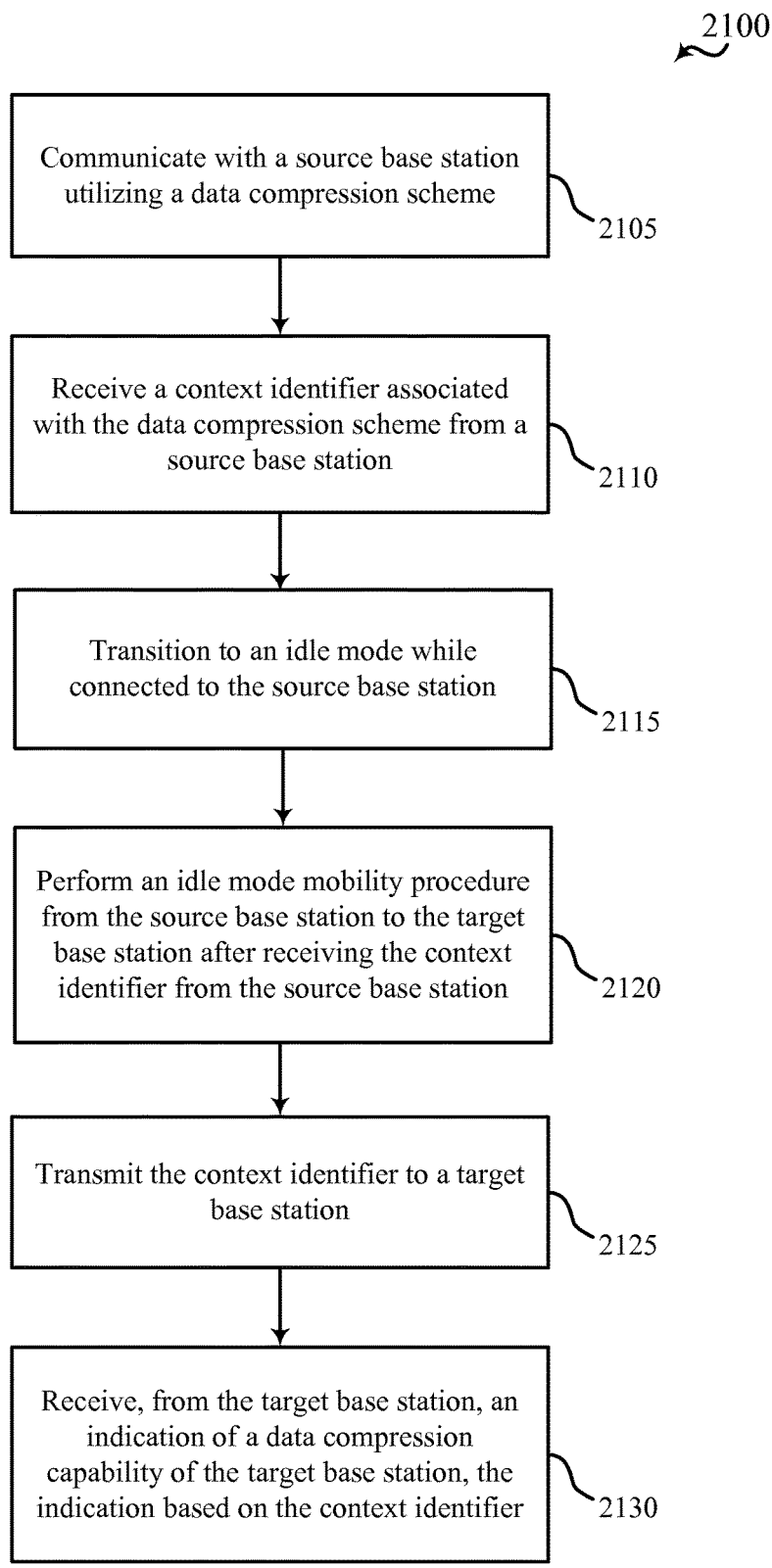

FIG. 21 shows a flowchart illustrating a method 2100 for facilitating data compression through a connection establishment procedure in accordance with various aspects of the present disclosure. The operations of method 2100 may be implemented by a UE 115 or its components as described with reference to FIGS. 1-10. For example, the operations of method 2100 may be performed by the evolved data compression module 815 as described with reference to FIGS. 8-10. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1500-2000 and 2200 of FIGS. 15-20 and 22.

At block 2105, the UE 115 may communicate with a source base station utilizing a data compression scheme as described above with reference to FIGS. 1-7. In certain examples, the operations of block 2105 may be performed by the data compression module 815 as described above with reference to FIG. 8.

At block 2110, the UE 115 may receive a context identifier associated with the data compression scheme from a source base station as described above with reference to FIGS. 1-7. In certain examples, the operations of block 2110 may be performed by the context ID module 925 as described above with reference to FIG. 9.

At block 2115, the UE 115 may transition to an idle mode while connected to the source base station as described above with reference to FIGS. 1-7. In certain examples, the operations of block 2115 may be performed by the RRC mode module 930 as described above with reference to FIG. 9.

At block 2120, the UE 115 may perform an idle mode mobility procedure from the source base station to the target base station after receiving the context identifier from the source base station as described above with reference to FIGS. 1-7. In certain examples, the operations of block 2120 may be performed by the mobility module 935 as described above with reference to FIG. 9.

At block 2125, the UE 115 may transmit the context identifier to a target base station as described above with reference to FIGS. 1-7. In certain examples, the operations of block 2125 may be performed by the transmitter module 820 as described above with reference to FIG. 8.

At block 2130, the UE 115 may receive, from the target base station, an indication of a data compression capability of the target base station, the indication based at least in part on the context identifier as described above with reference to FIGS. 1-7. In certain examples, the operations of block 2130 may be performed by the receiver module 810 as described above with reference to FIG. 8.

Figure 22:
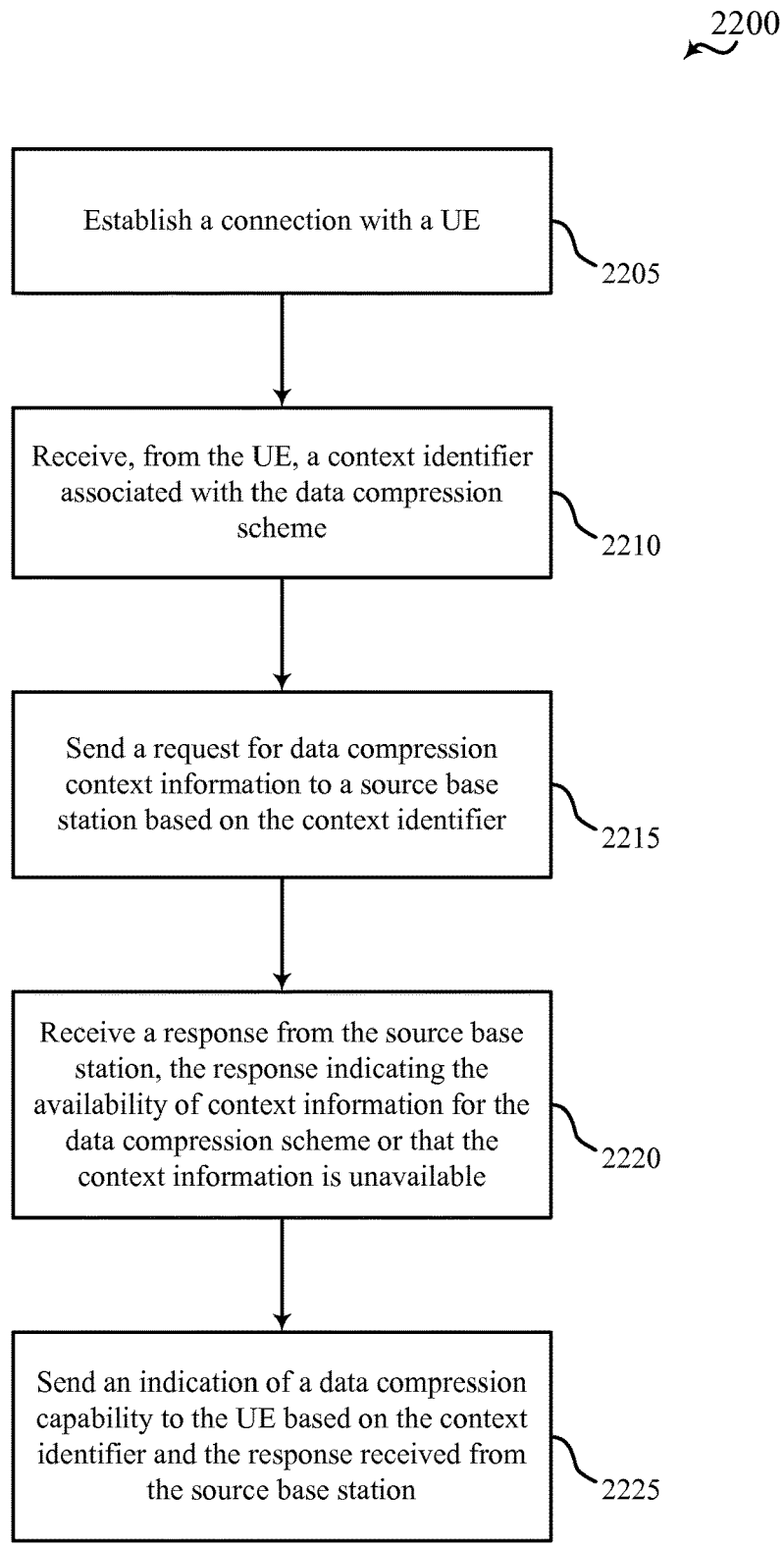

FIG. 22 shows a flowchart illustrating a method 2200 for facilitating data compression through a connection establishment procedure in accordance with various aspects of the present disclosure. The operations of method 2200 may be implemented by a base station 105 or its components as described with reference to FIGS. 1-12. For example, the operations of method 2200 may be performed by the base station data compression module 1115 as described with reference to FIGS. 11-13. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1500-2100 of FIGS. 15-22.

At block 2205, the base station 105 may establish a connection with an idle mode UE as described above with reference to FIGS. 1-7. In certain examples, the operations of block 2205 may be performed by the base station RRC mode module 1220 as described above with reference to FIG. 12.

At block 2210, the base station 105 may receive, from the UE, a context identifier associated with the data compression scheme as described above with reference to FIGS. 1-7. In certain examples, the operations of block 2210 may be performed by the receiver module 1110 as described above with reference to FIG. 11.

At block 2215, the base station 105 may send a request for data compression context information to a source base station based at least in part on the context identifier as described above with reference to FIGS. 1-7. In certain examples, the operations of block 2215 may be performed by the inter-station communication module 1225 as described above with reference to FIG. 12.

At block 2220, the base station 105 may receive a response from the source base station, the response indicating the availability of context information for the data compression scheme or that the context information is unavailable as described above with reference to FIGS. 1-7. In certain examples, the operations of block 2220 may be performed by the base station DCS module 1230 as described above with reference to FIG. 12.

At block 2225, the base station 105 may send an indication of a data compression capability to the UE based at least in part on the context identifier and the response received from the source base station as described above with reference to FIGS. 1-7. In certain examples, the operations of block 2225 may be performed by the transmitter module 1120 as described above with reference to FIG. 11.

In some examples, aspects from two or more of the methods 1500-2200 may be combined. It should be noted that the methods 1500-2200 are just example implementations, and that the operations of the methods 1500-2200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-105, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
    transmitting a sequence of packets to a source base station, the sequence of packets comprising data that is compressed according to a data compression routine;
    receiving a handover message from the source base station that indicates subsequent communications are to be transmitted to a target base station, the handover message including an indication of a data compression capability of the target base station;
    receiving, at the UE, a transmission from the target base station, wherein the transmission is based at least in part on the data compression capability of the target base station and includes a status report that identifies at least one gap in the sequence of packets that were received at the source base station;
    receiving information related to a data compression buffer from the source base station, the data compression buffer being associated with the at least one gap;
    maintaining the data compression buffer based at least in part on the received information related to the data compression buffer; and
    retransmitting at least one packet identified by the status report in accordance with the maintained data compression buffer, to the target base station, the at least one packet comprising data that is compressed according to the data compression capability of the target base station.

2. The method of claim 1, wherein retransmitting the at least one packet identified by the status report comprises:
    retransmitting uncompressed data in the at least one packet, wherein the handover message comprises an indication that the target base station does not support the data compression routine.

3. The method of claim 1, wherein the status report identifies a latest sequential packet in an ordered sequence of data packets.

4. The method of claim 3, further comprising:
    retransmitting packets subsequent to the latest sequential packet identified by the status report to the target base station.

5. The method of claim 1, wherein transmitting the packets to the source base station comprises:
    transmitting an acknowledgment for each packet in a sequence of downlink data packets received from the source base station, the sequence of downlink data packets comprising data that is compressed according to the data compression routine.

6. The method of claim 5, further comprising:
    transmitting a second status report to the target base station, the second status report indicating the at least one gap in the sequence of downlink data packets.

7. The method of claim 6, wherein receiving the transmission from the target base station comprises:
    receiving one or more retransmitted packets identified by the second status report, the one or more retransmitted packets comprising data that is compressed by the target base station according to the data compression routine.

8. The method of claim 1, wherein the data compression buffer comprises a static data compression portion and a non-static data compression portion.

9. The method of claim 1, further comprising:
    setting a context checkpoint for a data compression context of the data compression buffer at a first time; and
    resetting the data compression context of the data compression buffer according to the context checkpoint at a second time.

10. An apparatus for wireless communication at a user equipment (UE), comprising:
    means for transmitting a sequence of packets to a source base station, the sequence of packets comprising data that is compressed according to a data compression routine;
    means for receiving a handover message from the source base station that indicates subsequent communications are to be transmitted to a target base station, the handover message including an indication of a data compression capability of the target base station;
    means for receiving, at the UE, a transmission from the target base station, wherein the transmission is based at least in part on the data compression capability of the target base station and includes a status report that identifies at least one gap in the sequence of packets that were received at the source base station;

means for receiving information related to a data compression buffer from the source base station, the data compression buffer being associated with the at least one gap;

means for maintaining the data compression buffer based at least in part on the received information related to the data compression buffer; and means for retransmitting at least one packet identified by the status report in accordance with the maintained data compression buffer, the at least one packet comprising data that is compressed according to the data compression capability of the target base station.

11. The apparatus of claim 10, wherein the data compression buffer comprises a static data compression portion and a non-static data compression portion.

12. The apparatus of claim 10, further comprising:
means for setting a context checkpoint for a data compression context of the data compression buffer at a first time; and
means for resetting the data compression context of the data compression buffer according to the context checkpoint at a second time.

13. An apparatus for wireless communication at a user equipment (UE), comprising:
a processor;
memory in electronic communication with the processor; and
instructions stored in the memory and operable, when executed by the processor, to cause the apparatus to:
transmit a sequence of packets to a source base station, the sequence of packets comprising data that is compressed according to a data compression routine;
receive a handover message from the source base station that indicates subsequent communications are to be transmitted to a target base station, the handover message including an indication of a data compression capability of the target base station;
receive, at the UE, a transmission from the target base station, wherein the transmission is based at least in part on the data compression capability of the target base station and includes a status report that identifies at least one gap in the sequence of packets that were received at the source base station;
receive information related to a data compression buffer from the source base station, the data compression buffer being associated with the at least one gap;
maintain the data compression buffer based at least in part on the received information related to the data compression buffer; and
retransmit at least one packet identified by the status report in accordance with the maintained data compression buffer, the at least one packet comprising data that is compressed according to the data compression capability of the target base station.

14. The apparatus of claim 13, wherein the instructions are executable by the processor to cause the apparatus to:
transmit an acknowledgment for each packet in a sequence of downlink data packets received from the source base station, the sequence of downlink data packets comprising data that is compressed according to a data compression routine.

15. The apparatus of claim 13, wherein the instructions operable to cause the apparatus to retransmit the at least one packet identified by the status report comprise instructions operable to cause the apparatus to:
retransmit uncompressed data in the at least one packet, wherein the handover message comprises an indication that the target base station does not support the data compression routine.

16. The apparatus of claim 13, wherein the status report identifies a latest sequential packet in an ordered sequence of data packets.

17. The apparatus of claim 16, wherein the instructions are further operable to cause the apparatus to:
retransmit packets subsequent to the latest sequential packet identified by the status report to the target base station.

18. The apparatus of claim 13, wherein the instructions operable to cause the apparatus to transmit the packets to the source base station comprise instructions operable to cause the apparatus to:
transmit an acknowledgment for each packet in a sequence of downlink data packets received from the source base station, the sequence of downlink data packets comprising data that is compressed according to a data compression routine.

19. The apparatus of claim 18, wherein the instructions are further operable to cause the apparatus to:
transmit a status report to the target base station, the status report indicating at least one gap in the sequence of downlink data packets.

20. The apparatus of claim 19, wherein the instructions operable to cause the apparatus to receive the transmission from the target base station comprise instructions operable to cause the apparatus to:
receive one or more retransmitted packets identified by the status report, the one or more retransmitted packets comprising data that is compressed by the target base station according to the data compression routine.

21. The apparatus of claim 13, wherein the data compression buffer comprises a static data compression portion and a non-static data compression portion.

22. The apparatus of claim 13, wherein the instructions are further operable to cause the apparatus to:
set a context checkpoint for a data compression context of the data compression buffer at a first time; and
reset the data compression context of the data compression buffer according to the context checkpoint at a second time.

23. A non-transitory computer-readable medium storing code for wireless communication at a user equipment (UE), the code comprising instructions executable to:
transmit a sequence of packets to a source base station, the sequence of packets comprising data that is compressed according to a data compression routine;
receive a handover message from the source base station that indicates subsequent communications are to be transmitted to a target base station, the handover message including an indication of a data compression capability of the target base station;
receive, at the UE, a transmission from the target base station, wherein the transmission is based at least in part on the data compression capability of the target base station and includes a status report that identifies at least one gap in the sequence of packets that were received at the source base station;
receive information related to a data compression buffer from the source base station, the data compression buffer being associated with the at least one gap;
maintain the data compression buffer based at least in part on the received information related to the data compression buffer; and retransmit at least one packet identified by the status report in accordance with the maintained data compression buffer, the at least one packet comprising data that is compressed according to the data compression capability of the target base station.

24. The non-transitory computer-readable medium of claim 23, wherein the instructions executable to retransmit the at least one packet identified by the status report comprise instructions executable to:

retransmit uncompressed data in the at least one packet, wherein the handover message comprises an indication that the target base station does not support the data compression routine.

25. The non-transitory computer-readable medium of claim 23, wherein the status report identifies a latest sequential packet in an ordered sequence of data packets.

26. The non-transitory computer-readable medium of claim 25, wherein the code further comprises instructions executable to:

retransmit packets subsequent to the latest sequential packet identified by the status report to the target base station.

27. The non-transitory computer-readable medium of claim 23, wherein the instructions executable to transmit the packets to the source base station comprise instructions executable to:

transmit an acknowledgment for each packet in a sequence of downlink data packets received from the source base station, the sequence of downlink data packets comprising data that is compressed according to a data compression routine.

28. The non-transitory computer-readable medium of claim 27, wherein the code further comprises instructions executable to:

transmit a status report to the target base station, the status report indicating at least one gap in the sequence of downlink data packets.

29. The non-transitory computer-readable medium of claim 28, wherein the instructions executable to receive the transmission from the target base station comprise instructions executable to:

receive one or more retransmitted packets identified by the status report, the one or more retransmitted packets comprising data that is compressed by the target base station according to the data compression routine.

30. The non-transitory computer-readable medium of claim 23, wherein the data compression buffer comprises a static data compression portion and a non-static data compression portion.

31. The non-transitory computer-readable medium of claim 23, wherein the instructions are further executable to:

set a context checkpoint for a data compression context of the data compression buffer at a first time; and reset the data compression context of the data compression buffer according to the context checkpoint at a second time.

* * * * *